United States Patent
Kufeld et al.

(10) Patent No.: US 11,326,003 B2
(45) Date of Patent: May 10, 2022

(54) METALLOCENE CATALYST SYSTEMS WITH CHEMICALLY-TREATED SOLID OXIDES FOR PRODUCING ETHYLENE-BASED PLASTOMERS AND ELASTOMERS

(71) Applicant: Chevron Phillips Chemical Company LP, The Woodlands, TX (US)

(72) Inventors: Scott E. Kufeld, Houston, TX (US); Max P. McDaniel, Bartlesville, OK (US); Kenneth A. Dooley, Porter, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 17/480,240

(22) Filed: Sep. 21, 2021

(65) Prior Publication Data

US 2022/0017668 A1  Jan. 20, 2022

Related U.S. Application Data

(62) Division of application No. 16/928,130, filed on Jul. 14, 2020, now Pat. No. 11,186,662.

(51) Int. Cl.
- *C08F 210/02* (2006.01)
- *C08F 2/34* (2006.01)
- *C08F 4/6592* (2006.01)

(52) U.S. Cl.
CPC .................................. *C08F 210/02* (2013.01)

(58) Field of Classification Search
USPC .................................................. 526/129, 156
See application file for complete search history.

(56) References Cited

U.S. PATENT DOCUMENTS

| | | | |
|---|---|---|---|
| 4,325,837 A | | 4/1982 | Capshew |
| 5,969,061 A | * | 10/1999 | Wonders .............. B01J 8/005 526/66 |
| 6,107,230 A | | 8/2000 | McDaniel |
| 6,165,929 A | | 12/2000 | McDaniel |
| 6,294,494 B1 | | 9/2001 | McDaniel |

(Continued)

FOREIGN PATENT DOCUMENTS

EP    2462424 B1    5/2016

OTHER PUBLICATIONS

Bird et al., entitled "Dynamics of Polymeric Liquids," vol. 1, Fluid Mechanics, 2nd Edition, John Wiley & Sons, 1987, 3 pages.

(Continued)

*Primary Examiner* — Fred M Teskin
(74) *Attorney, Agent, or Firm* — Merchant & Gould P.C.

(57) ABSTRACT

Polymerization processes for producing ethylene-based plastomers and elastomers having densities less than 0.91 g/cm³ utilize a metallocene-based catalyst system containing a chemically-treated solid oxide. These polymerization processes can be conducted in a slurry reactor, a solution reactor, and/or a gas phase reactor. Ethylene polymers produced from the polymerization process can be characterized by a density of less than 0.91 g/cm³, a CY-a parameter of less than 0.2, and a ratio of HLMI/MI of at least 30, or a density less than 0.91 g/cm³, a CY-a parameter from 0.25 to 0.75, and a ratio of Mw/Mn from 2 to 3.

19 Claims, 16 Drawing Sheets

(56) References Cited

U.S. PATENT DOCUMENTS

| | | |
|---|---|---|
| 6,300,271 B1 | 10/2001 | McDaniel |
| 6,316,553 B1 | 11/2001 | McDaniel |
| 6,355,594 B1 | 3/2002 | McDaniel |
| 6,376,415 B1 | 4/2002 | McDaniel |
| 6,388,017 B1 | 5/2002 | McDaniel |
| 6,391,816 B1 | 5/2002 | McDaniel |
| 6,395,666 B1 | 5/2002 | McDaniel |
| 6,524,987 B1 | 2/2003 | Collins |
| 6,548,441 B1 | 4/2003 | McDaniel |
| 6,548,442 B1 | 4/2003 | McDaniel |
| 6,576,583 B1 | 6/2003 | McDaniel |
| 6,613,712 B1 | 9/2003 | McDaniel |
| 6,632,894 B1 | 10/2003 | McDaniel |
| 6,667,274 B1 | 12/2003 | Hawley |
| 6,750,302 B1 | 6/2004 | McDaniel |
| 7,026,494 B1 | 4/2006 | Yang |
| 7,041,617 B2 | 5/2006 | Jensen |
| 7,226,886 B2 | 6/2007 | Jayaratne |
| 7,294,599 B2 | 11/2007 | Jensen |
| 7,312,283 B2 | 12/2007 | Martin |
| 7,517,939 B2 | 4/2009 | Yang |
| 7,601,665 B2 | 10/2009 | McDaniel |
| 7,619,047 B2 | 11/2009 | Yang |
| 7,884,163 B2 | 2/2011 | McDaniel |
| 8,288,487 B2 | 10/2012 | Yang |
| 8,309,485 B2 | 11/2012 | Yang |
| 8,426,538 B2 | 4/2013 | Jensen |
| 8,623,973 B1 | 1/2014 | McDaniel |
| 9,023,959 B2 | 5/2015 | McDaniel |
| 9,217,049 B2 | 12/2015 | Yang |
| 9,334,350 B2 | 5/2016 | McDaniel |
| 9,574,031 B2 | 2/2017 | Yang |
| 9,758,600 B1 | 9/2017 | Praetorius |
| 2011/0035193 A1 | 2/2011 | Deslauriers |
| 2017/0306114 A1 | 10/2017 | Cui |
| 2019/0055329 A1 | 2/2019 | Sukhadia |

OTHER PUBLICATIONS

Film Extrusion Manual—Process, Materials, Properties, TAPPI Press, 1992, 16 pages.

Hieber et al., entitled "Shear-Rate-Dependence Modeling of Polymer Melt Viscosity," Polymer Engineering and Science, 1992, 32(14), pp. 931-938.

Hieber et al., entitled "Some correlations involving the shear viscosity of polystyrene melts," Rheologica Acta, 1989, vol. 28, pp. 321-332.

IUPAC Compendium of Chemical Terminology, 2nd Ed. (1997).

Jeff S. Fodor, et al., "Further Investigation of the Relationship Between Polymer Structure and HDPE Post Yield Properties," Polymer Issue 180, Jul. 11, 2019, 121730, 14 pages.

Modern Plastics Encyclopedia, Mid-Nov. 1995 Issue, vol. 72, No. 12, 3 pages.

International Search Report and Written Opinion issued in corresponding application No. PCT/JS2021/070811 dated Oct. 25, 2021, 12 pages.

* cited by examiner

US 11,326,003 B2

METALLOCENE CATALYST SYSTEMS WITH CHEMICALLY-TREATED SOLID OXIDES FOR PRODUCING ETHYLENE-BASED PLASTOMERS AND ELASTOMERS

REFERENCE TO RELATED APPLICATION

This application is a divisional application of co-pending U.S. patent application Ser. No. 16/928,130, filed on Jul. 14, 2020, now U.S. Pat. No. 11,186,662, the disclosure of which is incorporated herein by reference in its entirety.

FIELD OF THE INVENTION

The present disclosure relates to polymerization processes for producing ethylene-based plastomers and elastomers, and more particularly, relates to slurry, solution, and gas phase polymerization processes using metallocene catalyst systems containing chemically-treated solid oxides to produce such ethylene-based plastomers and elastomers.

BACKGROUND OF THE INVENTION

Ethylene-based copolymers can be produced using various combinations of catalyst systems and polymerization processes. In some end-use applications, it is desirable for the copolymers to have a very low density—such as below 0.91 g/cc, below 0.90 g/cc, below 0.89 g/cc, and so forth—and these copolymers often are referred to a plastomers and/or elastomers. Ziegler-Natta catalyst systems can produce plastomers and elastomers, but metallocene-based catalyst systems can offer advantages in many important physical properties of these low density ethylene copolymers. Accordingly, the present invention is generally directed to the use of metallocene-based catalyst systems in a variety of polymerization processes to produce ethylene-based plastomers and elastomers.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

Polymerization processes for producing ethylene-based plastomers and elastomers are disclosed and described herein. In one aspect, for instance, a slurry polymerization process for producing an ethylene polymer having a density of less than or equal to about 0.91 g/cm$^3$ is disclosed, and in this aspect, the process can comprise contacting a catalyst composition with ethylene and an α-olefin comonomer in a diluent in a slurry reactor at a polymerization temperature in a range from about 50° C. to about 78° C. to produce the ethylene polymer. The catalyst composition can comprise a metallocene compound, a chemically-treated solid oxide, and optionally, a co-catalyst. The metallocene compound can be a single atom bridged or two atom bridged (two atom chain) metallocene compound, and the metallocene compound can be characterized by a comonomer incorporation efficiency of at least about 1% at the polymerization temperature (for the α-olefin comonomer).

In another aspect, a solution polymerization process for producing an ethylene polymer having a density of less than or equal to about 0.91 g/cm$^3$ is provided, and in this aspect, the process can comprise contacting a catalyst composition with ethylene and an α-olefin comonomer in a hydrocarbon solvent in a solution reactor at a polymerization temperature in a range from about 120° C. to about 160° C. (often, for an average residence time in a range from about 5 to about 90 min) to produce the ethylene polymer. The catalyst composition can comprise a metallocene compound, a chemically-treated solid oxide, and optionally, a co-catalyst, and the metallocene compound can be characterized by a comonomer incorporation efficiency of at least about 10% at the polymerization temperature.

In yet another aspect, a gas phase polymerization process for producing an ethylene polymer having a density of less than or equal to about 0.91 g/cm$^3$ is provided, and in this aspect, the process can comprise contacting a catalyst composition with ethylene and an α-olefin comonomer in a gas phase reactor containing an inert gas and a $C_4$-$C_8$ alkane (a condensable agent) at a polymerization temperature in a range from about 48° C. to about 82° C. to produce the ethylene polymer. The catalyst composition can comprise a metallocene compound, a chemically-treated solid oxide, and optionally, a co-catalyst. In the gas phase reactor, the ratio of heavy hydrocarbon partial pressure to vapor pressure (ratio of P/P*) can be less than or equal to about 0.95.

The present invention also encompasses ethylene-based plastomers and elastomers. In some aspects, the ethylene polymer can be characterized by a density of less than or equal to about 0.91 g/cm$^3$, a CY-a parameter of less than or equal to about 0.2, and a ratio of HLMI/MI of at least about 30, while in other aspects, the ethylene polymer can be characterized by a density of less than or equal to about 0.91 g/cm$^3$, a CY-a parameter in a range from about 0.25 to about 0.75, and a ratio of Mw/Mn in a range from about 2 to about 3.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects and embodiments may be directed to various feature combinations and sub-combinations described in the detailed description.

DEFINITIONS

Figure 1:
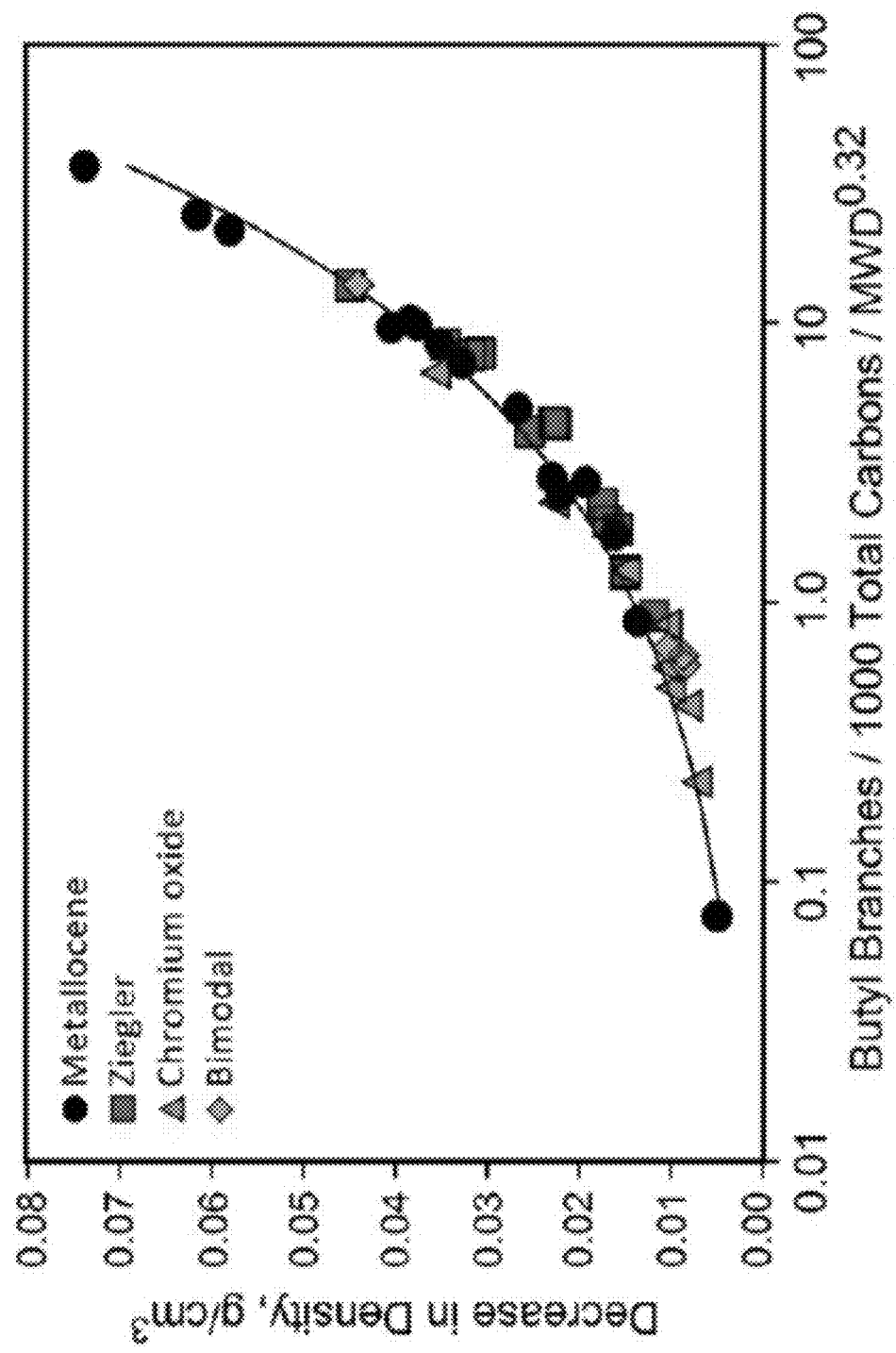
FIG. 1 presents a plot of the decrease in polymer density due to 1-hexene incorporation for different catalyst systems.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, 2nd Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Herein, features of the subject matter are described such that, within particular aspects, a combination of different features can be envisioned. For each and every aspect and/or feature disclosed herein, all combinations that do not detrimentally affect the designs, compositions, processes, and/or methods described herein are contemplated with or without explicit description of the particular combination. Additionally, unless explicitly recited otherwise, any aspect and/or feature disclosed herein can be combined to describe inventive features consistent with the present disclosure.

While compositions and methods are described herein in terms of "comprising" various components or steps, the compositions and methods also can "consist essentially of" or "consist of" the various components or steps, unless stated otherwise. For example, a catalyst composition consistent with aspects of the present invention can comprise; alternatively, can consist essentially of; or alternatively, can consist of; a metallocene compound, a chemically-treated solid oxide, and a co-catalyst.

The terms "a," "an," "the," etc., are intended to include plural alternatives, e.g., at least one, unless otherwise specified. For instance, the disclosure of "a chemically-treated solid oxide" or "a metallocene compound" or "a comonomer" is meant to encompass one, or mixtures or combinations of more than one, chemically-treated solid oxide or metallocene compound or comonomer, respectively, unless otherwise specified.

Generally, groups of elements are indicated using the numbering scheme indicated in the version of the periodic table of elements published in *Chemical and Engineering News*, 63(5), 27, 1985. In some instances, a group of elements can be indicated using a common name assigned to the group; for example, alkali metals for Group 1 elements, alkaline earth metals for Group 2 elements, transition metals for Group 3-12 elements, and halogens or halides for Group 17 elements.

For any particular compound disclosed herein, the general structure or name presented is also intended to encompass all structural isomers, conformational isomers, and stereoisomers that can arise from a particular set of substituents, unless indicated otherwise. Thus, a general reference to a compound includes all structural isomers unless explicitly indicated otherwise; e.g., a general reference to pentane includes n-pentane, 2-methyl-butane, and 2,2-dimethylpropane, while a general reference to a butyl group includes an n-butyl group, a sec-butyl group, an iso-butyl group, and a tert-butyl group. Additionally, the reference to a general structure or name encompasses all enantiomers, diastereomers, and other optical isomers whether in enantiomeric or racemic forms, as well as mixtures of stereoisomers, as the context permits or requires. For any particular formula or name that is presented, any general formula or name presented also encompasses all conformational isomers, regioisomers, and stereoisomers that can arise from a particular set of substituents.

The term "substituted" when used to describe a group, for example, when referring to a substituted analog of a particular group, is intended to describe any non-hydrogen moiety that formally replaces a hydrogen in that group, and is intended to be non-limiting. A group or groups can also be referred to herein as "unsubstituted" or by equivalent terms such as "non-substituted," which refers to the original group in which a non-hydrogen moiety does not replace a hydrogen within that group. Unless otherwise specified, "substituted" is intended to be non-limiting and include inorganic substituents or organic substituents as understood by one of ordinary skill in the art.

The term "hydrocarbon" whenever used in this specification and claims refers to a compound containing only carbon and hydrogen. Other identifiers can be utilized to indicate the presence of particular groups in the hydrocarbon (e.g., halogenated hydrocarbon indicates the presence of one or more halogen atoms replacing an equivalent number of hydrogen atoms in the hydrocarbon). The term "hydrocarbyl group" is used herein in accordance with the definition specified by IUPAC: a univalent group formed by removing a hydrogen atom from a hydrocarbon (that is, a group containing only carbon and hydrogen). Non-limiting examples of hydrocarbyl groups include alkyl, alkenyl, aryl, and aralkyl groups, amongst other groups.

The term "polymer" is used herein generically to include ethylene copolymers, terpolymers, and the like, as well as alloys and blends thereof. The term "polymer" also includes impact, block, graft, random, and alternating copolymers. A copolymer is derived from ethylene and one olefin comonomer, while a terpolymer is derived from ethylene and two olefin comonomers. Accordingly, "polymer" encompasses copolymers and terpolymers derived from ethylene and any comonomer(s) disclosed herein. Similarly, the scope of the term "polymerization" includes copolymerization and terpolymerization. Therefore, an ethylene polymer includes ethylene copolymers (e.g., ethylene/α-olefin copolymers), ethylene terpolymers, and the like, as well as blends or mixtures thereof. Thus, an ethylene polymer encompasses polymers often referred to in the art as ULDPE (ultra low density polyethylene) and VLDPE (very low density polyethylene). As an example, an ethylene copolymer can be derived from ethylene and a comonomer, such as 1-butene, 1-hexene, or 1-octene. If the monomer and comonomer were ethylene and 1-hexene, respectively, the resulting polymer can be categorized as an ethylene/1-hexene copolymer. The term "polymer" also includes all possible geometrical configurations, unless stated otherwise, and such configurations can include isotactic, syndiotactic, and random symmetries. Moreover, unless stated otherwise, the term "polymer" also is meant to include all molecular weight polymers, and is inclusive of lower molecular weight polymers.

The term "co-catalyst" is used generally herein to refer to compounds such as aluminoxane compounds, organoboron or organoborate compounds, ionizing ionic compounds, organoaluminum compounds, organozinc compounds, organomagnesium compounds, organolithium compounds, and the like, that can constitute one component of a catalyst composition, when used, for example, in addition to a chemically-treated solid oxide. The term "co-catalyst" is used regardless of the actual function of the compound or any chemical mechanism by which the compound may operate.

The term "chemically-treated solid oxide" is used herein to indicate a solid, inorganic oxide of relatively high porosity, which can exhibit Lewis acidic or Brønsted acidic behavior, and which has been treated with an electron-withdrawing component, typically an anion, and which is calcined. The electron-withdrawing component is typically an electron-withdrawing anion source compound. Thus, the chemically-treated solid oxide can comprise a calcined contact product of at least one solid oxide with at least one electron-withdrawing anion source compound. Typically, the chemically-treated solid oxide comprises at least one acidic solid oxide compound. The chemically-treated solid oxide can serve as an "activator," which refers generally to a substance that is capable of converting a metallocene component into a catalyst that can polymerize olefins, or converting a contact product of a metallocene component and a component that provides an activatable ligand (e.g., an alkyl, a hydride) to the metallocene, when the metallocene compound does not already comprise such a ligand, into a catalyst that can polymerize olefins. This term is used regardless of the actual activating mechanism. Since the catalyst composition contains a chemically-treated solid oxide (activator), then aluminoxane, organoboron or organoborate, and ionizing ionic materials, if present, are referred to as co-catalysts.

The term "metallocene" as used herein describes compounds comprising at least one $\eta^3$ to $\eta^5$-cycloalkadienyl-type moiety, wherein $\eta^3$ to $\eta^5$-cycloalkadienyl moieties include cyclopentadienyl ligands, indenyl ligands, fluorenyl ligands, and the like, including partially saturated or substituted derivatives or analogs of any of these. Possible substituents on these ligands can include H, therefore this invention comprises ligands such as tetrahydroindenyl, tetrahydrofluorenyl, octahydrofluorenyl, partially saturated indenyl, partially saturated fluorenyl, substituted partially saturated indenyl, substituted partially saturated fluorenyl, and the like. In some contexts, the metallocene is referred to simply as the "catalyst," in much the same way the term "co-catalyst" is used herein to refer to, for example, an organoaluminum compound.

The terms "catalyst composition," "catalyst mixture," "catalyst system," and the like, do not depend upon the actual product or composition resulting from the contact or reaction of the initial components of the disclosed or claimed catalyst composition/mixture/system, the nature of the active catalytic site, or the fate of the co-catalyst, the metallocene compound, or the chemically-treated solid oxide, after combining these components. Therefore, the terms "catalyst composition," "catalyst mixture," "catalyst system," and the like, encompass the initial starting components of the composition, as well as whatever product(s) may result from contacting these initial starting components, and this is inclusive of both heterogeneous and homogenous catalyst systems or compositions. The terms "catalyst composition," "catalyst mixture," "catalyst system," and the like, can be used interchangeably throughout this disclosure.

The term "contact product" is used herein to describe compositions wherein the components are contacted together in any order, in any manner, and for any length of time, unless otherwise specified. For example, the components can be contacted by blending or mixing. Further, contacting of any component can occur in the presence or absence of any other component of the compositions described herein. Combining additional materials or components can be done by any suitable method. Further, the term "contact product" includes mixtures, blends, solutions, slurries, reaction products, and the like, or combinations thereof. Although "contact product" can include reaction products, it is not required for the respective components to react with one another. Similarly, the term "contacting" is used herein to refer to materials which can be blended, mixed, slurried, dissolved, reacted, treated, or otherwise combined in some other manner.

Although any methods, devices, and materials similar or equivalent to those described herein can be used in the practice or testing of the invention, the typical methods, devices, and materials are herein described.

All publications and patents mentioned herein are incorporated herein by reference for the purpose of describing and disclosing, for example, the constructs and methodologies that are described in the publications, which might be used in connection with the presently described invention.

Several types of ranges are disclosed in the present invention. When a range of any type is disclosed or claimed, the intent is to disclose or claim individually each possible number that such a range could reasonably encompass, including end points of the range as well as any sub-ranges and combinations of sub-ranges encompassed therein. For example, when a chemical moiety having a certain number of carbon atoms is disclosed or claimed, the intent is to disclose or claim individually every possible number that such a range could encompass, consistent with the disclosure herein. For example, the disclosure that a moiety is a $C_1$ to $C_{18}$ hydrocarbyl group, or in alternative language, a hydrocarbyl group having from 1 to 18 carbon atoms, as used herein, refers to a moiety that can have 1, 2, 3, 4, 5, 6, 7, 8, 9, 10, 11, 12, 13, 14, 15, 16, 17, or 18 carbon atoms, as well as any range between these two numbers (for example, a $C_1$ to $C_8$ hydrocarbyl group), and also including any combination of ranges between these two numbers (for example, a $C_2$ to $C_4$ and a $C_{12}$ to $C_{16}$ hydrocarbyl group).

Similarly, another representative example follows for the CY-a parameter of an ethylene polymer consistent with aspects of this invention. By a disclosure that the CY-a parameter can be in a range from about 0.25 to about 0.65, the intent is to recite that the CY-a parameter can be any value in the range and, for example, can be equal to about 0.25, about 0.3, about 0.35, about 0.4, about 0.45, about 0.5, about 0.55, about 0.6, or about 0.65. Additionally, the CY-a parameter can be within any range from about 0.25 to about 0.65 (for example, from about 0.3 to about 0.6), and this also includes any combination of ranges between about 0.25 and about 0.65. Further, in all instances, where "about" a particular value is disclosed, then that value itself is disclosed. Thus, the disclosure that CY-a parameter can be from about 0.25 to about 0.65 also discloses a CY-a parameter from 0.25 to 0.65 (for example, from 0.3 to 0.6), and this also includes any combination of ranges between 0.25 and 0.65. Likewise, all other ranges disclosed herein should be interpreted in a manner similar to these examples.

The term "about" means that amounts, sizes, formulations, parameters, and other quantities and characteristics are not and need not be exact, but can be approximate and/or larger or smaller, as desired, reflecting tolerances, conversion factors, rounding off, measurement errors, and the like, and other factors known to those of skill in the art. In general, an amount, size, formulation, parameter or other quantity or characteristic is "about" or "approximate" whether or not expressly stated to be such. The term "about" also encompasses amounts that differ due to different equilibrium conditions for a composition resulting from a particular initial mixture. Whether or not modified by the term "about," the claims include equivalents to the quantities. The term "about" can mean within 10% of the reported numerical value, preferably within 5% of the reported numerical value.

DETAILED DESCRIPTION OF THE INVENTION

The present invention is directed generally to slurry, solution, and gas phase polymerization processes using metallocene catalyst systems containing chemically-treated solid oxides to produce ethylene-based plastomers and elastomers.

Polymerization Processes and Catalyst Systems

A first process for producing ethylene-based plastomers and elastomers in accordance with this invention is a slurry polymerization process. The slurry polymerization process for producing an ethylene polymer having a density of less than or equal to about 0.91 g/cm$^3$ can comprise contacting a catalyst composition with ethylene and an α-olefin comonomer in a diluent in a slurry reactor at a polymerization temperature in a range from about 50° C. to about 78° C. to produce the ethylene polymer. The catalyst composition can comprise a metallocene compound, a chemically-treated solid oxide, and optionally, a co-catalyst. The metallocene compound can be a single atom bridged or two atom bridged (two atom chain) metallocene compound, and the metallocene compound can be characterized by a comonomer incorporation efficiency of at least about 1% at the polymerization temperature.

A second process in accordance with this invention is a solution polymerization process. The solution polymerization process for producing an ethylene polymer having a density of less than or equal to about 0.91 g/cm$^3$ can comprise contacting a catalyst composition with ethylene and an α-olefin comonomer in a hydrocarbon solvent in a solution reactor at a polymerization temperature in a range from about 120° C. to about 160° C. (often, for an average residence time in a range from about 5 to about 90 min) to produce the ethylene polymer. The catalyst composition can comprise a metallocene compound, a chemically-treated solid oxide, and optionally, a co-catalyst, and the metallocene compound can be characterized by a comonomer incorporation efficiency of at least about 10% at the polymerization temperature.

A third process in accordance with this invention is a gas phase polymerization process. The gas phase polymerization process for producing an ethylene polymer having a density of less than or equal to about 0.91 g/cm$^3$ can comprise contacting a catalyst composition with ethylene and an α-olefin comonomer in a gas phase reactor containing an inert gas and a $C_4$-$C_8$ alkane (a condensable agent) at a polymerization temperature in a range from about 48° C. to about 82° C. to produce the ethylene polymer. The catalyst composition can comprise a metallocene compound, a chemically-treated solid oxide, and optionally, a co-catalyst. In the gas phase reactor, the ratio of heavy hydrocarbon partial pressure to vapor pressure (ratio of P/P*) can be less than or equal to about 0.95. This applies to heavy hydrocarbons, which are hydrocarbons for which the polymerization reaction temperature is below their critical temperatures.

Generally, the features of these first, second, and third processes (e.g., the polymer density, the comonomer, the polymerization temperature, the metallocene compound, the chemically-treated solid oxide, and the co-catalyst, among others) are independently described herein and these features can be combined in any combination to further describe the disclosed processes. Moreover, other process steps can be conducted before, during, and/or after any of the steps listed in the disclosed processes, unless stated otherwise. Additionally, any ethylene polymers (e.g., ethylene/α-olefin copolymer plastomers or elastomers) produced in accordance with any of the disclosed processes are within the scope of this disclosure and are encompassed herein.

Referring now to the first process, the slurry polymerization process for producing a low density ethylene-based polymer can comprise contacting a catalyst composition with ethylene and an α-olefin comonomer in a diluent in a slurry reactor at a polymerization temperature in a range from about 50° C. to about 78° C. to produce the ethylene-based polymer. In some aspects, the polymerization temperature can range from about 55 to about 78° C. or from about 50° C. to about 70° C., while in other aspects, the polymerization temperature can fall within a range from about 55° C. to about 72° C. As the polymer density decreases, generally lower polymerization temperatures are utilized to prevent the polymer from dissolving in the diluent. Any suitable diluent can be used, and isobutane and propane are commonly used in many slurry processes at higher densities. Generally, the diluent can comprise isobutane, n-butane, propane, n-pentane, isopentane, hexane, heptane, and the like, as well as any combination thereof. Downstream operations such as flashing also can impact the diluent selection.

To facilitate production of the lower density polymers, the comonomer concentration in the slurry reactor should be relatively high, often from about 5 to about 30 mol %, and more often from about 7 to about 28 mol %, from about 8 to about 18 mol %, or from about 10 to about 16 mol %. The comonomer concentration is based on the total reactor liquid contents and thus includes the diluent. The ethylene concentration (also based on total reactor liquid contents) can vary significantly based on the desired polymer density, but typically falls in a range from about 2 to about 25 mol % in one aspect, from about 4 to about 18 mol % in another aspect, from about 5 to about 15 mol % in yet another aspect, and from about 8 to about 13 mol % in still another aspect. Likewise, the comonomer:ethylene molar ratio in the reactor can vary significantly based on the desired polymer density, and typical ranges can include from about 0.1:1 to about 8:1, from about 0.5:1 to about 5:1, from about 0.7:1 to about 4:1, from about 0.75:1 to about 3.5:1, or from about 0.8:1 to about 3:1, and the like.

Due to heat transfer limitations in the production of lower density polymers, it can be beneficial to have a relatively low solids content in the slurry reactor. While the solids content in the slurry reactor can range from about 10 to about 50 wt. %, operating at lower solids in the range of from about 15 to about 40 wt. %, or in the range of from about 10 to about 30 wt. %, can be beneficial for producing lower density polymers.

Reactor temperature control can be more challenging for lower density polymers due to their lower softening and melting points. For higher density polymers in which the polymerization temperature is near or greater than 100° C., the temperature at the inlet of the reactor coolant jacket often can be in the 80-90° C. range. Herein, the inlet temperature to the reactor coolant jacket is much lower, such as from about 20 to about 45° C. in one aspect, from about 20° C. to about 40° C. in another aspect, and from about 25° C. to about 40° C. in yet another aspect.

Optionally, to provide more efficient cooling, the reactor size can be decreased from conventional commercial slurry reactors that typically produce higher density polymers. For example, for a loop slurry reactor, instead of a 24-inch OD, the slurry reactor used to produce lower density plastomers and/or elastomers can have an outside diameter ranging from about 12 to about 22 inches, or from about 16 to about 20 inches.

In the slurry polymerization process, the catalyst composition can comprise a metallocene compound, a chemically-treated solid oxide, and optionally, a co-catalyst. While not limited thereto, the ppm (by weight) of the metallocene compound in the slurry reactor—based on the total reactor liquid contents—can range from about 0.1 to about 10 ppm, such as from about 0.2 to about 8 ppm; alternatively, from about 0.3 to about 6 ppm; alternatively, from about 0.4 to about 4 ppm; alternatively, from about 0.5 to about 2.5 ppm; or alternatively, from about 0.5 to about 1.5 ppm. Likewise, when a co-catalyst is used, the amount of the co-catalyst is not particularly limited, but typically ranges from about 1 to about 1000 ppm or from about 3 ppm to about 650 ppm (based on total reactor liquid contents) in some aspects, and from about 4.5 to about 300 ppm, from about 5 to about 100 ppm, or from about 5 to about 50 ppm in other aspects.

Suitable chemically-treated solid oxides and co-catalysts are disclosed further hereinbelow. The metallocene compound utilized in the slurry process can be any suitable single atom bridged or two atom bridged (two atom chain) metallocene compound or any single atom bridged or two atom bridged (two atom chain) metallocene compound disclosed herein. In one aspect, the metallocene compound can have a fluorenyl group and a cyclopentadienyl group. Any fluorenyl group or cyclopentadienyl group (and similarly, any indenyl group) disclosed herein can be substituted or unsubstituted, unless stated otherwise. In another aspect, the metallocene compound can have two indenyl groups. In yet another aspect, the metallocene compound can have an indenyl group and a fluorenyl group. In these and other aspects, the metallocene compound can contain an alkenyl substituent; the alkenyl substituent can be present on the bridging atom or bridging chain, and/or the alkenyl substituent can be present on at least one of the cyclopentadienyl, indenyl, or fluorenyl groups. For instance, for a metallocene compound with a cyclopentadienyl group and a fluorenyl group, the alkenyl substituent can be on the cyclopentadienyl group. The alkenyl substituent can be any suitable alkenyl group, such as a $C_3$ to $C_{18}$ alkenyl group, or a $C_3$ to $C_8$ terminal alkenyl group.

Additionally, in some aspects, the metallocene compound used in the first process often contains zirconium or hafnium; alternatively, zirconium; or alternatively, hafnium. The bridge can be a single carbon atom; alternatively, a single silicon atom; alternatively, a single boron atom; alternatively, a two carbon atom bridge; or alternatively, a two silicon atom bridge. Independently, any bridging atom (or atoms) can have two substituents independently selected from H or a $C_1$ to $C_{18}$ hydrocarbyl group, or from H or a $C_1$ to $C_8$ hydrocarbyl group; alternatively, two substituents independently selected from H or a $C_1$ to $C_6$ alkyl group; or alternatively, two substituents independently selected from a methyl group, an ethyl group, a propyl group, a butyl group, a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a cyclohexylphenyl group, a naphthyl group, a tolyl group, or a benzyl group. For instance, the bridging atom or bridging chain can have at least one phenyl substituent.

If the metallocene compound is a single atom bridged metallocene compound, it can have formula (II) in some aspects:

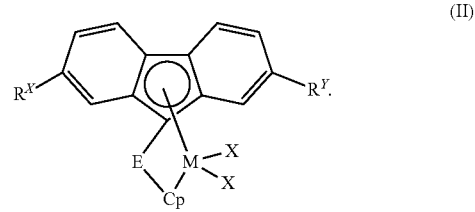

(II)

Within formula (II), M, Cp, $R^X$, $R^Y$, E, and each X are independent elements of the bridged metallocene compound. Accordingly, the bridged metallocene compound having formula (II) can be described using any combination of M, Cp, $R^X$, $R^Y$, E, and X disclosed herein.

In accordance with aspects of this invention, the metal in formula (II), M, can be Zr or Hf. Each X in formula (II) independently can be a monoanionic ligand. In some aspects, suitable monoanionic ligands can include, but are not limited to, H (hydride), $BH_4$, a halide, a $C_1$ to $C_{36}$ hydrocarbyl group, a $C_1$ to $C_{36}$ hydrocarboxy group, a $C_1$ to $C_{36}$ hydrocarbylaminyl group, a $C_1$ to $C_{36}$ hydrocarbylsilyl group, a $C_1$ to $C_{36}$ hydrocarbylaminylsilyl group, —$OBR^1{}_2$, or —$OSO_2R^1$, wherein $R^1$ is a $C_1$ to $C_{36}$ hydrocarbyl group. It is contemplated that each X can be either the same or a different monoanionic ligand. In addition to representative selections for each X that are disclosed herein, additional suitable hydrocarbyl groups, hydrocarboxy groups, hydrocarbylaminyl groups, hydrocarbylsilyl groups, and hydrocarbylaminylsilyl groups are disclosed, for example, in U.S. Pat. No. 9,758,600, incorporated herein by reference in its entirety.

In one aspect, each X independently can be H, $BH_4$, a halide (e.g., F, Cl, Br, etc.), a $C_1$ to $C_{18}$ hydrocarbyl group, a $C_1$ to $C_{18}$ hydrocarboxy group, a $C_1$ to $C_{18}$ hydrocarbylaminyl group, a $C_1$ to $C_{18}$ hydrocarbylsilyl group, or a $C_1$ to $C_{18}$ hydrocarbylaminylsilyl group. Alternatively, each X independently can be H, BH$_4$, a halide, OBR$^1$$_2$, or OSO$_2$R$^1$, wherein R$^1$ is a C$_1$ to C$_{18}$ hydrocarbyl group. In another aspect, each X independently can be H, BH$_4$, a halide, a C$_1$ to C$_{12}$ hydrocarbyl group, a C$_1$ to C$_{12}$ hydrocarboxy group, a C$_1$ to C$_{12}$ hydrocarbylaminyl group, a C$_1$ to C$_{12}$ hydrocarbylsilyl group, a C$_1$ to C$_{12}$ hydrocarbylaminylsilyl group, OBR$^1$$_2$, or OSO$_2$R$^1$, wherein R$^1$ is a C$_1$ to C$_{12}$ hydrocarbyl group. In another aspect, each X independently can be H, BH$_4$, a halide, a C$_1$ to C$_{18}$ hydrocarbyl group, a C$_1$ to C$_{10}$ hydrocarboxy group, a C$_1$ to C$_{10}$ hydrocarbylaminyl group, a C$_1$ to C$_{10}$ hydrocarbylsilyl group, a C$_1$ to C$_{10}$ hydrocarbylaminylsilyl group, OBR$^1$$_2$, or OSO$_2$R$^1$, wherein R$^1$ is a C$_1$ to C$_{10}$ hydrocarbyl group. In yet another aspect, each X independently can be H, BH$_4$, a halide, a C$_1$ to C$_8$ hydrocarbyl group, a C$_1$ to C$_8$ hydrocarboxy group, a C$_1$ to C$_8$ hydrocarbylaminyl group, a C$_1$ to C$_8$ hydrocarbylsilyl group, a C$_1$ to C$_8$ hydrocarbylaminylsilyl group, OBR$^1$$_2$, or OSO$_2$R$^1$, wherein R$^1$ is a C$_1$ to C$_8$ hydrocarbyl group. In still another aspect, each X independently can be a halide or a C$_1$ to C$_{18}$ hydrocarbyl group. For example, each X can be Cl.

In one aspect, each X independently can be H, BH$_4$, a halide, or a C$_1$ to C$_{36}$ hydrocarbyl group, hydrocarboxy group, hydrocarbylaminyl group, hydrocarbylsilyl group, or hydrocarbylaminylsilyl group, while in another aspect, each X independently can be H, BH$_4$, or a C$_1$ to C$_{18}$ hydrocarboxy group, hydrocarbylaminyl group, hydrocarbylsilyl group, or hydrocarbylaminylsilyl group. In yet another aspect, each X independently can be a halide; alternatively, a C$_1$ to C$_{18}$ hydrocarbyl group; alternatively, a C$_1$ to C$_{18}$ hydrocarboxy group; alternatively, a C$_1$ to C$_{18}$ hydrocarbylaminyl group; alternatively, a C$_1$ to C$_{18}$ hydrocarbylsilyl group; or alternatively, a C$_1$ to C$_{18}$ hydrocarbylaminylsilyl group. In still another aspect, each X can be H; alternatively, F; alternatively, Cl; alternatively, Br; alternatively, I; alternatively, BH$_4$; alternatively, a C$_1$ to C$_{18}$ hydrocarbyl group; alternatively, a C$_1$ to C$_{18}$ hydrocarboxy group; alternatively, a C$_1$ to C$_{18}$ hydrocarbylaminyl group; alternatively, a C$_1$ to C$_{18}$ hydrocarbylsilyl group; or alternatively, a C$_1$ to C$_{18}$ hydrocarbylaminylsilyl group.

Each X independently can be, in some aspects, H, a halide, methyl, phenyl, benzyl, an alkoxy, an aryloxy, acetylacetonate, formate, acetate, stearate, oleate, benzoate, an alkylaminyl, a dialkylaminyl, a trihydrocarbylsilyl, or a hydrocarbylaminylsilyl; alternatively, H, a halide, methyl, phenyl, or benzyl; alternatively, an alkoxy, an aryloxy, or acetylacetonate; alternatively, an alkylaminyl or a dialkylaminyl; alternatively, a trihydrocarbylsilyl or hydrocarbylaminylsilyl; alternatively, H or a halide; alternatively, methyl, phenyl, benzyl, an alkoxy, an aryloxy, acetylacetonate, an alkylaminyl, or a dialkylaminyl; alternatively, H; alternatively, a halide; alternatively, methyl; alternatively, phenyl; alternatively, benzyl; alternatively, an alkoxy; alternatively, an aryloxy; alternatively, acetylacetonate; alternatively, an alkylaminyl; alternatively, a dialkylaminyl; alternatively, a trihydrocarbylsilyl; or alternatively, a hydrocarbylaminylsilyl. In these and other aspects, the alkoxy, aryloxy, alkylaminyl, dialkylaminyl, trihydrocarbylsilyl, and hydrocarbylaminylsilyl can be a C$_1$ to C$_{36}$, a C$_1$ to C$_{18}$, a C$_1$ to C$_{12}$, or a C$_1$ to C$_8$ alkoxy, aryloxy, alkylaminyl, dialkylaminyl, trihydrocarbylsilyl, and hydrocarbylaminylsilyl.

Moreover, each X independently can be, in certain aspects, a halide or a C$_1$ to C$_{18}$ hydrocarbyl group; alternatively, a halide or a C$_1$ to C$_8$ hydrocarbyl group; alternatively, F, Cl, Br, I, methyl, benzyl, or phenyl; alternatively, Cl, methyl, benzyl, or phenyl; alternatively, a C$_1$ to C$_{18}$ alkoxy, aryloxy, alkylaminyl, dialkylaminyl, trihydrocarbylsilyl, or hydrocarbylaminylsilyl group; alternatively, a C$_1$ to C$_8$ alkoxy, aryloxy, alkylaminyl, dialkylaminyl, trihydrocarbylsilyl, or hydrocarbylaminylsilyl group; or alternatively, methyl, ethyl, propyl, butyl, pentyl, hexyl, heptyl, octyl, nonyl, decyl, ethenyl, propenyl, butenyl, pentenyl, hexenyl, heptenyl, octenyl, nonenyl, decenyl, phenyl, tolyl, benzyl, naphthyl, trimethylsilyl, triisopropylsilyl, triphenylsilyl, or allyldimethylsilyl.

In formula (II), Cp can be a (substituted or unsubstituted) cyclopentadienyl group, indenyl group, or fluorenyl group; alternatively, a cyclopentadienyl group; or alternatively, an indenyl group. Optionally, Cp can have an alkenyl substituent. In some aspects, Cp can contain no additional substituents, other than the alkenyl substituent. In other aspects, Cp can be further substituted with one substituent, two substituents, and so forth. If present, each substituent on Cp independently can be H, a halide, a C$_1$ to C$_{36}$ hydrocarbyl group, a C$_1$ to C$_{36}$ halogenated hydrocarbyl group, a C$_1$ to C$_{36}$ hydrocarboxy group, or a C$_1$ to C$_{36}$ hydrocarbylsilyl group. Importantly, each substituent on Cp can be either the same or a different substituent group. Moreover, each substituent can be at any position on the cyclopentadienyl/indenyl/fluorenyl ring structure that conforms with the rules of chemical valence. In general, any substituent on Cp, independently, can be H or any halide, C$_1$ to C$_{36}$ hydrocarbyl group, C$_1$ to C$_{36}$ halogenated hydrocarbyl group, C$_1$ to C$_{36}$ hydrocarboxy group, or C$_1$ to C$_{36}$ hydrocarbylsilyl group described herein. In addition to representative substituents that are disclosed herein, additional suitable hydrocarbyl groups, halogenated hydrocarbyl groups, hydrocarboxy groups, and hydrocarbylsilyl groups are disclosed, for example, in U.S. Pat. No. 9,758,600, incorporated herein by reference in its entirety.

In one aspect, for example, each substituent on Cp independently can be a C$_1$ to C$_{12}$ hydrocarbyl group or a C$_1$ to C$_{12}$ hydrocarbylsilyl group. In another aspect, each substituent on Cp independently can be a C$_1$ to C$_8$ alkyl group or a C$_3$ to C$_8$ alkenyl group. In yet another aspect, each substituent on Cp independently can be H, Cl, CF$_3$, a methyl group, an ethyl group, a propyl group, a butyl group, a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a tolyl group, a benzyl group, a naphthyl group, a trimethylsilyl group, a triisopropylsilyl group, a triphenylsilyl group, or an allyldimethylsilyl group.

Similarly, R$^X$ and R$^Y$ in formula (II) independently can be H or any halide, C$_1$ to C$_{36}$ hydrocarbyl group, C$_1$ to C$_{36}$ halogenated hydrocarbyl group, C$_1$ to C$_{36}$ hydrocarboxy group, or C$_1$ to C$_{36}$ hydrocarbylsilyl group disclosed herein. In one aspect, for example, R$^X$ and R$^Y$ independently can be H or a C$_1$ to C$_{12}$ hydrocarbyl group. In another aspect, R$^X$ and R$^Y$ independently can be a C$_1$ to C$_{10}$ hydrocarbyl group or, alternatively, a C$_1$ to C$_6$ alkyl group. In yet another aspect, R$^X$ and R$^Y$ independently can be H, Cl, CF$_3$, a methyl group, an ethyl group, a propyl group, a butyl group (e.g., t-Bu), a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a tolyl group, a benzyl group, a naphthyl group, a trimethylsilyl group, a triisopropylsilyl group, a triphenylsilyl group, or an allyldimethylsilyl group, and the like. In still another aspect, R$^X$ and R$^Y$ independently can be a methyl group, an ethyl group, a propyl group, a butyl group, a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a tolyl group, or a benzyl group.

Bridging group E in formula (II) can be a bridging group having the formula $>E^A R^A R^B$, wherein $E^A$ can be C or Si or B, and $R^A$ and $R^B$ independently can be H or a $C_1$ to $C_{18}$ hydrocarbyl group. In some aspects of this invention, $R^A$ and $R^B$ independently can be a $C_1$ to $C_{12}$ hydrocarbyl group; alternatively, $R^A$ and $R^B$ independently can be a $C_1$ to $C_8$ hydrocarbyl group; alternatively, $R^A$ and $R^B$ independently can be a phenyl group, a $C_1$ to $C_8$ alkyl group, or a $C_3$ to $C_8$ alkenyl group; alternatively, $R^A$ and $R^B$ independently can be a methyl group, an ethyl group, a propyl group, a butyl group, a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a cyclohexylphenyl group, a naphthyl group, a tolyl group, or a benzyl group; or alternatively, $R^A$ and $R^B$ independently can be a methyl group, an ethyl group, a propyl group, a butyl group, a pentyl group, a hexyl group, a propenyl group, a butenyl group, a pentenyl group, a hexenyl group, a phenyl group, or a benzyl group. In these and other aspects, $R^A$ and $R^B$ can be either the same or different.

Illustrative and non-limiting examples of single-atom bridged metallocene compounds having formula (II) and/or suitable for use in the first process can include the following compounds (Me=methyl, Ph=phenyl; t-Bu=tert-butyl; MET15 and MET16 are representative bridged metallocene compounds used in the Examples):

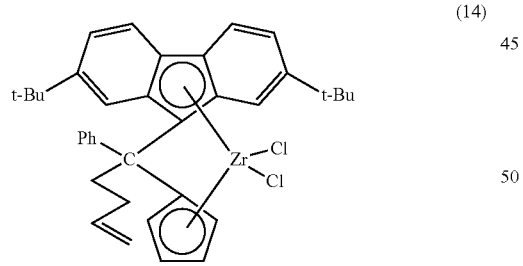

(14)

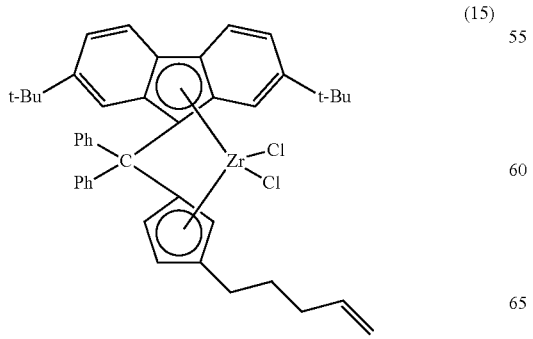

(15)

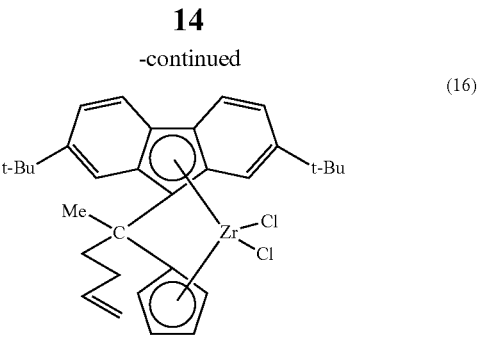

(16)

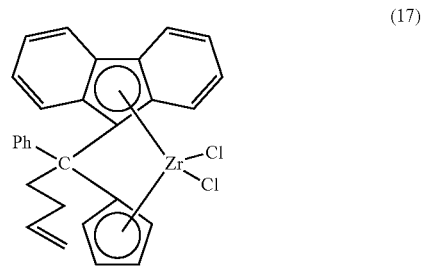

(17)

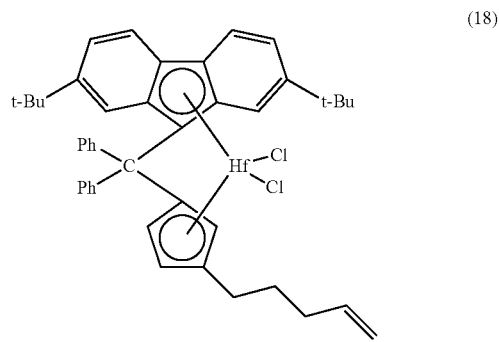

(18)

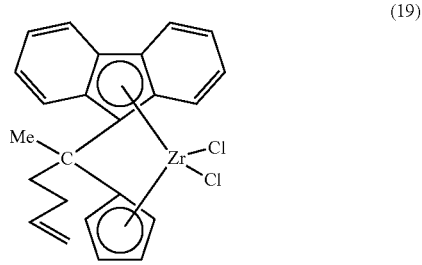

(19)

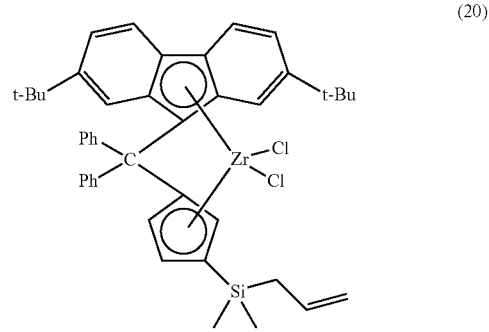

(20)

-continued

(21)
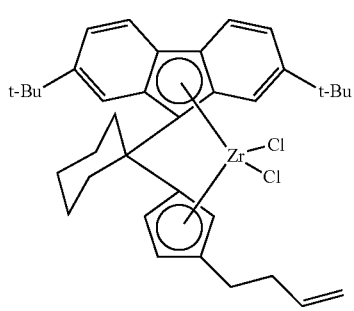

(22)
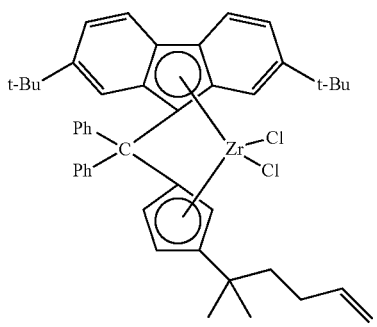

(23)
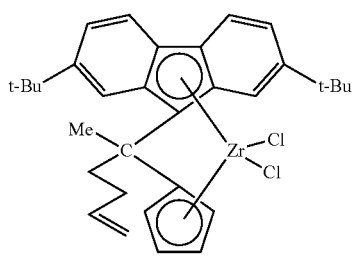

(24)
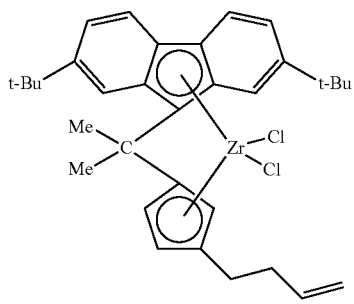

(25)
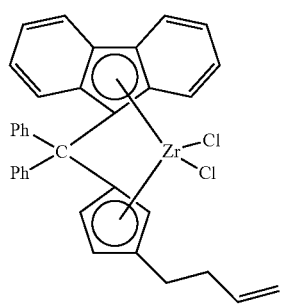

and the like, as well as combinations thereof.

The metallocene compound is not limited solely to the single-atom bridged metallocene compounds such as described above. Other suitable bridged metallocene compounds are disclosed in U.S. Pat. Nos. 7,026,494, 7,041,617, 7,226,886, 7,312,283, 7,517,939, and 7,619,047, which are incorporated herein by reference in their entirety.

If the metallocene compound is a two carbon atom bridged metallocene compound, the bridging group can have the formula —$CR^C R^D$—$CR^E R^F$—, wherein $R^C$, $R^D$, $R^E$, and $R^F$ independently can be H or any $C_1$ to $C_{18}$ hydrocarbyl group disclosed herein (and similarly for a two silicon atom bridge). For instance, $R^C$, $R^D$, $R^E$, and $R^F$ independently can be H or a $C_1$ to $C_6$ alkyl group, or alternatively, H or a methyl group.

Illustrative and non-limiting examples of other bridged metallocene compounds suitable for use in the first process can include the following compounds:

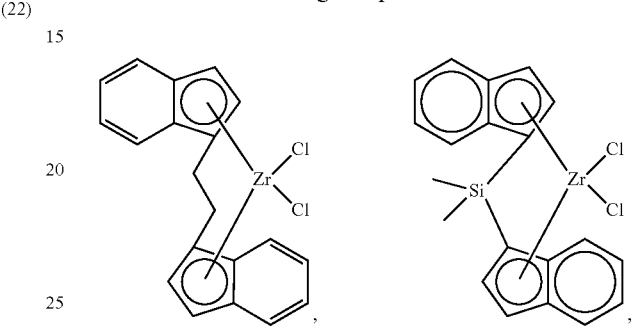

and the like, as well a combination thereof.

The metallocene compound is not limited solely to these bridged metallocene compounds such as described above. Other suitable metallocene compounds are disclosed in U.S. Pat. Nos. 8,288,487 and 8,426,538, which are incorporated herein by reference in their entirety.

Additionally, the metallocene compound used in the first process (the slurry polymerization process) should be a metallocene compound that readily and efficiently incorporates comonomer. This becomes more important as the density is decreased to below 0.90 g/cm³, below 0.89 g/cm³, below 0.88 g/cm³, and so forth, since more comonomer is required. This metric can be quantified by the metallocene compound having a comonomer incorporation efficiency (for the α-olefin comonomer) of at least about 1% at the polymerization temperature. The methodology for determining the comonomer incorporation efficiency is discussed in the examples that follow.

As more comonomer is incorporated (and lower density polymers are produced), it can be beneficial to have higher comonomer incorporation efficiencies. Thus, in some aspects, the metallocene compound in the catalyst composition utilized in the first process (the slurry polymerization process) can be characterized by a comonomer incorporation efficiency of at least about 1.25%, at least about 1.5%, at least about 1.75%, at least about 2%, or at least about 2.5%, and often up to about 4%, about 5%, about 6%, or about 8%. As above, this is determined at the temperature of polymerization.

Referring now to the second process, the solution polymerization process for producing a low density ethylene-based polymer can comprise contacting a catalyst composition with ethylene and an α-olefin comonomer in a hydrocarbon solvent in a solution reactor at a polymerization temperature in a range from about 120° C. to about 160° C. to produce the ethylene-based polymer. While the catalyst composition contains a chemically-treated solid oxide that will not be in "solution" at the polymerization temperature, this process is termed a solution process because the polymer produced is expected to dissolve in the hydrocarbon solvent at the temperature of polymerization. In some aspects, the polymerization temperature can range from about 120 to about 160° C. or from about 125° C. to about 155° C., while in other aspects, the polymerization temperature can fall within a range from about 130° C. to about 160° C. or from about 140° C. to about 160° C. As the polymer density decreases, generally lower polymerization temperatures are needed to maintain the polymer in solution.

Any suitable hydrocarbon solvent can be used, such as a $C_5$-$C_{10}$ hydrocarbon (e.g., alkane or cycloalkane) solvent. Typical hydrocarbon solvents can include, but are not limited to, cyclohexane, n-pentane, isopentane, neopentane, n-hexane, and the like, as well as combinations thereof. Other suitable hydrocarbon solvents can include the Soltrol® family of isoparaffin solvents, such as, for example, Soltrol® 10, Soltrol® 100, Soltrol® 125, Soltrol® 130, Soltrol® 170, Soltrol® 220, and the like, as well as mixtures thereof. These materials are available from Chevron Phillips Chemical Company LP.

The average residence time in the solution reactor generally falls within a range from about 5 to about 90 min, such as from about 5 to about 30 min; alternatively, from about 10 to about 75 min; or alternatively, from about 10 to about 45 min. While the polymer content in the solution reactor can range from about 10 to about 50 wt. %, more often the polymer content ranges from about 20 to about 50 wt. %, or from about 25 to about 45 wt. %.

While not particularly limited, the comonomer concentration in the solution reactor can range from about 0.1 to about 10 mol %, and more often from about 0.35 to about 7 mol %, from about 0.6 to about 5 mol %, or from about 1 to about 3 mol %. The comonomer concentration is based on the total reactor liquid contents which thus includes the hydrocarbon solvent. The ethylene concentration (also based on total reactor liquid contents) can vary significantly based on the desired polymer density, but typically falls in a range from about 2 to about 35 mol % in one aspect, from about 3 to about 30 mol % in another aspect, from about 4 to about 25 mol % in yet another aspect, and from about 5 to about 20 mol % in still another aspect. Likewise, the comonomer:ethylene molar ratio can vary significantly based on the desired polymer density, and typical ranges can include from about 0.01:1 to about 1:1, from about 0.05:1 to about 0.7:1, from about 0.08:1 to about 0.4:1, or from about 0.1:1 to about 0.3:1, and the like.

Similar to the first process (slurry polymerization), as more comonomer is incorporated (and lower density polymers are produced), it can be beneficial to have higher comonomer incorporation efficiencies in the second process (solution polymerization). However, due to the higher polymerization temperature in the second process, the metallocene compound in the catalyst composition utilized in the solution polymerization process can be characterized by a comonomer incorporation efficiency (for the α-olefin comonomer) of at least about 10%, at least about 15%, at least about 20%, or at least about 25%, and often up to 40%, up to 50%, up to 60%, or up to 70%. This is determined at the temperature of polymerization.

Also due to the higher polymerization temperature, it can be beneficial for the metallocene compound to be a metallocene compound that typically produces higher molecular weight polymer, such as metallocene compounds that contain titanium or hafnium (as opposed to zirconium), although not limited thereto. In one aspect, the metallocene compound can have a fluorenyl group and a cyclopentadienyl group, while in another aspect, the metallocene compound can have two indenyl groups or two fluorenyl groups, and in yet another aspect, the metallocene compound can have an indenyl group and a fluorenyl group. Any fluorenyl group or cyclopentadienyl group or indenyl group can be substituted or unsubstituted. Further, the metallocene compound can be bridged (e.g., a single atom bridge or two atom bridge) or unbridged (e.g., a titanium half-sandwich metallocene compound).

Referring now to the third process, the gas phase polymerization process for producing a low density ethylene-based polymer can comprise contacting a catalyst composition with ethylene and an α-olefin comonomer in a gas phase reactor containing an inert gas and a $C_4$-$C_8$ alkane at a polymerization temperature in a range from about 48° C. to about 82° C. to produce the ethylene-based polymer. In some aspects, the polymerization temperature can range from about 48 to about 70° C. or from about 50° C. to about 75° C., while in other aspects, the polymerization temperature can fall within a range from about 58° C. to about 82° C. or from about 58° C. to about 70° C. The polymerization temperature generally decreases as the polymer density decreases to prevent polymer sticking, agglomeration, etc., in the reactor.

The inert gas typically encompasses any gas that stays in the gas phase in the reactor, and suitable inert gasses include, for instance, nitrogen, ethane, propane, and the like, as well as combinations thereof. The $C_4$-$C_8$ alkane is often referred to as the condensable agent, and encompassed herein are butane (e.g., n-butane and/or isobutane), pentane (e.g., n-pentane and/or isopentane), hexane, and the like; combinations of more than one alkane can be used.

In the gas phase reactor, the ratio of heavy hydrocarbon partial pressure to vapor pressure (ratio of P/P*) can be less than or equal to about 0.95. The ratio of P/P* is the combined ratio (summation) of each hydrocarbon partial pressure divided by its vapor pressure. As an example when the condensable agent is n-butane and the comonomer is 1-hexene, the ratio of P/P* equals {the n-butane partial pressure (reactor pressure times vol % of n-butane) divided by the vapor pressure of n-butane at the polymerization temperature}+{the 1-hexene partial pressure (reactor pressure times vol % of 1-hexene) divided by the vapor pressure of 1-hexene at the polymerization temperature}. If other heavy hydrocarbons and/or condensable agents are present, they are also included. Inert gasses, whether hydrocarbon or not, are not included because the polymerization reaction temperature exceeds their critical temperatures.

As polymer density decreases, it can be beneficial to have lower values of the ratio of P/P* in the gas phase reactor. In one aspect, the ratio of P/P* can be less than or equal to about 0.9, while in another aspect, the ratio of P/P* can be less than or equal to about 0.85, and in yet another aspect, the ratio of P/P* can less than or equal to about 0.8. Typical minimum values for P/P* include about 0.75, about 0.7, and about 0.65.

Consistent with aspects of this invention, the $C_4$-$C_8$ alkane concentration in the gas phase reactor can range from about 5 to about 30 vol %, based on the reactor contents. For example, the $C_4$-$C_8$ alkane concentration can fall in the range from about 10 to about 30 vol %, or from about 15 to about 25 vol %. Due to lower polymer density and heat transfer limitations, it can be beneficial to have a higher alkane (or condensable agent) content in the reactor (and less nitrogen).

Likewise, it can also be beneficial for the carrier for the catalyst composition into the gas phase reactor to be a hydrocarbon (e.g., not nitrogen). Illustrative and non-limiting examples of suitable carriers include ethane, propane, butane, pentane, hexane, and the like, as well as combinations thereof.

Beneficially, for improved fluidization, the particle size of the chemically-treated solid oxide should be controlled. For example, for a fluidized bed gas-phase reactor, the chemically-treated solid oxide should have an average particle size in a range from about 30 to about 250 µm, and more often, from about 40 to about 150 µm, or from about 50 to about 100 µm. Optionally, due to the lower density and high propensity for polymer sticking and agglomeration, the fluidization velocity can be increased over typical velocities of less than 2.0 ft/sec (e.g., 1.7 ft/sec). In particular, the fluidization velocity can be from about 2.0 to about 3.0 ft/sec in one aspect, and from about 2.1 to about 2.4 ft/sec in another aspect, and from about 2.2 to about 2.6 ft/sec in yet another aspect.

Due to greater particle to fluid heat transfer limitations in the gas phase as compared to slurry, the relative amount of the transition metal to the solid oxide should be lower for the gas phase process. In one aspect, for instance, the weight of transition metal (of the metallocene compound) based on the weight of the chemically-treated solid oxide can be in a range from about 50 to about 5000 ppm (by weight), from about 100 to about 2000 ppm in another aspect, and from about 150 to about 1000 ppm in yet another aspect.

The metallocene compound used in the gas phase process can be any metallocene disclosed herein as being suitable for the slurry polymerization process or any metallocene disclosed herein as being suitable for the solution polymerization process. Similar to both slurry and solutions processes, it is beneficial for the catalyst system utilized in the gas phase process to have a high comonomer incorporation efficiency.

As it pertains to the first process, the second process, and the third process, the ethylene polymer produced can have a density of less than or equal to about 0.91 g/cm$^3$. In many instance, the ethylene polymer produced can have a density of less than or equal to about 0.90 g/cm$^3$; alternatively, less than or equal to about 0.89 g/cm$^3$; or alternatively, less than or equal to about 0.88 g/cm$^3$. Illustrative and non-limiting ranges for the density of the ethylene polymer can include from about 0.86 to about 0.91 g/cm$^3$, from about 0.865 to about 0.905 g/cm$^3$, or from about 0.87 to about 0.89 g/cm$^3$, and the like.

The first process, the second process, and the third process can utilize any suitable α-olefin comonomer to produce the low density ethylene-based polymer (e.g., an ethylene copolymer or ethylene terpolymer). For instance, the comonomer can comprise propylene, 1-butene, 1-pentene, 4-methyl-1-pentene, 1-hexene, 1-octene, or a mixture thereof; alternatively, propylene; alternatively, 1-butene; alternatively, 1-pentene; alternatively, 4-methyl-1-pentene; alternatively, 1-hexene; or alternatively, 1-octene. Certain comonomers may be more commonly used in certain polymerization processes, e.g., 1-butene and 1-hexene often are used in gas phase processes.

With the disclosed densities and comonomers, it is typical for the ethylene polymer to have at least 15 short chain branches (SCBs) per 1000 total carbon atoms. More often, the ethylene polymer contains at least about 20 SCBs or at least about 25 SCBs, and this can range up to about 50 SCBs or up to about 60 SCBs, per 1000 total carbon atoms.

The catalyst composition in the these processes can comprise a metallocene compound, a chemically-treated solid oxide, and optionally, a co-catalyst. The catalyst composition can contain one or more metallocene compounds (e.g., two metallocene compounds), one or more chemically-treated solid oxides, and one or more co-catalysts.

The chemically-treated solid oxide can comprise a solid oxide treated with an electron-withdrawing anion. Examples of such materials are disclosed in, for instance, U.S. Pat. Nos. 7,294,599, 7,601,665, 7,884,163, 8,309,485, 8,623,973, and 9,023,959, which are incorporated herein by reference in their entirety. For instance, the chemically-treated solid oxide can comprise fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided-chlorided silica-coated alumina, fluorided silica-coated alumina, sulfated silica-coated alumina, or phosphated silica-coated alumina, and the like, as well as any combination thereof. In some aspects, the chemically-treated solid oxide can comprise a fluorided solid oxide (e.g., fluorided silica-coated alumina) and/or a sulfated solid oxide (e.g., sulfated alumina).

Various processes can be used to form chemically-treated solid oxide useful in the present invention. Methods of contacting the solid oxide with the electron-withdrawing component, suitable electron withdrawing components and addition amounts, impregnation with metals or metal ions (e.g., zinc, nickel, vanadium, titanium, silver, copper, gallium, tin, tungsten, molybdenum, zirconium, and the like, or combinations thereof), and various calcining procedures and conditions are disclosed in, for example, U.S. Pat. Nos. 6,107,230, 6,165,929, 6,294,494, 6,300,271, 6,316,553, 6,355,594, 6,376,415, 6,388,017, 6,391,816, 6,395,666, 6,524,987, 6,548,441, 6,548,442, 6,576,583, 6,613,712, 6,632,894, 6,667,274, 6,750,302, 7,294,599, 7,601,665, 7,884,163, and 8,309,485, which are incorporated herein by reference in their entirety. Other suitable processes and procedures for preparing chemically-treated solid oxide (e.g., fluorided solid oxides, sulfated solid oxides, etc.) are well known to those of skill in the art.

When present, the co-catalyst can include, but is not limited to, metal alkyl, or organometal, co-catalysts, with the metal encompassing boron, aluminum, zinc, and the like. Optionally, the catalyst systems provided herein can comprise a co-catalyst, or a combination of co-catalysts. For instance, alkyl boron, alkyl aluminum, and alkyl zinc compounds often can be used as co-catalysts in such catalyst systems. Representative boron compounds can include, but are not limited to, tri-n-butyl borane, tripropylborane, tri-ethylborane, and the like, and this include combinations of two or more of these materials. While not being limited thereto, representative aluminum compounds (e.g., organoaluminum compounds) can include trimethylaluminum (TMA), triethylaluminum (TEA), tri-n-propylaluminum (TNPA), tri-n-butylaluminum (TNBA), triisobutylaluminum (TIBA), tri-n-hexylaluminum, tri-n-octylaluminum, diisobutylaluminum hydride, diethylaluminum ethoxide, diethylaluminum chloride, and the like, as well as any combination thereof. Exemplary zinc compounds (e.g., organozinc compounds) that can be used as co-catalysts can include, but are not limited to, dimethylzinc, diethylzinc, dipropylzinc, dibutylzinc, dineopentylzinc, di(trimethylsilyl)zinc, di(triethylsilyl)zinc, di(triisoproplysilyl)zinc, di(triphenylsilyl)zinc, di(allyldimethylsilyl)zinc, di(trimethylsilylmethyl)zinc, and the like, or combinations thereof. Accordingly, in an aspect of this invention, the catalyst composition can comprise the metallocene compound, the chemically-treated solid oxide, and the organoaluminum co-catalyst.

In another aspect of the present invention, a catalyst composition is provided that comprises the metallocene compound, the chemically-treated solid oxide, and the organoaluminum compound, wherein this catalyst composition is substantially free of aluminoxanes, organoboron or organoborate compounds, ionizing ionic compounds, and/or other similar materials; alternatively, substantially free of aluminoxanes; alternatively, substantially free or organoboron or organoborate compounds; or alternatively, substantially free of ionizing ionic compounds. In these aspects, the catalyst composition has catalyst activity, discussed herein, in the absence of these additional materials. For example, a catalyst composition of the present invention can consist essentially of the metallocene compound, the chemically-treated solid oxide, and the organoaluminum co-catalyst, wherein no other materials are present in the catalyst composition which would increase/decrease the activity of the catalyst composition by more than about 10% from the catalyst activity of the catalyst composition in the absence of said materials.

Catalyst compositions of the present invention generally have a catalyst activity greater than about 250 grams of ethylene polymer (copolymer or terpolymer, as the context requires) per gram of chemically-treated solid oxide per hour (abbreviated g/g/hr). In another aspect, the catalyst activity can be greater than about 350, greater than about 450, or greater than about 550 g/g/hr. Yet, in another aspect, the catalyst activity can be greater than about 700 g/g/hr, greater than about 1000 g/g/hr, or greater than about 2000 g/g/hr, and often as high as 3500-6000 g/g/hr. Illustrative and non-limiting ranges for the catalyst activity include from about 500 to about 5000, from about 750 to about 4000, or from about 1000 to about 3500 g/g/hr, and the like. These activities are measured under slurry polymerization conditions, with a triisobutylaluminum co-catalyst, using isobutane as the diluent, at a polymerization temperature of about 95° C. and a reactor pressure of about 590 psig. Moreover, in some aspects, the chemically-treated solid oxide can comprise sulfated alumina, fluorided silica-alumina, or fluorided silica-coated alumina, although not limited thereto.

This invention further encompasses methods of making these catalyst compositions, such as, for example, by contacting the respective catalyst components in any order or sequence. In one aspect, the catalyst composition can be produced by a process comprising contacting, in any order, the metallocene compound, the chemically-treated solid oxide, and the co-catalyst.

The processes disclosed herein are described in reference to a particular reactor type (slurry, solution, gas phase), but the process can employ two or more reactors. Production of polymers in multiple reactors can include several stages in at least two separate polymerization reactors interconnected by a transfer device making it possible to transfer the polymers resulting from the first polymerization reactor into the second reactor. The desired polymerization conditions in one of the reactors can be different from the operating conditions of the other reactor(s). Alternatively, polymerization in multiple reactors can include the manual transfer of polymer from one reactor to subsequent reactors for continued polymerization. Multiple reactor systems can include any combination including, but not limited to, multiple loop reactors, multiple gas phase reactors, a combination of loop and gas phase reactors, or a combination of solution with loop and/or gas phase reactors. The multiple reactors can be operated in series, in parallel, or both. Accordingly, the present invention encompasses polymerization reactor systems comprising a single reactor, comprising two reactors, and comprising more than two reactors. Thus, the polymerization reactor system can comprise an individual slurry reactor, gas-phase reactor, or solution reactor in certain aspects of this invention, as well as multi-reactor combinations thereof.

The polymerization reactor system can further comprise any combination of at least one raw material feed system, at least one feed system for catalyst or catalyst components, and/or at least one polymer recovery system. Suitable reactor systems can further comprise systems for feedstock purification, catalyst storage and preparation, extrusion, reactor cooling, polymer recovery, fractionation, recycle, storage, loadout, laboratory analysis, and process control. Depending upon the desired properties of the ethylene polymer, hydrogen can be added to the polymerization reactor as needed (e.g., continuously, pulsed, etc.).

Polymerization conditions that can be controlled for efficiency and to provide desired polymer properties can include temperature, pressure, and the concentrations of various reactants. Polymerization temperature can affect catalyst productivity, polymer molecular weight, and molecular weight distribution. Various polymerization conditions can be held substantially constant, for example, for the production of a particular grade of the ethylene polymer).

Suitable pressures will also vary according to the reactor and polymerization type. The pressure for liquid phase polymerizations in a loop reactor is typically less than 1000 psig (6.9 MPa). Pressure for gas phase polymerization is usually at about 200 to 500 psig (1.4 MPa to 3.4 MPa).

Ethylene Polymers

The polymers disclosed herein are ethylene-based polymers, or ethylene polymers, encompassing copolymers, terpolymers, etc., of ethylene and at least one olefin comonomer. In one aspect, the ethylene polymer of this invention can comprise an ethylene/α-olefin copolymer. For example, the ethylene polymer can comprise an ethylene/1-butene copolymer, an ethylene/1-hexene copolymer, an ethylene/1-octene copolymer, or any combination thereof; alternatively, an ethylene/1-butene copolymer; alternatively, an ethylene/1-hexene copolymer; or alternatively, an ethylene/1-octene copolymer.

An illustrative and non-limiting example of an ethylene polymer (e.g., an ethylene copolymer) of the present invention can have a density of less than or equal to about 0.91 g/cm$^3$, a CY-a parameter of less than or equal to about 0.2, and a ratio of HLMI/MI (ratio of high load melt index (HLMI) to melt index (MI)) of at least about 30. In some aspects, the CY-a parameter can be in a range from about 0.02 to about 0.2, from about 0.03 to about 0.19, from about 0.04 to about 0.18, less than or equal to about 0.14, or less than or equal to about 0.1. In some aspects, the ratio of HLMI/MI can be at least about 40, at least about 60, at least about 80, or at least about 100, and often can range up to 125, up to 150, or up to 200. While not being limited thereto, the ethylene polymer can have a melt index (MI) in a range from about 0.01 to about 10 g/10 min, from about 0.1 to about 5 g/10 min, or from about 0.4 to about 4 g/10 min. Additionally or alternatively, the ethylene polymer can have a HLMI in a range from about 5 to about 100 g/10 min, from about 18 to 70 g/10 min, or from about 30 to about 40 g/10 min.

Another illustrative and non-limiting example of an ethylene polymer (e.g., an ethylene copolymer) of the present invention can have a density of less than or equal to about 0.91 g/cm$^3$, a CY-a parameter in a range from about 0.25 to about 0.75, and a ratio of Mw/Mn in a range from about 2 to about 3. In some aspects, the CY-a parameter can be in a range from about 0.28 to about 0.75, from about 0.3 to about 0.6, or from about 0.4 to about 0.65. In some aspects, the ratio of Mw/Mn can fall within a range from about 2.1 to about 2.9, from about 2.1 to about 2.7, from about 2.2 to about 3, or from about 2.2 to about 2.7. While not being limited thereto, the ethylene polymer can have a ratio of HLMI/MI of less than or equal to about 27, less than or equal to about 25, less than or equal to about 22, or less than or equal to about 20, and often at least about 10, 12, or 15. Additionally or alternatively, the ethylene polymer can have a ratio of Mz/Mw that often ranges from about 1.5 to about 3, from about 1.5 to about 2.5, from about 1.5 to about 2.2, or from about 1.5 to about 2.

These ethylene polymers also can have any of the polymer properties listed below and in any combination, unless indicated otherwise.

The densities of ethylene-based polymers disclosed herein are less than or equal to about 0.91 g/cm³, and often can be less than or equal to about 0.90 g/cm³; alternatively, less than or equal to about 0.89 g/cm³; or alternatively, less than or equal to about 0.88 g/cm³. Illustrative and non-limiting ranges for the density of the ethylene polymer can include from about 0.86 to about 0.91 g/cm³, from about 0.865 to about 0.905 g/cm³, or from about 0.87 to about 0.89 g/cm³, and the like.

These ethylene polymers can have at least 15 short chain branches (SCBs) per 1000 total carbon atoms, and often at least about 20 SCBs or at least about 25 SCBs. Typically, the amount of SCBs can range up to about 50 SCBs or up to about 60 SCBs, per 1000 total carbon atoms. Thus, illustrative and non-limiting ranges include from about 20 to about 60 SCBs, from about 18 to about 55 SCBs, from about 25 to about 50 SCBs, per 1000 total carbon atoms, and the like.

In further aspects, these ethylene polymers can have either an increasing SCBD or a substantially flat SCBD (short chain branching distribution). As to the former, in an increasing SCBD, also referred to as a reverse comonomer distribution, generally, the higher molecular weight components of the polymer have higher comonomer incorporation than the lower molecular weight components: there is a generally increasing comonomer incorporation with increasing molecular weight. In one aspect, the number of short chain branches (SCBs) per 1000 total carbon atoms of the polymer can be greater at Mw than at Mn. In another aspect, the number of SCBs per 1000 total carbon atoms of the polymer can be greater at Mz than at Mw. In yet another aspect, the number of SCBs per 1000 total carbon atoms of the polymer can be greater at Mz than at Mn.

Alternatively, these ethylene polymers can have a flat SCBD (uniform comonomer distribution). A flat SCBD can be characterized by a slope of a plot of the number of short chain branches (SCBs) per 1000 total carbon atoms versus the logarithm of molecular weight of the ethylene polymer (determined via linear regression over the range from D15 to D85) that is in a range from about −0.6 to about 0.6, and/or a percentage of data points deviating from the average short chain branch content by greater than 0.5 SCBs per 1000 total carbon atoms (determined over the range from D15 to D85) that is less than or equal to about 20%, and/or a percentage of data points deviating from the average short chain branch content by greater than 1 SCB per 1000 total carbon atoms (determined over the range from D15 to D85) that is less than or equal to about 10%. Polymers having a flat or uniform SCBD are disclosed, for example, in U.S. Pat. Nos. 9,217,049 and 9,574,031, which are incorporated herein by reference in their entirety.

In an aspect, the ethylene polymer can be a reactor product (e.g., a single reactor product), for example, not a post-reactor blend of two polymers, for instance, having different molecular weight characteristics. As one of skill in the art would readily recognize, physical blends of two different polymer resins can be made, but this necessitates additional processing and complexity not required for a reactor product. Additionally, the ethylene polymer can further contain any suitable additive, non-limiting examples of which include an antioxidant, an acid scavenger, an antiblock additive, a slip additive, a colorant, a filler, a polymer processing aid, a UV additive, and the like, as well as any combination thereof.

Moreover, the ethylene polymers can be produced with a metallocene catalyst system as discussed herein. Ziegler-Natta and chromium based catalysts systems are not required. Therefore, in some aspects, the ethylene polymer can contain no measurable amount of chromium, magnesium, vanadium, or titanium (catalyst residue), i.e., less than 0.1 ppm by weight. In some aspects, the ethylene polymer can contain, independently, less than 0.08 ppm, less than 0.05 ppm, or less than 0.03 ppm, of chromium; additionally or alternatively, of magnesium; additionally or alternatively, of vanadium; or additionally or alternatively, of titanium.

Articles and Products

Articles of manufacture can be formed from, and/or can comprise, the ethylene polymers of this invention and, accordingly, are encompassed herein. For example, articles which can comprise the polymers of this invention can include, but are not limited to, an agricultural film, an automobile part, a bottle, a container for chemicals, a drum, a fiber or fabric, a food packaging film or container, a food service article, a fuel tank, a geomembrane, a household container, a liner, a molded product, a medical device or material, an outdoor storage product (e.g., panels for walls of an outdoor shed), outdoor play equipment (e.g., kayaks, bases for basketball goals), a pipe, a sheet or tape, a toy, or a traffic barrier, and the like. Various processes can be employed to form these articles. Non-limiting examples of these processes include injection molding, blow molding, rotational molding, film extrusion, sheet extrusion, profile extrusion, thermoforming, and the like. Additionally, additives and modifiers often are added to these polymers in order to provide beneficial polymer processing or end-use product attributes. Such processes and materials are described in *Modern Plastics Encyclopedia*, Mid-November 1995 Issue, Vol. 72, No. 12; and *Film Extrusion Manual—Process, Materials, Properties*, TAPPI Press, 1992; the disclosures of which are incorporated herein by reference in their entirety. In some aspects of this invention, an article of manufacture can comprise any of ethylene polymers described herein, and the article of manufacture can be or can comprise a film or a molded product.

Also contemplated herein is a method for forming or preparing an article of manufacture comprising any polymer disclosed herein. For instance, a method can comprise (i) contacting a catalyst composition with an ethylene and an olefin comonomer under polymerization conditions in a polymerization reactor system to produce an ethylene polymer, wherein the catalyst composition can comprise a metallocene compound, a chemically-treated solid oxide, and an optional co-catalyst (e.g., an organoaluminum compound); and (ii) forming an article of manufacture comprising the ethylene polymer. The forming step can comprise blending, melt processing, extruding, molding (e.g., injection molding or blow molding), or thermoforming, and the like, including combinations thereof. Any suitable additive can be combined with the polymer in the melt processing step (extrusion step), such as antioxidants, acid scavengers, antiblock additives, slip additives, colorants, fillers, processing aids, UV inhibitors, and the like, as well as combinations thereof.

EXAMPLES

The invention is further illustrated by the following examples, which are not to be construed in any way as imposing limitations to the scope of this invention. Various other aspects, embodiments, modifications, and equivalents thereof which, after reading the description herein, may suggest themselves to one of ordinary skill in the art without departing from the spirit of the present invention or the scope of the appended claims.

Melt index (MI, g/10 min) was determined in accordance with ASTM D1238 at 190° C. with a 2,160 gram weight, and high load melt index (HLMI, g/10 min) was determined in accordance with ASTM D1238 at 190° C. with a 21,600 gram weight. Density was determined in grams per cubic centimeter (g/cm$^3$) on a compression molded sample, cooled at 15° C. per hour, and conditioned for 40 hours at room temperature in accordance with ASTM D1505 and ASTM D4703.

Molecular weights and molecular weight distributions were obtained using a PL-GPC 220 (Polymer Labs, an Agilent Company) system equipped with a IR4 detector (Polymer Char, Spain) and three Styragel HMW-6E GPC columns (Waters, Mass.) running at 145° C. The flow rate of the mobile phase 1,2,4-trichlorobenzene (TCB) containing 0.5 g/L 2,6-di-t-butyl-4-methylphenol (BHT) was set at 1 mL/min, and polymer solution concentrations were in the range of 1.0-1.5 mg/mL, depending on the molecular weight. Sample preparation was conducted at 150° C. for nominally 4 hr with occasional and gentle agitation, before the solutions were transferred to sample vials for injection. An injection volume of about 400 µL was used. The integral calibration method was used to deduce molecular weights and molecular weight distributions using a Chevron Phillips Chemical Company's HDPE polyethylene resin, MARLEX® BHB5003, as the standard. The integral table of the standard was pre-determined in a separate experiment with SEC-MALS. Mn is the number-average molecular weight, Mw is the weight-average molecular weight, Mz is the z-average molecular weight, and Mp is the peak molecular weight (location, in molecular weight, of the highest point of the molecular weight distribution curve).

Melt rheological characterizations were performed as follows. Small-strain (less than 10%) oscillatory shear measurements were performed on an Anton Paar MCR rheometer using parallel-plate geometry. All rheological tests were performed at 190° C. The complex viscosity |η*| versus frequency (ω) data were then curve fitted using the modified three parameter Carreau-Yasuda (CY) empirical model to obtain the zero shear viscosity—$\eta_0$, characteristic viscous relaxation time—$\tau_\eta$, and the breadth parameter—a (CY-a parameter). The simplified Carreau-Yasuda (CY) empirical model is as follows.

$$|\eta^*(\omega)| = \frac{\eta_0}{[1 + (\tau_\eta \omega)^a]^{(1-n)/a}},$$

wherein: |η*(ω)|=magnitude of complex shear viscosity;
$\eta_0$=zero shear viscosity;
$\tau_0$=viscous relaxation time (Tau(η));
a="breadth" parameter (CY-a parameter);
n=fixes the final power law slope, fixed at 2/11; and
ω=angular frequency of oscillatory shearing deformation.

Details of the significance and interpretation of the CY model and derived parameters can be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids, Volume* 1, *Fluid Mechanics,* 2nd Edition, John Wiley & Sons (1987); each of which is incorporated herein by reference in its entirety.

Metals content, such as the amount of catalyst residue in the ethylene polymer or the article of manufacture (on a ppm basis), can be determined by ICP analysis on a PerkinElmer Optima 8300 instrument. Polymer samples can be washed in a Thermolyne furnace with sulfuric acid overnight, followed by acid digestion in a HotBlock with HCl and $HNO_3$ (3:1 v:v).

Some of the examples shown below were made in a lab batch reactor, and others in a continuous loop pilot plant reactor. In the former, polymerization runs were made in a 2.2 liter steel reactor equipped with a marine stirrer running at 400 rpm. The reactor was surrounded by a steel jacket through which water was circulated with a connection to a steam/water heat exchanger. The reactor temperature was controlled to within 1° C. by varying the amount of steam and water fed to the heat exchanger, with the help of electronic control instruments.

Unless otherwise stated, a small amount (0.01 to 0.10 g normally) of the chemically-treated solid oxide (CTSO) was first charged under nitrogen to the dry reactor. Next, typically, 2 mL of a toluene solution containing a known percent by weight of the desired metallocene was added, followed by 0.6 mL of 1M TIBA solution in heptane, and then 1.2 L of isobutane liquid. The reactor was then heated to the specified temperature (90° C., unless noted otherwise), and finally ethylene was added to the reactor to equal a fixed pressure (450 psig, unless noted otherwise).

The reaction mixture was allowed to stir for usually around 1 hr. As ethylene was consumed, more ethylene flowed in to maintain the pressure. The polymerization rate was noted by recording the flow of ethylene into the reactor to maintain the set pressure. After the allotted time, the ethylene flow was stopped and the reactor slowly depressurized and opened to recover a granular polymer powder. In most cases, the reactor was clean with no indication of any wall scale, coating or other forms of fouling. The polymer powder was then removed and weighed. Activity was specified as grams of polymer produced per gram of CTSO per hour.

In other examples below, as specified, the reactor was a liquid-full 15.2 cm diameter pipe loop having a volume of 23 gallons (87 liters). Liquid isobutane was used as the diluent, and occasionally some hydrogen was added to regulate the molecular weight of the polymer product. The reactor pressure was about 4 MPa (about 580 psig, unless noted otherwise). The reactor temperature could be varied over the range of 65° C. to 110° C. as indicated below. The reactor was operated to have a residence time of 1.25 hr. CTSO was added through a 0.35 cc circulating ball-check feeder. At steady state conditions, the isobutane feed rate was about 46 L/hr, the ethylene feed rate was about 30 lb/hr, and the 1-hexene feed rate was varied to control the density of the polymer product. Ethylene concentration in the diluent generally was 8-12 mole percent. Catalyst concentrations in the reactor can be such that the catalyst system content ranges from 0.001 to about 1 wt. %, based on the weight of the reactor contents. Polymer was removed from the reactor at the rate of about 25 lb/hr and recovered in a flash chamber. A Vulcan dryer was used to dry the polymer under nitrogen at about 60-80° C.

Cocatalysts such as triethylaluminum (TEA) or triisobutylaluminum (TIBA) were usually added as indicated, typically at a concentration of about 1 to 100 ppm by weight of the diluent. To prevent static buildup in the reactor, a small amount (<5 ppm of diluent) of a commercial antistatic agent sold as Stadis 450 was usually added.

Examples 1-69

FIG. 1 illustrates the fundamental relationship between ethylene/1-hexene copolymer density and short chain branch (SCB) content. The plot shows the drop in density relative to each polymer's homopolymer, being plotted on the y-axis. The density drop also varies with the molecular weight distribution. Although these diverse samples had widely different molecular weights and molecular weight distributions, they nevertheless converge, whatever their polydispersity or molecular weight, onto a single line when the density drop is plotted against the number of SCBs (per thousand carbons) divided by Mw/Mn raised to the 0.32 power. This relationship (DesLauriers law) is disclosed in EP 2 462 424 B1 and in Polymer 180 (2019) 121730 (both incorporated herein by reference in their entirety), from which these data points were taken and wherein their origin is described. These were made by an assortment of different catalysts in order to demonstrate the universality of the law. This DesLauriers principle can be used to calculate branch content or density, because it is independent of the catalyst system (e.g., metallocene, Ziegler, chromium, bimodal dual metallocene). And, this relationship was used to calculate the SCB content of the polymers described in the examples below.

Figure 2:
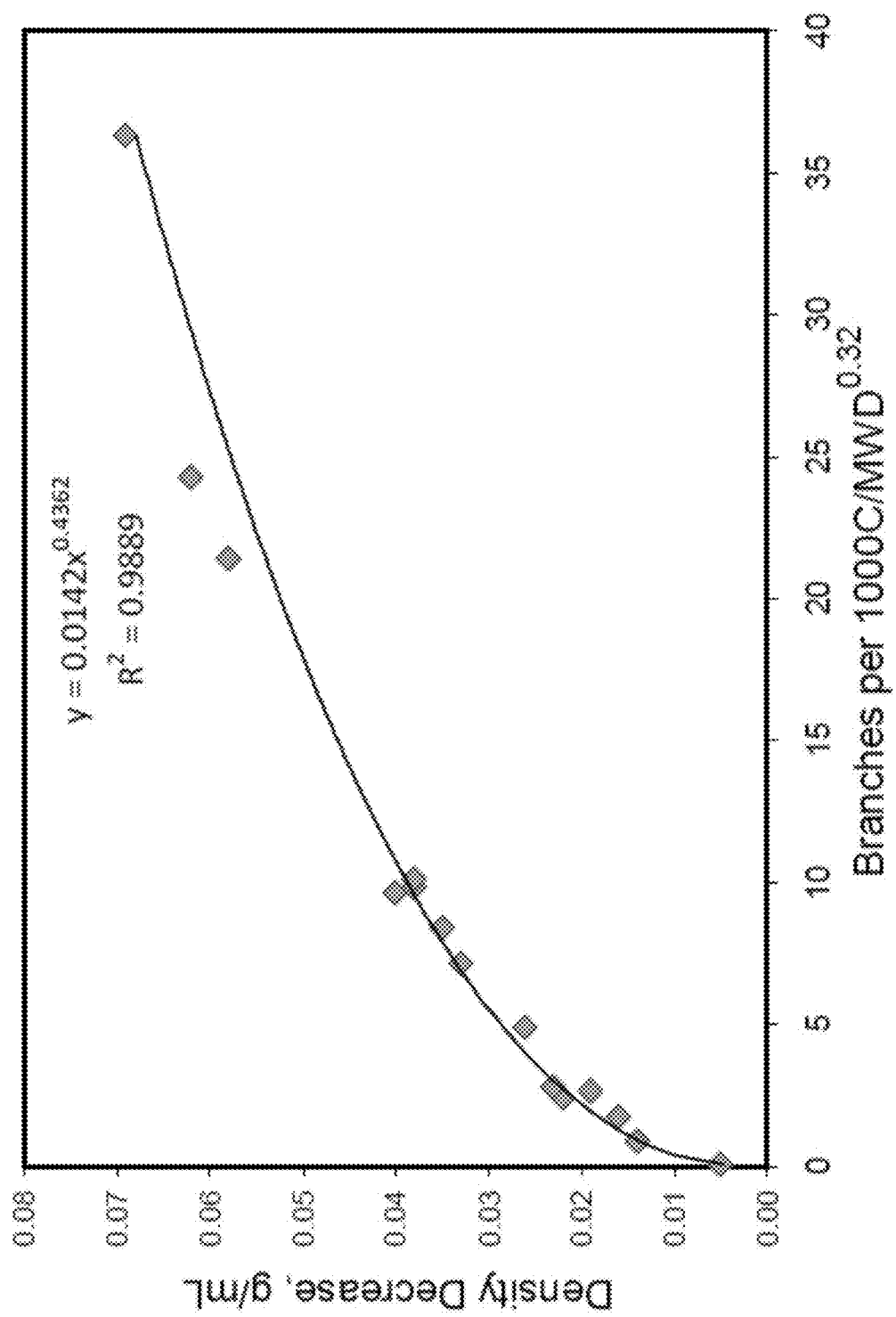
FIG. 2 presents a plot of the decrease in polymer density due to 1-hexene incorporation for a metallocene catalyst system.

Table I summarizes the characteristics of the polymers from FIG. 1 that had a narrow MW distribution. As described in the cited reference, they were made with metallocene catalysts except for the lowest density polymers, which were free-radical derived. The data in Table I was also plotted in FIG. 2, showing the same relationship as in FIG. 1, but with a polymer set limited to narrow molecular weight distributions. Notice than an equation can be derived to fit the curve. The shape of the curve in FIG. 2 is a little different than that in FIG. 1 because the X-axis is now on a linear, versus logarithmetric scale.

Figure 3:
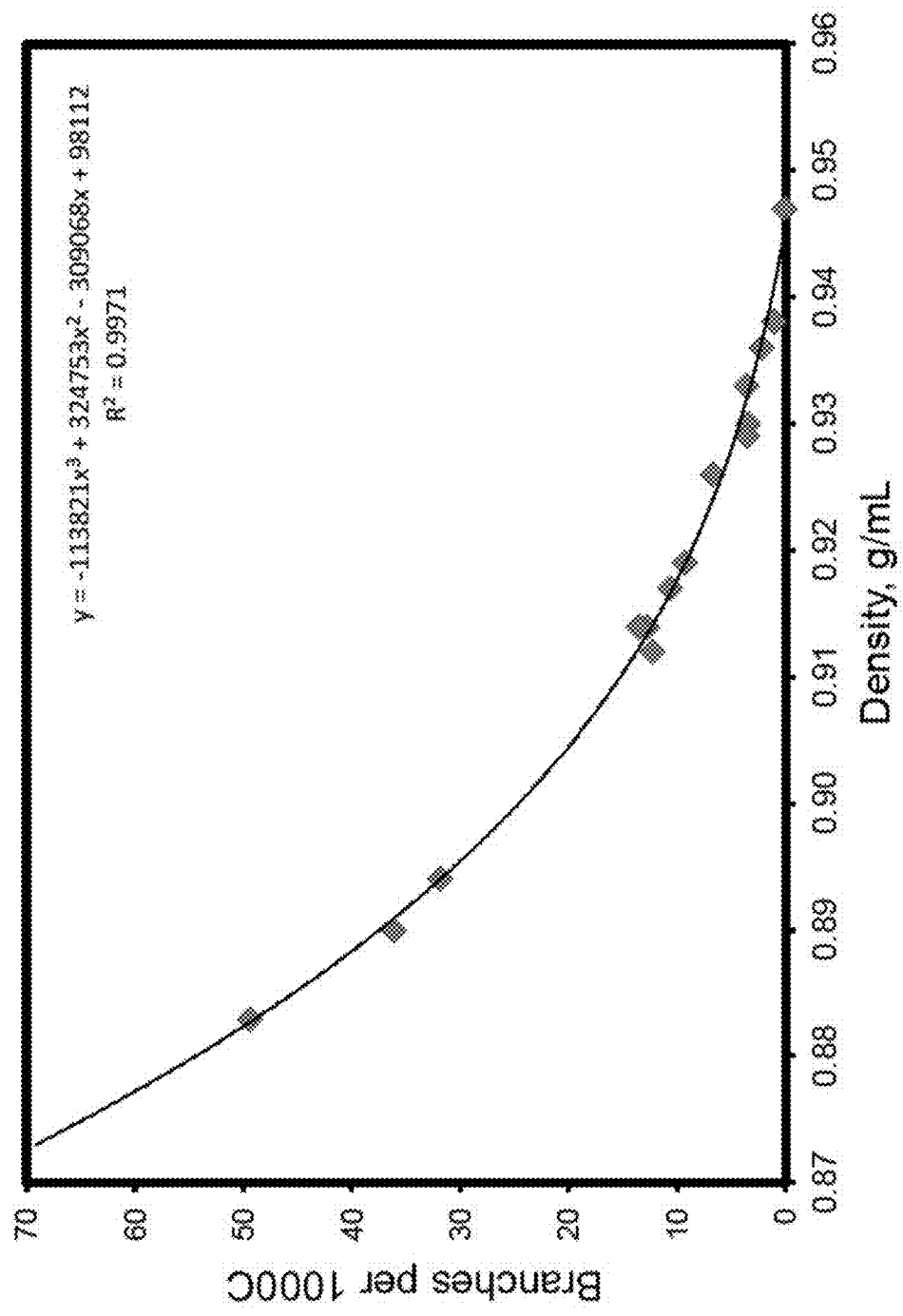
FIG. 3 presents a plot of short chain branches per 1000 total carbon atoms versus polymer density.

In FIG. 3, that same data is plotted again and inverted. That is, the number of SCBs has been plotted on the Y-axis, and the density itself (not the decrease in density) at 1 melt index has been plotted on the X-axis. This allows for an equation to be developed, which is shown on the graph, and which was used in later examples to calculate the number of SCBs from the measured polymer density.

Figure 4:
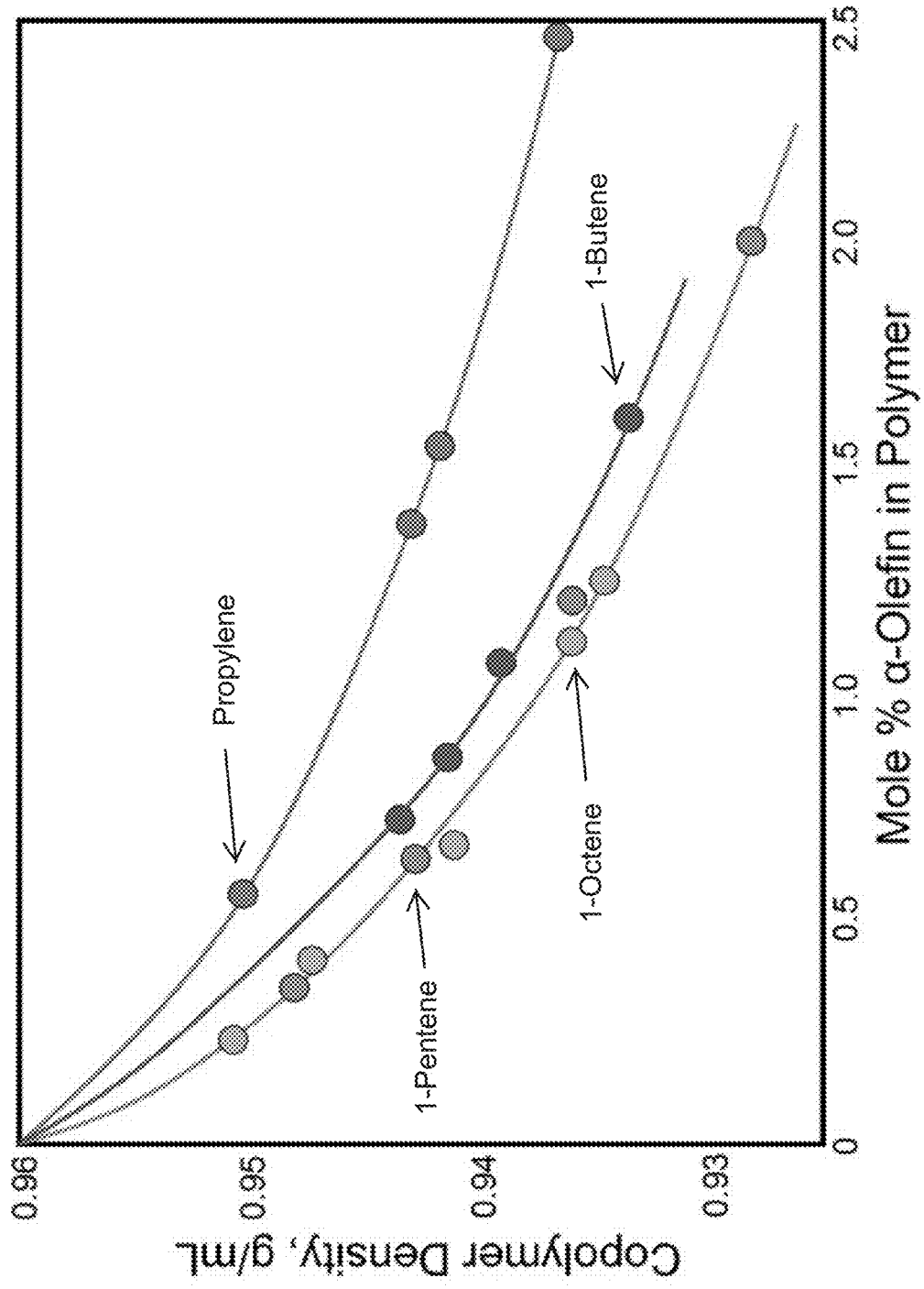
FIG. 4 presents a plot of the decrease in polymer density versus the molar comonomer content for different comonomer types.

Finally, FIG. 4 shows another set of data, this time obtained from a chromium catalyst. It merely shows the effect of branch length on the density. For each comonomer, we see the typical decline in density with increasing amounts of comonomer; the ethylene copolymer density is plotted against the amount of comonomer incorporated into the polymer. The catalyst in this case was Cr/silica, calcined at 600° C., and the slurry reactor temperature was varied from 105° C. down to 70° C. as the density dropped. Notably, it takes more propylene or 1-butene incorporation to reach a certain density than is needed with 1-octene, 1-hexene, or 1-pentene on a mole basis. This relationship is observed regardless of the catalyst type used. When plotted on a weight basis, the curves tend to move closer together.

Catalysts vary widely in their comonomer incorporation efficiency. That is, given a certain addition amount of comonomer into the reactor, the resultant polymer density changes considerably depending on the choice of catalyst. Comonomer incorporation efficiency is especially important in the slurry process, where the diluent-comonomer mixture is flashed upon discharge from the reactor. Some of the comonomers, like 1-hexene and 1-octene, have relatively high boiling points and are more difficult to flash compared to propylene or 1-butene. Thus, it is generally advantageous to have relatively low concentrations of comonomer in the reactor, which therefore requires high comonomer incorporation efficiency by the catalyst in order to achieve lower densities.

Figure 5:
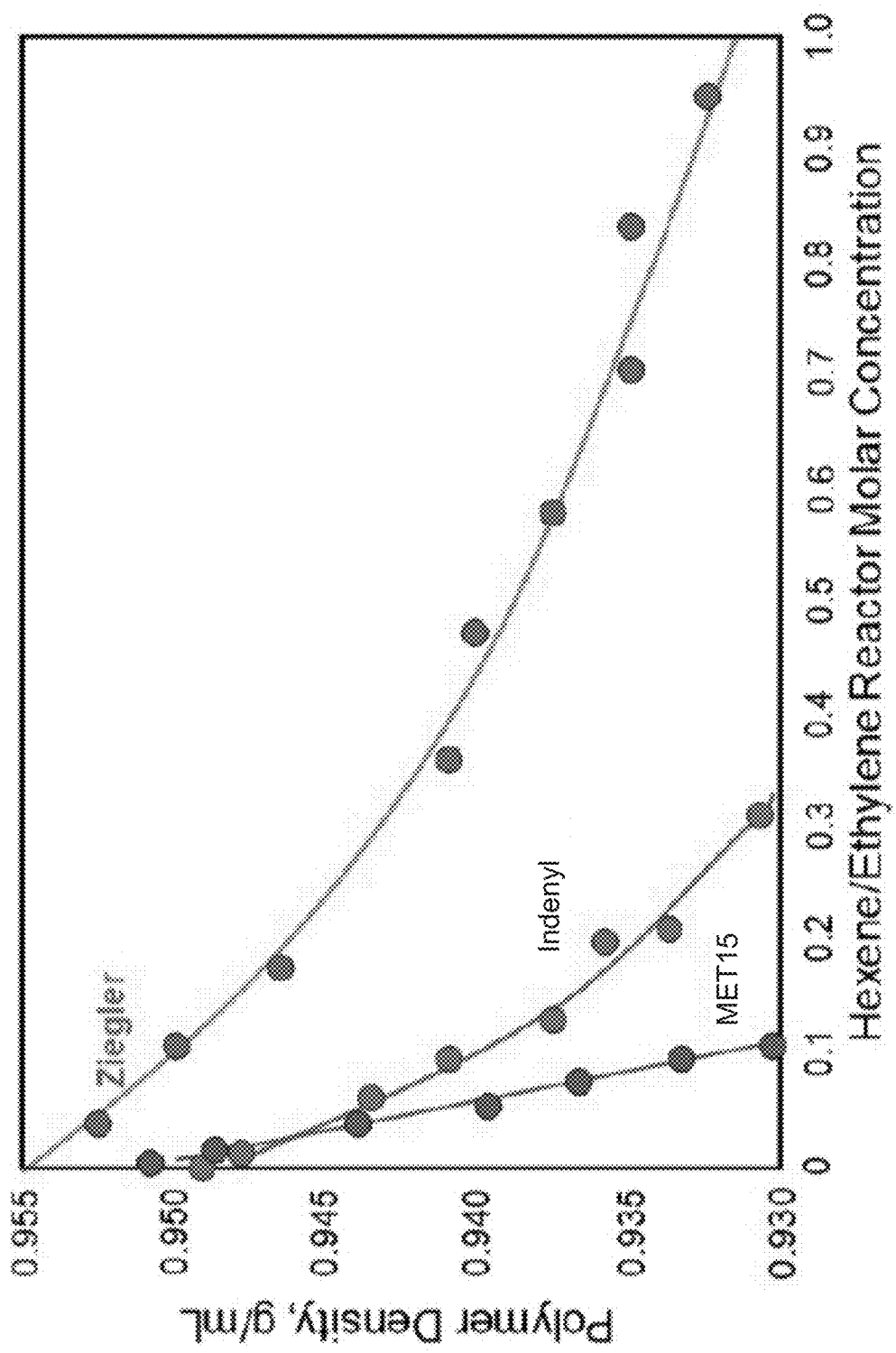
FIG. 5 presents a plot of polymer density versus molar reactor comonomer concentration for different catalyst systems.

FIG. 5 illustrates the principle that different catalysts have different comonomer incorporation efficiencies. The data in FIG. 5 shows the decline in density for three catalysts as a function of the molar ratio of 1-hexene to ethylene present in the slurry reactor during polymerization. The polymers plotted in these two figures were produced as described above in the lab reactor, using a metallocene catalyst or a Ziegler catalyst. The two metallocene catalysts were composed as described above, in which CTSO 1 was combined with one of the two metallocenes, bis(indenyl)zirconium dichloride ("Indenyl") or MET15. The reaction used a metallocene concentration in the reactor of 2-3 ppm, along with triisobutylaluminum at 20 ppm. Other conditions were as described above. The Ziegler catalyst was prepared as described in U.S. Pat. No. 4,325,837 and used with 50 ppm of TEA co-catalyst.

For a given level of 1-hexene added to the reactor relative to ethylene, the Ziegler catalyst does not lower the density nearly as much as either metallocene catalyst. The MET15 catalyst is an especially excellent incorporator of comonomer. The catalyst abbreviated as indenyl has an intermediate response.

The comonomer incorporation efficiency can be quantified as follows. Ethylene and comonomer incorporation are both first order reactions based on the concentrations of both monomers. Thus, the 1-hexene:ethylene molar content of the polymer is directly dependent on (proportional to) the 1-hexene:ethylene molar ratio of these reactants in the reactor. The comonomer incorporation efficiency, therefore, is the slope of a line obtained by plotting polymer comonomer:monomer (molar) ratio against the comonomer:monomer (molar) ratio in the reactor. This is demonstrated in FIG. 6, which uses the data from FIG. 5. Notice that the data points form a straight line going through the origin, indicating a first order dependence. The slopes of these lines are the comonomer incorporation efficiency of the catalyst at the polymerization temperature used to produce the polymer (for the particular comonomer, 1-hexene in this case). A higher slope translates to higher comonomer incorporation efficiency.

Figure 6:
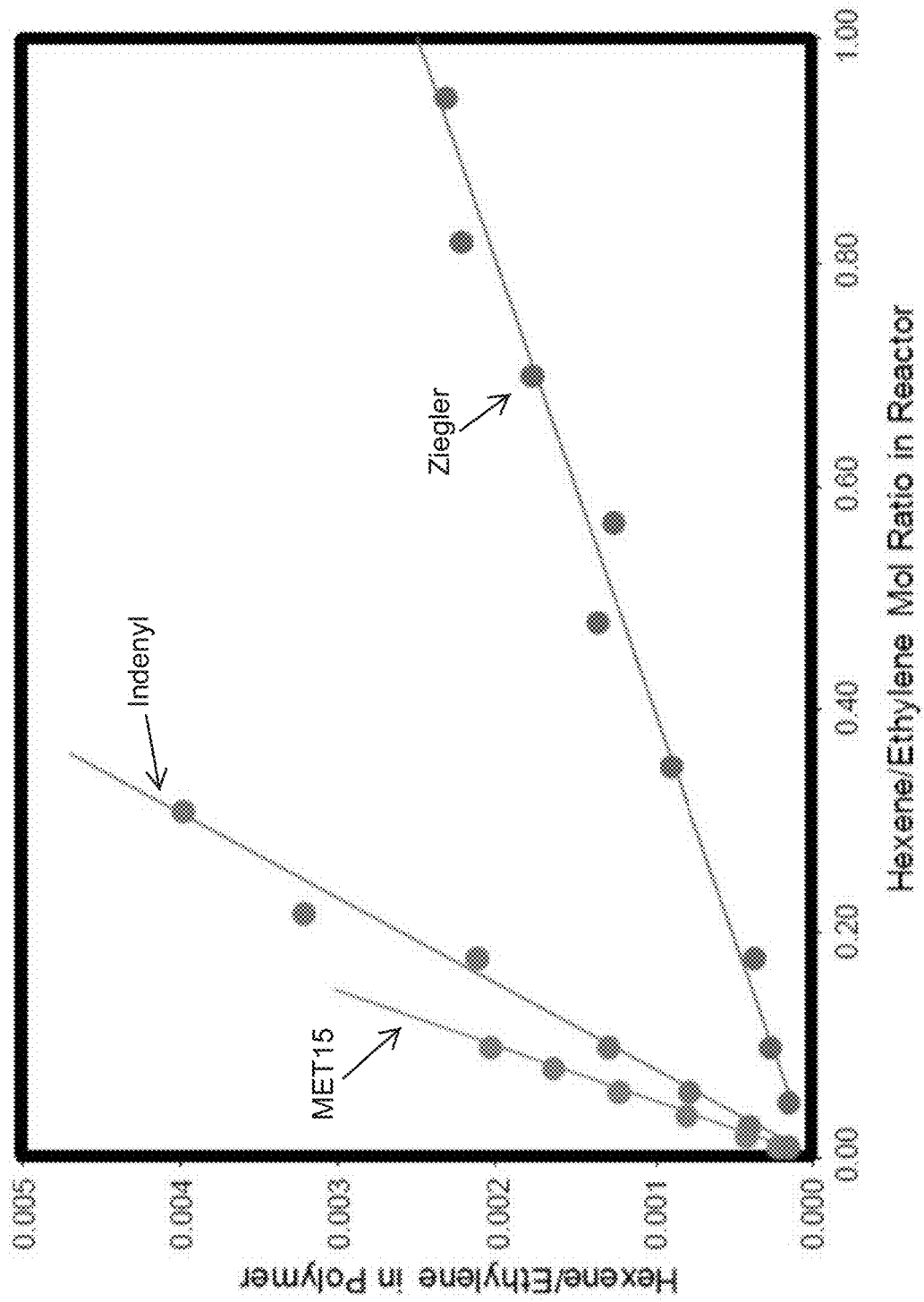
FIG. 6 presents a plot of the 1-hexene:ethylene molar ratio in the polymer versus the 1-hexene:ethylene molar ratio in the reactor, in which the slopes of the lines determine the comonomer incorporation efficiency for the different catalyst systems.

Table II (Examples 17-26) shows the some of the actual data points which were plotted in FIGS. 5-6. It demonstrates how the comonomer incorporation efficiency can be calculated from only a few data points, or even a single data point, for different catalysts copolymerizing 1-hexene and ethylene under various slurry conditions. The ratio of molar concentrations in the reactor of 1-hexene to ethylene is first calculated. For instance, in Example 17, the reactor hexene:ethylene molar ratio was calculated to be 5.697. Next, the same ratio was calculated based on the amount of each monomer that was incorporated into the polymer. The polymer density, 0.9242 in this example, was subtracted from the homopolymer density (0.958) to achieve a density decrease of 0.0338. This value was then compared to the line in FIG. 2 to yield the branch content of 11.4 branches per thousand carbons. This translates to a hexene concentration of 1.14 mol % and an ethylene concentration of 98.86 mol %. Dividing the former by the latter gives a 1-hexene to ethylene molar ratio of 0.0115 in the polymer. Lastly, dividing the polymer hexene:ethylene molar ratio by the reactor hexene:ethylene molar ratio results in the 1-hexene incorporation efficiency for this particular Ziegler catalyst run under the specified temperature conditions, which was 0.20% in Example 17.

The comonomer incorporation efficiency is affected by the choice of catalyst and the polymerization temperature. Higher temperatures tend to make all catalysts more efficient. All of the metallocene runs (Examples 20-26 in Table II, 1% to 4% efficiencies) had higher efficiencies than the Ziegler catalyst. Examples 21-25 were performed as follows.

In Example 21, the metallocene compound was MET16 activated by fluorided silica-coated alumina with 15% Cabosil silica as a feeding aid. A silica-alumina was obtained from Sasol Company containing 72% alumina and having a surface area of 450 square meters per gram and a pore volume of about 1.2 cc/g. This material was obtained as a powder having an average particle size of about 70 microns. In a typical preparation, 650 grams of this material was impregnated with a solution containing 2000 mL of water and ammonium hydrogen fluoride to equal 7% fluoride on the support. This formed a damp powder having the consistency of wet sand. This preparation was then placed in a flat pan and allowed to dry under vacuum at 110° C. for about 16 hours. This material was calcined by placing it in a 6-inch tube fitted with a porous distributor disk at the bottom. While the powder was supported on the disk, air or nitrogen, dried by passing through a 13× molecular sieve column, was blown up through the disk at the linear rate of about 0.15 feet/sec. An electric furnace around the tube was then turned on and the temperature was raised at the rate of 100° C./hour to 600° C., and then fluidized for eight hours in dry air. After cooling the fluorided silica-coated alumina (chemically-treated solid oxide, CTSO 1) was stored under dry nitrogen without exposure to the atmosphere.

The polymerization experiment was conducted in a pilot plant loop reactor, 23 gallon volume, 6-inch diameter, with a feed stream of 74.7 lb/h of isobutane diluent, 34.9 lb/hr ethylene and 4.91 lb/hr hexene. A small portion of this isobutane feed, about 4%, went through a pre-contacting vessel. The MET16 metallocene (0.28 ppm based on total iC4 flow) was added through the pre-contactor (residence time of 30 min) along with 18.8 ppm of TIBA (based on the total iC4 flow), and CTSO 1. Final activity, based on the CTSO, was 4608 lb PE made per lb of CTSO 1. Reactor solids concentration was about 29 wt. %, and the reaction temperature was controlled at 77° C. A polymerization rate of 33.7 lb/hr was achieved, producing polymer having a pellet melt index of 1.69 and a pellet HLMI of 31.4 g/10 min. The polymer powder discharged from the reactor had a density of 0.9122 g/cc, and after pelletization, the density was measured as 0.9129 g/cc. Solid polymer was obtained without stickiness or swelling. Bulk density was 24 lb/ft³.

Example 22 was performed similarly to that of Example 21. Some of the feed streams were slightly different, as well as the temperature, as shown in Table II. The temperature was 76.7° C., and the MET16 metallocene was fed at 0.85 ppm based on the weight of the isobutane diluent. The productivity was 6557 lb of polymer made per lb of CTSO 1. The polymer powder discharged from the reactor had a density of 0.9113 g/cc. After pelletization, the polymer had a melt index of 0.76 g/10 min, a HLMI of 14.12 g/10 min, and a density of 0.9120 g/cc.

Example 23 was performed similarly to that of Example 21, but with a different CTSO. An alumina (bohemite) was obtained from W.R. Grace having a surface area of 330 square meters per gram and a pore volume of 1.2 mL/g. The alumina was calcined at 600° C. for 5 minutes in a rotary kiln. Then, it was impregnated with ammonium sulfate to equal 15 wt. % sulfate based on the weight of the alumina, followed by drying and calcining as described above to result in CTSO 2.

The polymerization temperature was 73.9° C., and MET16 was fed at 1.68 ppm based on the isobutane diluent. The TIBA was fed at 19.5 ppm based on the isobutane. The productivity was 4322 lb of polymer made per lb of CTSO 2. The polymer powder discharged from the reactor had a density of 0.9054 g/cc. After pelletization, the copolymer had a melt index of 1.22 g/10 min, a HLMI of 17.05 g/10 min, and a density 0.9054 g/cc.

Example 24 was performed similarly to that of Example 21, but with a different CTSO and a bis-indenyl zirconium dichloride metallocene compound. A silica-alumina was obtained from W.R. Grace containing 13 wt. % alumina and having a surface area of 450 square meters per gram, a pore volume of about 1.3 cc/g, and an average particle size of about 100 microns. In a typical preparation, 650 grams of this material was impregnated with a solution containing 2000 mL of water and ammonium hydrogen fluoride to equal 7% fluoride on the support. This formed a damp powder having the consistency of wet sand, followed by drying and calcining as described above (except at 450° C.) to result in CTSO 3.

The polymerization temperature was 68.3° C., the metallocene was fed at 3.24 ppm based on the isobutane, and 8 ppm of TEA used as the co-catalyst. The productivity was 897 lb of polymer made per lb of CTSO 3. The polymer discharged from the reactor had a density of 0.9000. After pelletization, the polymer MI was 0.71 g/10 min, the HLMI was 14.01 g/10 min, and the density was 0.9023 g/cc.

Example 25 was similar to Example 24 as shown in Table II. The temperature was 68.3° C. and the metallocene was fed to the reactor at a concentration of 3.79 ppm based on the isobutane, and 8 ppm of TEA was used. The productivity was 990 lb of polymer made per lb of CTSO 3. The polymer discharged from the reactor had a density of 0.8993. After pelletization, the polymer had a MI of 1.17 g/10 min, a HLMI of 30.98 g/10 min, and a density of 0.9039 g/cc.

Examples 20 and 26 were performed in a manner similar to that of Examples 21-25, as summarized in Table II.

Using the information in FIG. 6 and combined with the relationships of FIGS. 1-3, Constructive Examples 27-31 are theoretical runs produced as described below, and summarized in Table III. For Constructive Example 27, CTSO 4 can be prepared from a silica-coated alumina containing 20% silica and 9% fluoride. Tetraethyl orthosilicate can be diluted in methanol into which ammonium fluoride is dissolved. This solution then can be then impregnated onto an alumina (e.g., surface area of 330 m²/g, pore volume of 1.2 mL/g, calcined at 600° C. for eight hours). After drying under vacuum at 100° C. overnight, the catalyst can be calcined as described above at 650° C. for eight hours, thereby resulting in CTSO 4.

Polymerization can be performed in a 23 gal pilot plant loop slurry reactor in isobutane at 74.2° C. The isobutane feed rate is 65.3 lb/h, the 1-hexene feed rate is 12.5 lb/hr, and the ethylene feed rate is 28.3 lb/hr. The bis-indenyl zirconocene dichloride metallocene is fed into the reactor to equal 0.8 ppm of the isobutane diluent, and the TIBA co-catalyst is added to equal 20 ppm of the isobutane. The solids content is about 30 wt. % and the residence time is 1.25 hr. It is expected that the polymer produced will have a MI of 1.6 g/10 min, a HLMI of 27.2 g/10 min, and a density of 0.8950 g/cc. The productivity is 3450 lb of polymer per lb of CTSO 4, and the comonomer incorporation efficiency is 1.28%, as tabulated in Table III.

Constructive Example 28 is performed similar to Example 27, but with MET16 metallocene feed at a rate to equal 0.4 ppm of the isobutane feed. The feeds are as follows: ethylene 30.1 lb/hr, isobutane 68.3 lb/hr, and hexene 8.4 lb/hr. The co-catalyst is TIBA added to equal 18.3 ppm of the isobutane. This experiment is expected to produce a polymer with a MI of 0.77 g/10 min, a HLMI of 13.1 g/10 min, and a density of 0.8887 g/cc. The productivity is 5800 lb of polymer per lb of CTSO 4, and the comonomer incorporation efficiency is 3.78%.

Constructive Example 29 is performed similarly to that of Example 27, but with a different CTSO (sulfated zirconia-alumina). It can be made from alumina (330 $m^2$/g, 1.2 mL/g, 100 µm average particle size) that is calcined at 600° C., and then impregnated with 2 mmol/g of zirconium tetrabutoxide in isopropanol. After drying (e.g., 16 hours under vacuum at 100° C.), the solid then can be impregnated with an aqueous solution of ammonium sulfate to equal 20% by weight of sulfate. After drying under vacuum at 100° C. overnight, the catalyst can be calcined as described above at 600° C. for eight hours, thereby resulting in CTSO 5.

The metallocene is fed at a rate to equal 0.5 ppm of the isobutane feed, ethylene at 35.5 lb/hr, isobutane at 70.2 lb/hr, 1-hexene at 10.5 lb/hr, and TIBA at 15.9 ppm of the isobutane. This experiment is expected to produce a MI of 0.85 g/10 min, a HLMI of 14.5 g/10 min, and a density of 0.8873 g/cc. The productivity is 6790 lb of polymer per lb of CTSO 5, and the comonomer incorporation efficiency is 3.52%, slightly different from the above example due to the lower temperature.

Constructive Example 30 is performed similar to Example 27, but with the MET15 metallocene feed at a rate to equal 0.8 ppm of the isobutane feed. The feeds are as follows: ethylene 38.2 lb/hr, isobutane 71.4 lb/hr, 1-hexene 12.6 lb/h, and TIBA added to equal 25.2 ppm of the isobutane. This experiment is expected to produce a polymer with a MI of 0.45 g/10 min, a HLMI of 7.7 g/10 min, and a density of 0.8839 g/cc. The productivity is 4434 lb of polymer per lb of CTSO 4, and the comonomer incorporation efficiency is 2.02%, as tabulated in Table III.

Constructive Example 31 is performed similar to Example 27, but with CSTO 6 (fluorided-chlorided zinc-coated alumina), which can be made from alumina (330 $m^2$/g, 1.2 mL/g, 100 µm average particle size) calcined at 600° C., and then impregnated with 2 mmol/g of zinc nitrate in water. After drying for 16 hours under vacuum at 100° C., the solid oxide can be calcined in a fluidized bed in dry air at 600° C. for eight hours. After cooling to 400° C. in nitrogen, 0.2 mL per gram of support of carbon tetrachloride is injected into the fluidization stream where it passed up through the solid oxide. Then, the temperature is ramped back up to 600° C. and is exposed to 5 mmol/g of Freon 134A vapor at 600° C. under nitrogen fluidization. After cooling to room temperature in nitrogen, the result is CTSO 6.

The metallocene is bis-(n-butylcyclopentadienyl) zirconium dichloride (abbreviated as "nButyl"), which is fed at a rate to equal 0.3 ppm of the isobutane feed. The feeds are as follows: ethylene 29.3 lb/hr, isobutane 64.8 lb/hr, 1-hexene at 14.2 lb/hr, and TEA added to equal 28.7 ppm of the isobutane. This experiment is expected to produce a polymer with a MI of 2.5 g/10 min, a HLMI of 40 g/10 min, and a density of 0.8877 g/cc. The productivity is 7856 lb of polymer per lb of CTSO 6, and the comonomer incorporation efficiency is 1.03%.

As summarized in Table IVa, Examples 32-69 were slurry polymerization experiments using a catalyst system containing a metallocene compound, a chemically-treated solid oxide, and an organoaluminum co-catalyst, and were performed similarly to that of Examples 20-26. Polymerization temperatures were in the 68-80° C. range and comonomer incorporation efficiencies were in the 1 to 2.2% range. Polymer property data for Examples 32-69 are summarized in Table IVb: densities ranged from 0.89 to 0.915 g/cc, and SCBs per 1000 total carbon atoms ranged from 12-29 SCBs/1000 carbon atoms.

Chemically-treated solid oxides A through E in Examples 32-69 were prepared as follows. CTSO A was a fluorided silica-alumina. The silica-alumina support was obtained from W.R. Grace as grade MS13-110. It contained 13% alumina, had a surface area of 450 $m^2$/g, a pore volume of 1.3 mL/g, and an average particle size of 100 µm. A solution of ammonium fluoride in water was mixed with the solid oxide to impregnate fluorine onto the support, resulting in a damp powder. After drying at 100° C. under vacuum for 12 hours, the powder contained 9 wt. % fluoride. It was then calcined at 450° C. in a fluidized bed in dry air for eight hours. Then it was cooled and purged with dry nitrogen and stored under nitrogen.

CTSO B was sulfated alumina. The alumina (bohemite) described above was obtained and converted into gamma alumina by calcination at 600° C. in air. Then, it was impregnated with an aqueous solution of ammonium sulfate to equal 20 wt. % sulfate. After drying for 12 hours under vacuum at 100° C., it was calcined in a fluidized bed in dry air at 630° C. for eight hours. Then it was cooled and purged with dry nitrogen and stored under nitrogen.

CTSO C was a titanated, fluorided, silica-coated alumina. First, a silica-coated alumina from Sasol containing 28 wt. % silica (450 $m^2$/g, 1.3 mL/g, 40 µm average particle size) was impregnated with an aqueous solution of ammonium hexafluorotitanate to equal 9 wt. % fluorine on the support. After drying at 100° C. under vacuum, it was calcined in a fluidized bed as described above for eight hours under dry air at 450° C. Then it was cooled and purged with dry nitrogen and stored under nitrogen.

CTSO D was a fluorided silica-coated alumina. It was prepared in the same manner as CTSO C, except that ammonium fluoride served as the fluorine source. CTSO E was a mixture of 85 wt. % CTSO D and 15 wt. % fumed silica (Cabosil EH5).

Examples 70-77

These examples are directed to use of catalyst system containing a CTSO to produce plastomers/elastomers in a solution process—polymer swelling is not an issue, polymerization temperatures are much higher (comonomer incorporation efficiencies are much higher), and the polymer goes into solution as it is formed.

Examples 70-72 are summarized in Table V, and were performed in a 2.2-L semi-batch stainless-steel reactor, equipped with marine propeller rotating at 400 rpm which pushed the liquid down and then back around the walls. The chemically-treated solid oxide was CTSO A, and the metallocene compound was racemic dimethyl silicon-bridged bis-indenyl zirconium dichloride. The co-catalyst was 0.4 mL of a 1 M solution of TIBA. Polymerization temperature was ~150° C. as shown in Table V, such that the polymer made immediately dissolved in the 1 liter of cyclohexane used as the solvent. Ethylene was supplied on demand at 450 psig. The amount of 1-hexene varied from 30 mL to 50 mL and the copolymer density varied from ~0.89-0.905, as shown in Table V. This metallocene produced relatively high levels of long-chain branching in the solution process at lower densities, as is evident from the low Carreau-Yasuda "a" parameter (CY-a parameter).

Once the incorporation efficiency has been established for a given catalyst and polymerization temperature, it is possible to build a complete curve like those in FIG. 3 or FIG. 5. Only one polymer sample is necessary to calculate the incorporation efficiency, as demonstrated in Table II. From that slope, a graph like that in FIG. 6 can be generated. And from that linear plot, densities are then obtained from the relationship depicted in FIG. 1, from any reactant concentration. Thus, one can calculate and predict the reactant concentrations needed to achieve plastomer/elastomer densities using catalyst systems containing various metallocenes and chemically-treated solid oxides.

Figure 7:
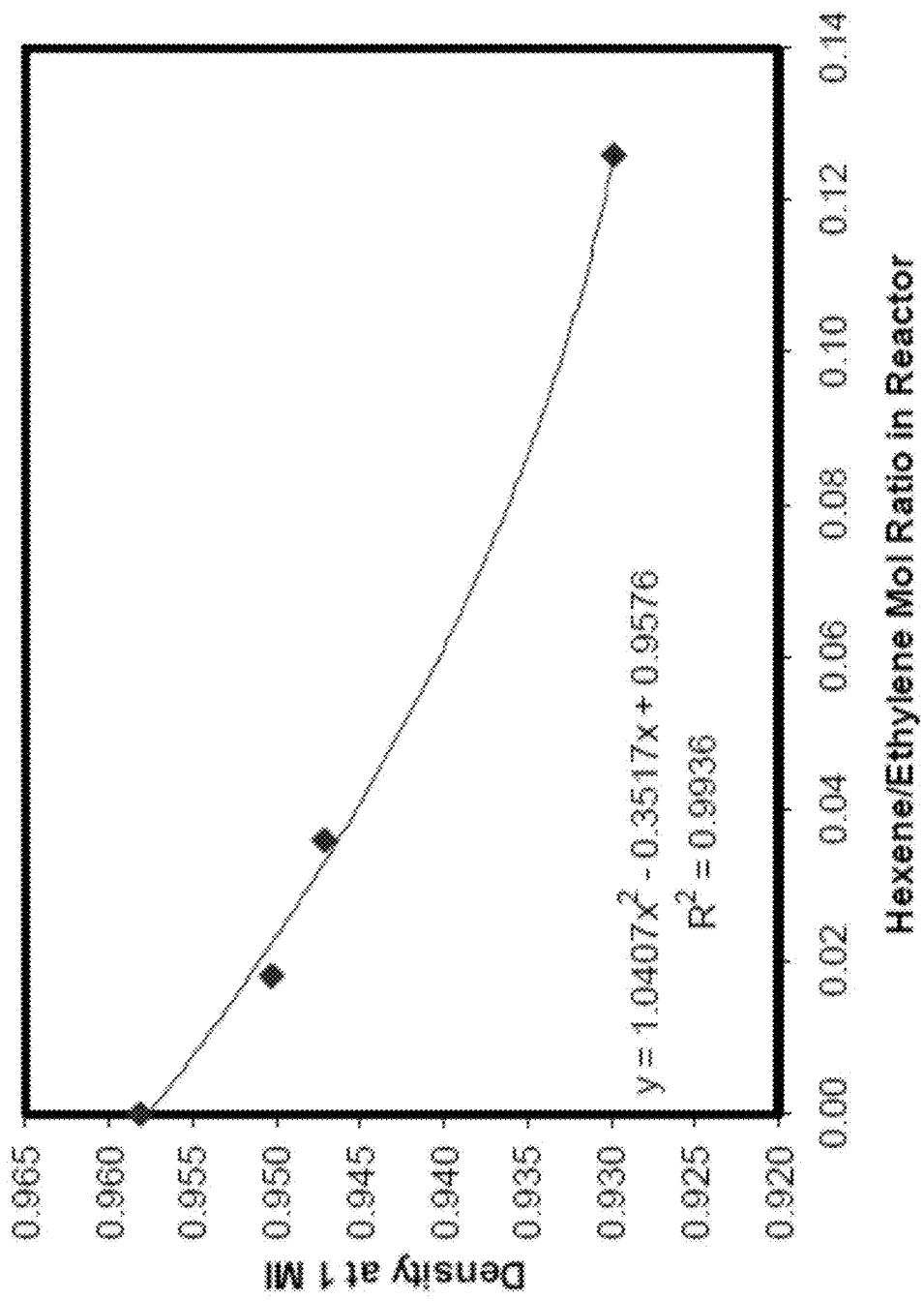
FIG. 7 presents a plot of ethylene copolymer density versus the comonomer content for a Ziegler catalyst system.

Table VI shows the results of 21 polymerization experiment at 155° C. in the solution process using a Ziegler catalyst at 464 psig ethylene pressure, and with cyclohexane as the solvent. In FIG. 7, the change in density is plotted against the 1-hexene:ethylene molar ratio in the solution reactor. Referring now to Table VI, the first row shows the 1-hexene incorporation efficiency for these Ziegler experiments: a comonomer incorporation efficiency of 2.7% at 155° C. The same catalyst at 80° C. had a 1-hexene incorporation efficiency of only 0.25%. The change in temperature from 80 to 155° C. increased the efficiency of incorporation of 1-hexene by a factor of 10.8. Applying this same temperature correction factor to other catalysts (see Table III) results in the estimated comonomer incorporation efficiency values for the metallocene catalysts at 155° C. shown in Table VI.

Figure 8:
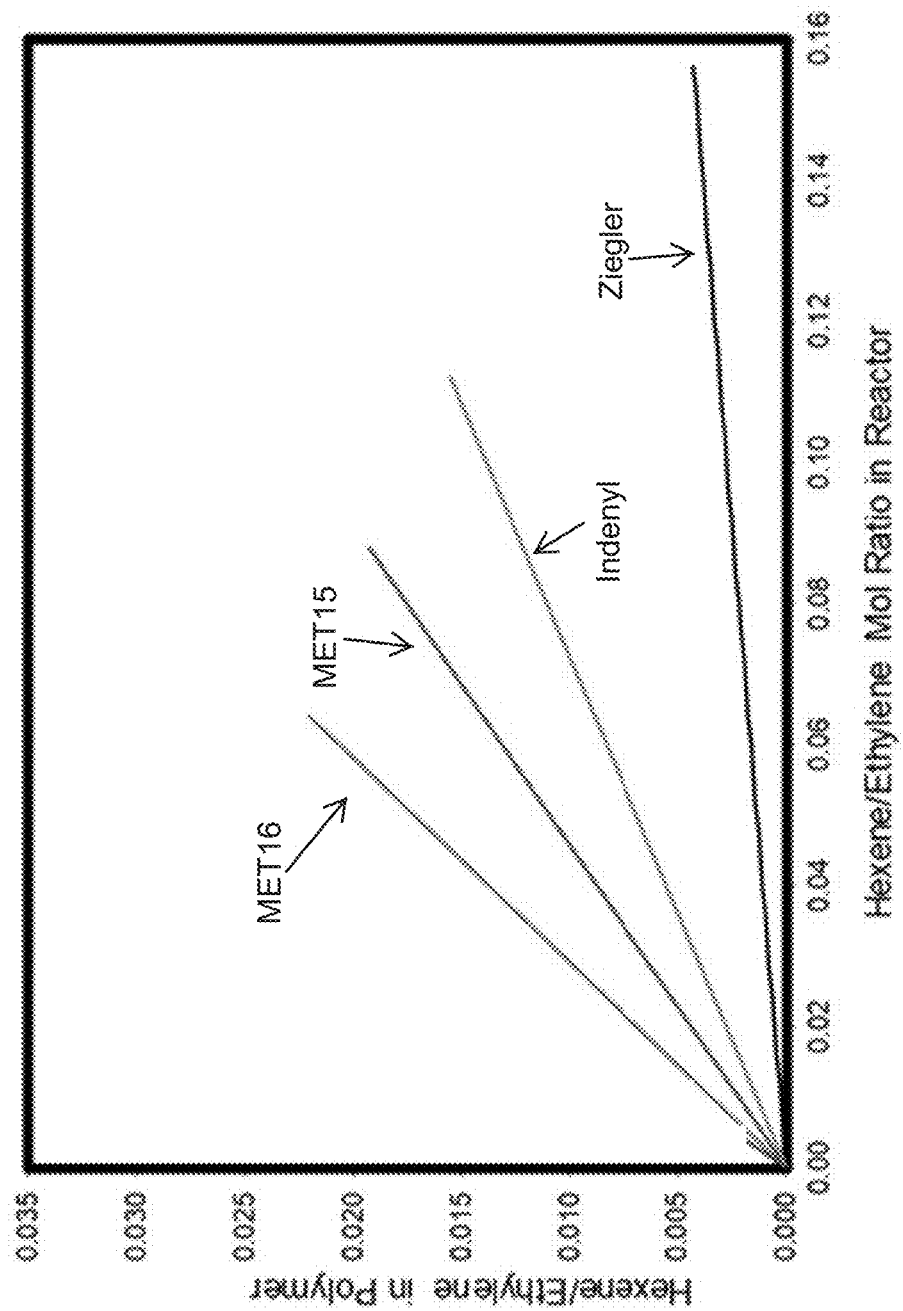
FIG. 8 presents a plot of the 1-hexene:ethylene molar ratio in the polymer versus the 1-hexene:ethylene molar ratio in the reactor, in which the slopes of the lines determine the comonomer incorporation efficiency for the different catalyst systems.
Figure 9:
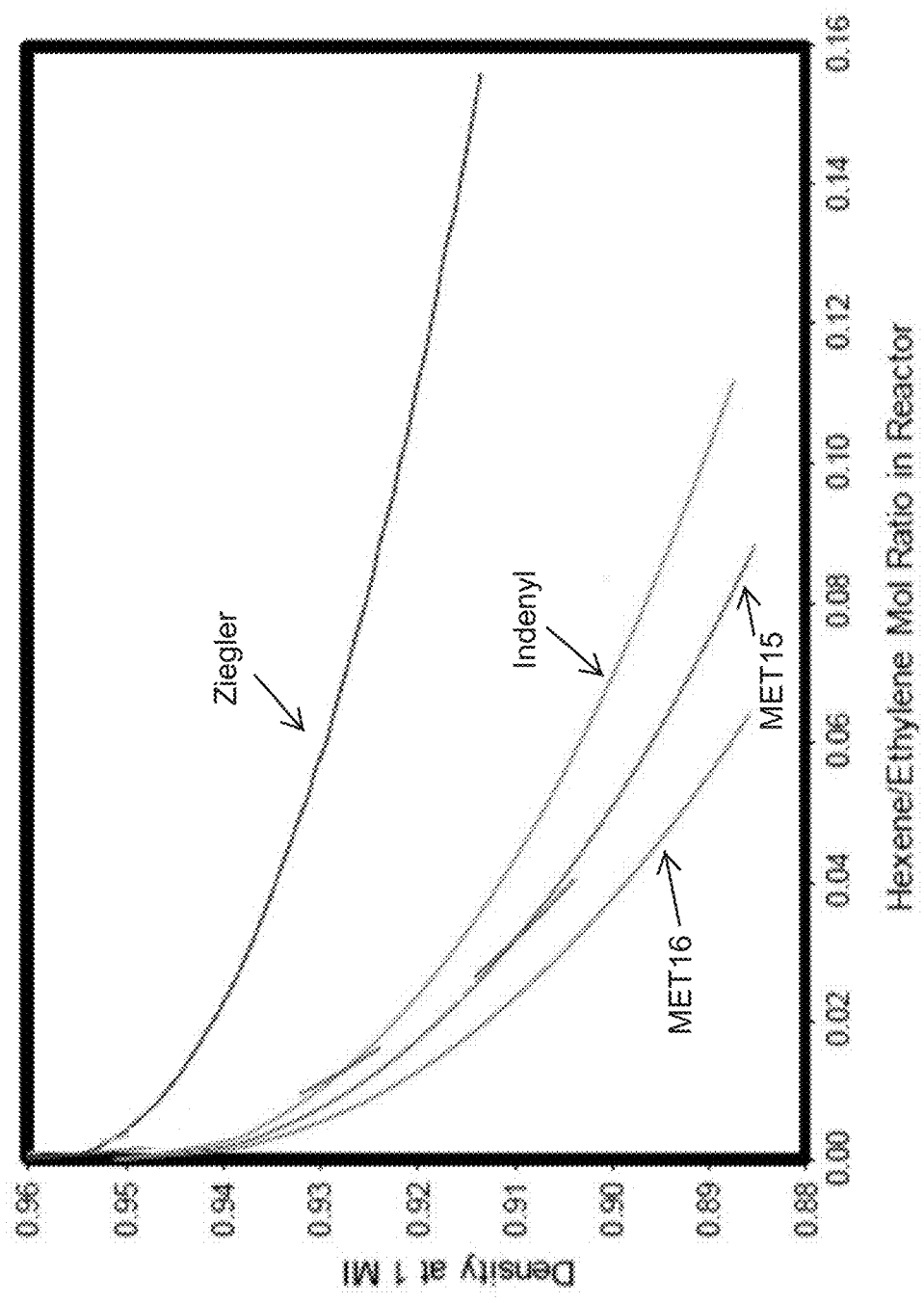
FIG. 9 presents a plot of the decrease in polymer density due to 1-hexene incorporation for different catalyst systems and corrected to a 1 melt index.

These estimated incorporation efficiencies at 155° C. can then be applied to produce a plot of 1-hexene:ethylene (molar) polymer versus 1-hexene:ethylene (molar) reactor (at 155° C.), and this is shown in FIG. 8, which is calculated based on the efficiencies listed in Table VI. The plot in FIG. 8 can then be translated, using the relationships described in FIG. 1 and FIG. 3, into another plot, shown in FIG. 9—this plot shows the expected relationship between the final polymer density and the 1-hexene:ethylene molar ratio in the solution reactor.

Using the information in Tables V-VI and relationships in FIGS. 6-9, Constructive Examples 73-77 using the solution process are summarized in Table VII. The constructive examples shown in Table VII were obtained like those in Table III, except with modified incorporation efficiency values used due to the higher polymerization temperature. Also by comparing FIG. 5 and FIG. 9, the impact of polymerization reaction temperature on the comonomer incorporation efficiency can be clearly discerned. That is, it takes less 1-hexene in the high temperature solution process to incorporate 1-hexene into the polymer.

Examples 78-99

Many of the polymers above were made with metallocenes that were specifically chosen to produce low levels of long chain branching. However, these examples are directed to use of metallocene catalyst systems containing a CTSO in a slurry process to produce plastomers/elastomers with long chain branching, which provide greater melt strength (e.g., bubble stability) during processing and high low-shear viscosity. These polymers generally are characterized by high relaxation times, high HLMI/MI values, and high zero-shear viscosities. Furthermore, the Carreau-Yasuda "a" parameter (CY-a parameter) typically drops as more long chain branching is present.

Table VIII summarizes Examples 78-99, which were produced in the same slurry loop pilot plant and using the same methods described above. The reactant concentrations were similar, but the metallocene compounds were different. The incorporation efficiencies were in the 2-4% range, similar to that of the metallocenes utilized above. As shown in Table VIII, these polymers generally had densities of 0.89-0.91 g/mL, 18-47 SCBs per 1000 total carbon atoms, CY-a values of 0.03-0.18, and ratios of HLMI/MI of 30-120. While these polymers were produced with the slurry process, similar polymers can be produced using the solution process and/or the gas phase process.

Examples 100-109

As with slurry and solution processes, ethylene-based plastomers and elastomers can be produced in a gas phase process, typically with Ziegler or metallocene based catalyst systems. For these examples, the gas phase reactor was assumed to be a 5 meter ID fluidized reactor with a liquid injection system employing multiple spray nozzles for introduction of condensed liquids from the recycle loop into the reactor. The metallocene used in these constructive examples is a bis-indenyl zirconium dichloride, and mol % comonomer incorporation is calculated as (mol comonomer)/(mol comonomer+mol ethylene). Molar incorporation rates for 1-hexene with metallocene were extrapolated from actual Ziegler data, while keeping in mind that the slope changes below 0.915 g/cc (based on metallocene incorporation rates). Average molar incorporation rates for 1-butene were assumed to be about 95% of that for 1-hexene. Reactor concentrations of 1-hexene for Ziegler systems were extrapolations of existing data. Further, a metallocene that is a good comonomer incorporator will tend to have a gas phase composition (comonomer concentration) that nearly matches the comonomer incorporation rate.

Lastly, reactor concentrations of 1-butene are set such as to achieve a sorbed 1-butene:ethylene ratio in the polymer similar, but slightly lower than, the ratio observed for sorbed 1-hexene:ethylene (herein, "sorbed" and "sorption" are meant to encompass absorption and adsorption).

Figure 10:
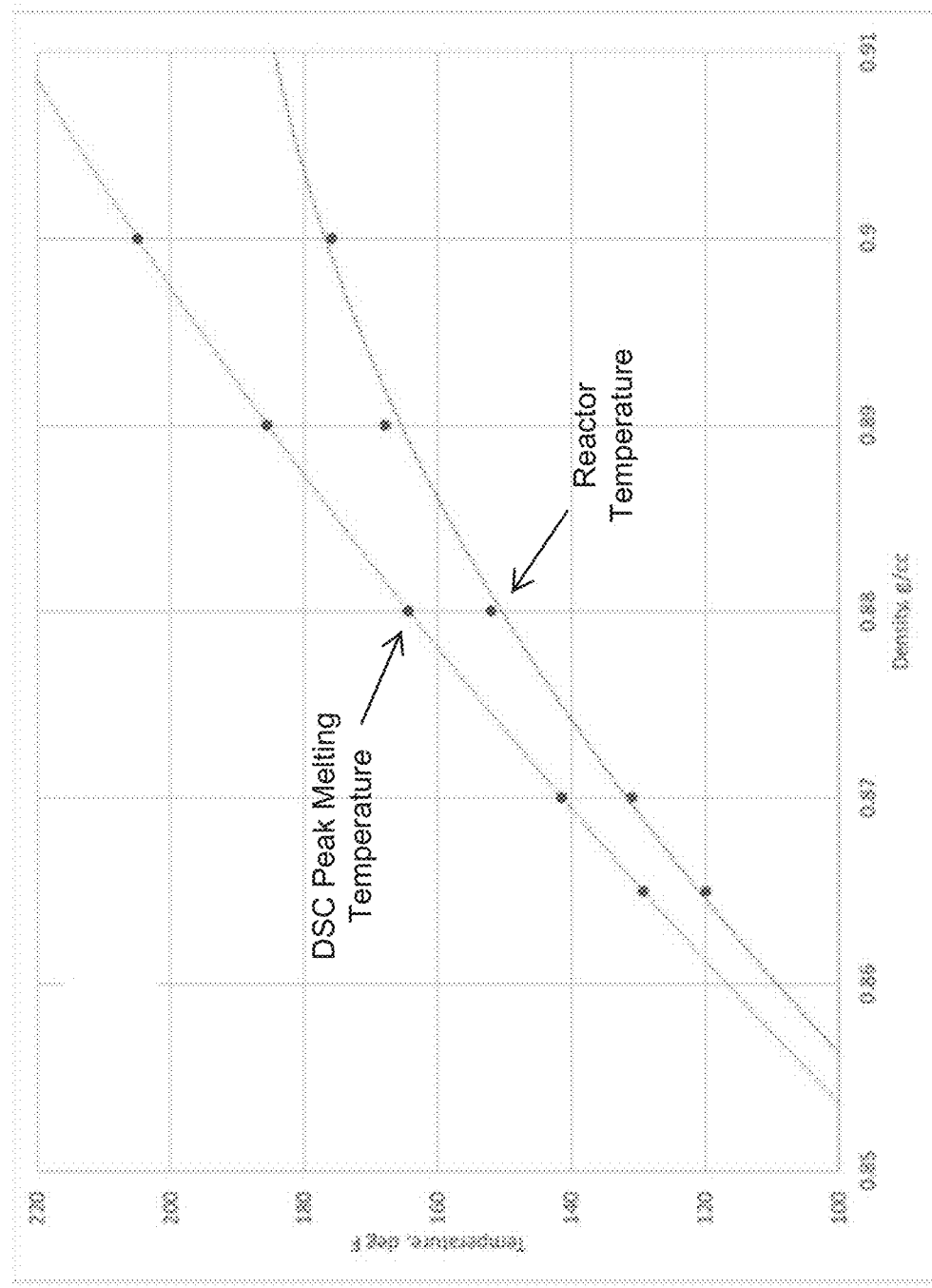
FIG. 10 presents a plot of gas phase reactor temperature and polymer DSC melting point versus polymer density.

In a gas phase process, such as fluidized bed gas phase process, the polymer melting temperature is a function of the polymer density, and therefore, the allowable reactor temperature also is a function of product density. In the density range of plastomers/elastomers, the temperature curves provided in FIG. 10 are a guide for establishing reactor temperature targets. The maximum polymerization temperature in which a gas phase reactor will be operable will also depend somewhat on the catalyst being used. For a given density, catalysts that produce polymers with non-uniform SCBD and/or broad MWD (e.g., more sticky) typically must be used at a lower temperature than catalysts that produce more uniform SCBD and narrower MWD. For production of elastomers and plastomers in a gas phase process, it is advantageous to use catalyst systems and comonomers that result in efficient and uniform incorporation of comonomer into the polymer chain and, thereby, higher allowable reactor temperatures. Metallocene catalysts that are suitable for slurry and solution processes tend to also be good for gas phase processes.

Figure 11:
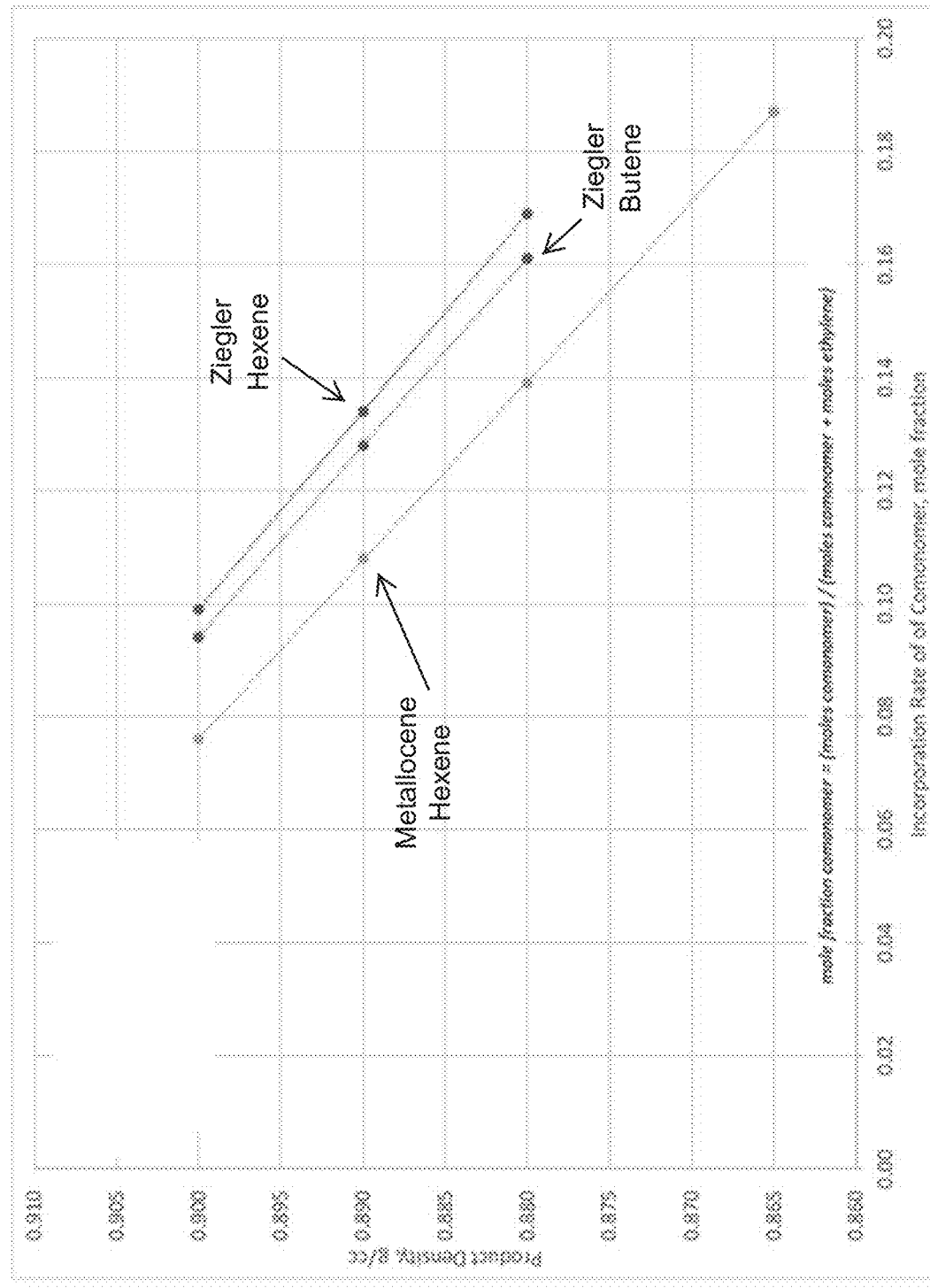
FIG. 11 presents a plot of ethylene copolymer density versus the molar comonomer content for different catalyst systems.
Figure 12:
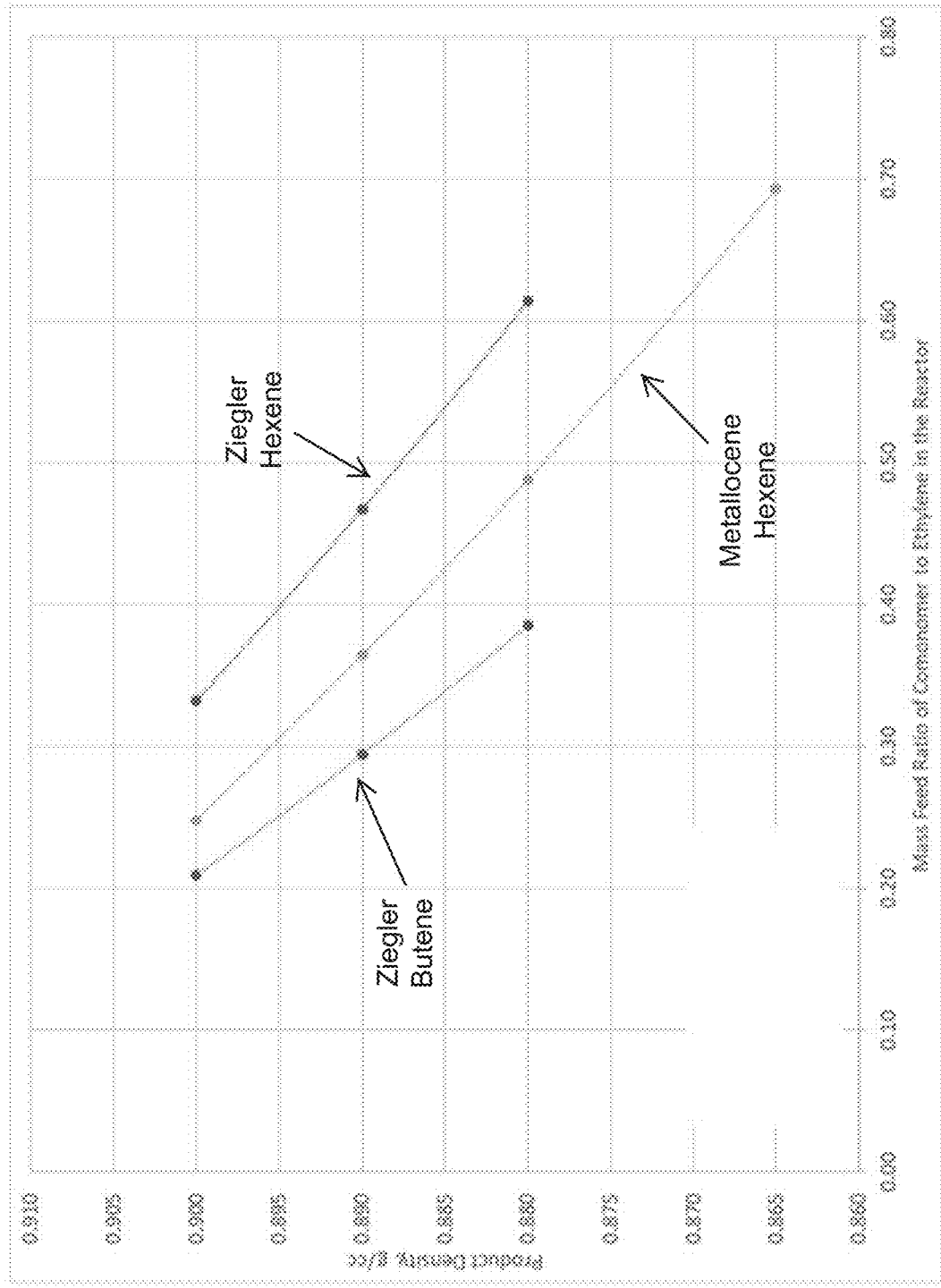
FIG. 12 presents a plot of ethylene copolymer density versus the reactor comonomer content for different catalyst systems.

In these examples, three different catalyst-comonomer systems are considered: (1) Ziegler+1-hexene system, (2) Ziegler+1-butene system, and (3) metallocene+1-hexene system. FIG. 11 shows the expected effect of comonomer incorporation rates on product density for these systems. The single site metallocene catalyst makes the most efficient use of comonomer for lowering polymer density. For Ziegler catalysts in a gas phase process, 1-butene generally is incorporated more efficiently than 1-hexene. While not shown in FIG. 11, 1-butene is slightly less efficient at lowering density that 1-hexene (on a molar basis) in metallocene-based systems. FIG. 12 is similar to FIG. 11, but on a mass basis (and assuming 0.5% loss), and illustrates the expected polymer density as a function of the mass feed ratios of fresh comonomer to fresh ethylene.

Figure 13:
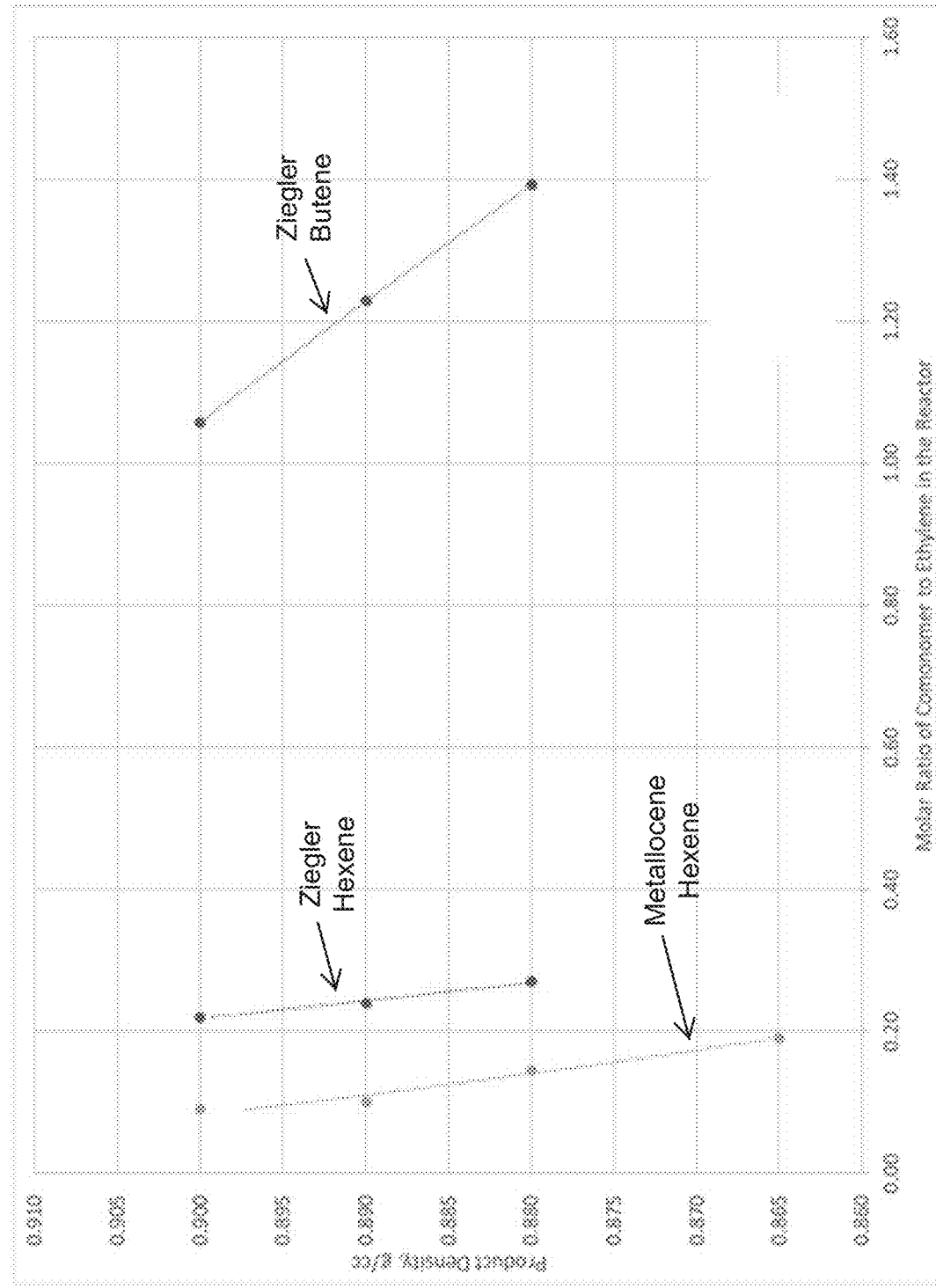
FIG. 13 presents a plot of ethylene copolymer density versus the molar reactor comonomer content for different catalyst systems.
Figure 14:
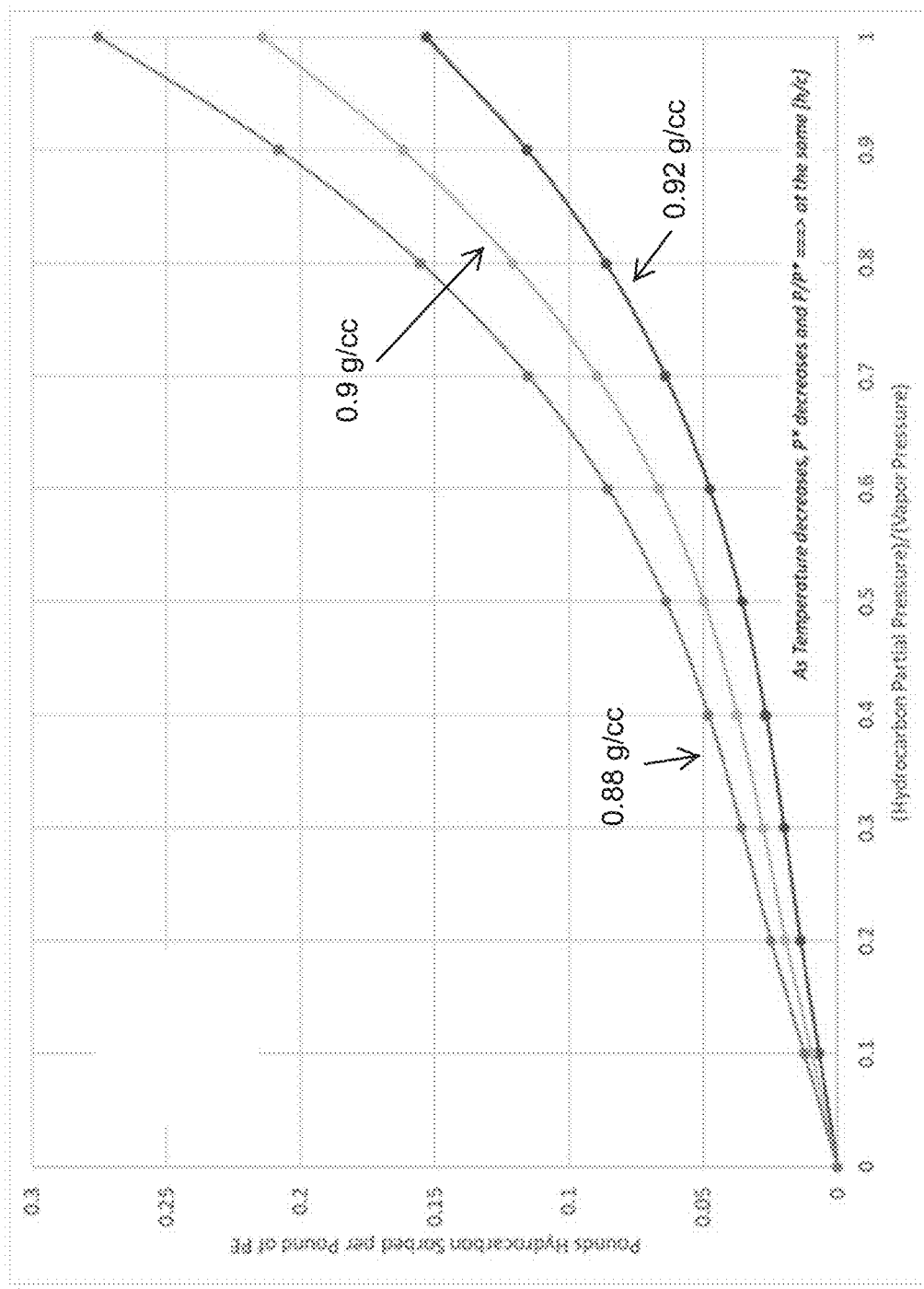
FIG. 14 presents a plot of polymer sorption of hydrocarbons versus the ratio of P/P* for different density copolymers.

The estimated comonomer to ethylene ratios required in the gas phase reactor to produce different polymer densities for the different catalyst-comonomer systems are shown in FIG. 13. In a gas phase process, polymer tends to absorb heavier hydrocarbons more than lighter hydrocarbons. As the density or temperature of a polymer is decreased, the affinity for absorbing hydrocarbons increases, as illustrated in FIG. 14. As a polymer absorbs hydrocarbons, it can swell and become cohesive (sticky). This can negatively impact the fluidization behavior in the reactor. Therefore, as densities are decreased, the overall hydrocarbon concentration in the reactor sometimes must be reduced in order to avoid fluidization issues (e.g. sticking or agglomeration).

Figure 15:
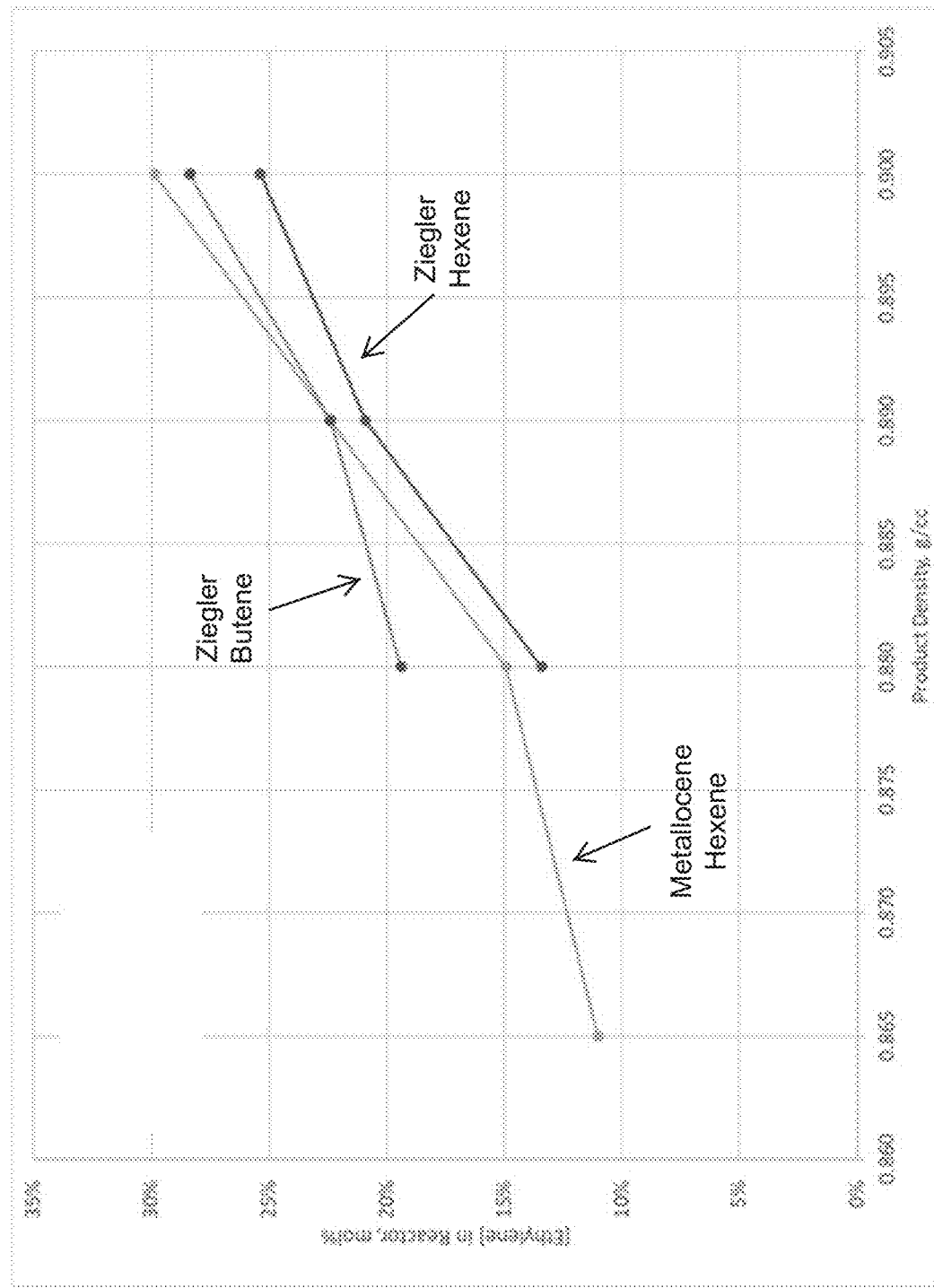
FIG. 15 presents a plot of reactor ethylene molar concentration versus copolymer density for different catalyst systems.

Ziegler catalysts are not as efficient at incorporating comonomers as metallocene catalysts and require higher comonomer concentrations in the reactor to achieve a given density decrease in the polymer. This often means that as density is being decreased, ethylene concentrations in the reactor have to be reduced in order to achieve the needed comonomer to ethylene ratio (and polymer density) without exceeding comonomer concentrations that create too much polymer sorption (e.g., FIG. 14). FIG. 15 estimates this effect for the three catalyst-comonomer systems. The Ziegler-hexene system has to be operated at lower ethylene concentrations in order to keep sorption levels within an acceptable range. The metallocene-hexene system (using butane as the inert condensable agent) is best suited for the gas phase process and requires less severe reductions in ethylene concentrations in order to achieve lower density, such as 0.88-0.89 g/cm$^3$.

While not wishing to be bound by theory, in the gas phase process, there is an operational advantage to using 1-butene as the comonomer for making elastomers and plastomers. Higher concentrations of the lower molecular weight comonomer are required to achieve a given sorption target, versus 1-hexene. The high concentration of lower molecular weight species in the reactor increases the heat capacity of the reaction gas. The result is a higher mass and cooling rate available for the reactor. Likewise, for the same reasons, there is an advantage to using butane as the inert condensable agent, rather than heavier hydrocarbons such as pentane or hexane. Thus, using a metallocene catalyst that exhibits high comonomer incorporation efficiency along with lower molecular weight condensing agents, such as butane (rather than pentane or hexane) is beneficial for lower density copolymers.

Figure 16:
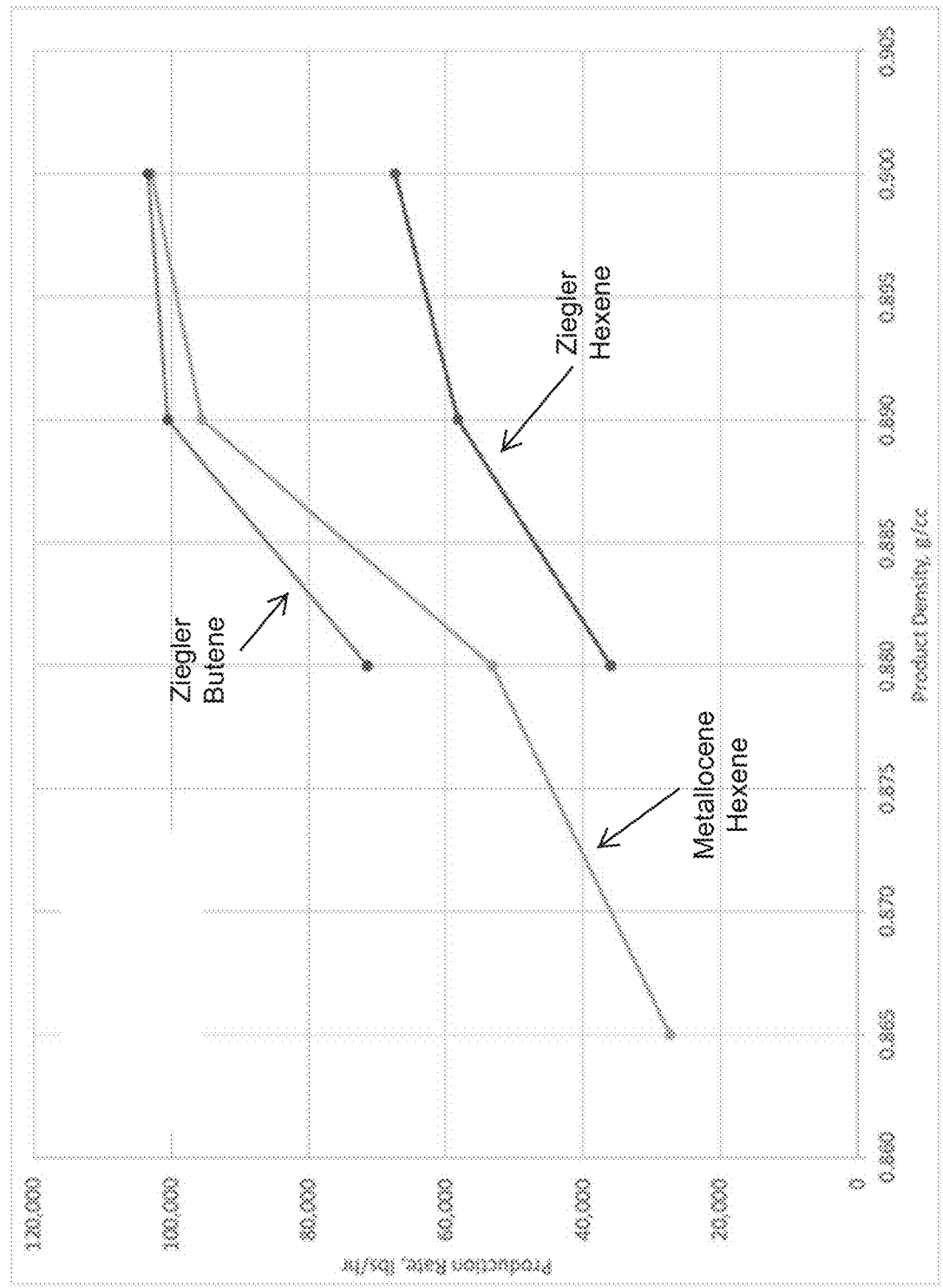
FIG. 16 presents a plot of polymer production rates versus copolymer density for different catalyst systems.

FIG. 16 shows the estimated production rates for the different systems when producing elastomers/plastomers. Metallocene catalysts using 1-hexene comonomer (and butane) can achieve high reactor throughputs over the broadest range of densities. Significant decreases in rates are needed to achieve densities lower than 0.88, in part because the reactor temperature has to be kept well below the softening temperature of the polymer, such as below ~160° F. as the density is decreased below 0.88 g/cc.

At lower densities and lower softening and melting points, solids handling downstream of the reactor often employ steeper angles and larger discharge nozzles, constant movement, and cooling to reduce sticking and/or agglomeration.

Using the information and correlations disclosed hereinabove, Constructive Examples 100-109 are summarized in Table IX. As the density is decreased (ranging from 0.90 to 0.865 g/cc) for the three systems, the reactor temperature also is decreased (ranging from 80 to 48° C.), and the estimated production rate also is reduced.

TABLE I

| Example | Mw (kg/mol) | Mw/Mn | SCB/1000C | Measured Density (g/mL) | Homopolymer Density (g/mL) | Density Decrease | SCB/MWD$^{0.32}$ | mol % Branching |
|---|---|---|---|---|---|---|---|---|
| 1 | 173 | 2.38 | 0 | 0.953 | 0.953 | 0.000 | 0.000 | 0.00 |
| 2 | 182 | 2.42 | 0.1 | 0.947 | 0.952 | 0.005 | 0.019 | 0.01 |
| 3 | 139 | 2.50 | 1.2 | 0.942 | 0.956 | 0.014 | 0.247 | 0.12 |
| 4 | 159 | 2.34 | 2.3 | 0.937 | 0.953 | 0.016 | 0.454 | 0.23 |
| 5 | 142 | 3.13 | 3.5 | 0.933 | 0.955 | 0.022 | 0.717 | 0.35 |
| 6 | 129 | 2.30 | 3.7 | 0.933 | 0.956 | 0.023 | 0.781 | 0.37 |
| 7 | 134 | 2.72 | 3.7 | 0.936 | 0.955 | 0.019 | 0.772 | 0.37 |
| 8 | 111 | 2.75 | 6.8 | 0.931 | 0.957 | 0.026 | 1.507 | 0.68 |
| 9 | 204 | 2.25 | 9.3 | 0.917 | 0.950 | 0.033 | 1.696 | 0.93 |
| 10 | 187 | 2.11 | 10.7 | 0.916 | 0.951 | 0.035 | 2.006 | 1.07 |
| 11 | 120 | 2.20 | 12.4 | 0.916 | 0.956 | 0.040 | 2.680 | 1.24 |
| 12 | 180 | 2.33 | 12.9 | 0.913 | 0.951 | 0.038 | 2.449 | 1.29 |
| 13 | 117 | 2.50 | 13.6 | 0.918 | 0.956 | 0.038 | 2.963 | 1.36 |
| 14 | 95 | 3.50 | 32.0 | 0.902 | 0.960 | 0.058 | 7.452 | 3.20 |
| 15 | 102 | 3.52 | 36.3 | 0.897 | 0.959 | 0.062 | 8.263 | 3.63 |
| 16 | 147 | 2.63 | 49.5 | 0.885 | 0.954 | 0.069 | 10.025 | 4.95 |

TABLE II

| Example | MI g/10 min | Density g/mL | Ethylene Rxn mol % | Hexene Rxn mol % | Mol Ratio Hex/Et | Temp °C. | Homopol Den | Density Decrease | SCB per 1000C | Polymer Hex/Et | Rxn Hex/Et | Efficiency Pol/Rxn |
|---|---|---|---|---|---|---|---|---|---|---|---|---|
| Ziegler | | | | | | | | | | | | |
| 17 | 0.90 | 0.9242 | 2.52 | 14.4 | 5.697 | 85.0 | 0.958 | 0.0338 | 11.4 | 0.0115 | 5.697 | 0.20% |
| 18 | 0.76 | 0.9280 | 2.60 | 13.3 | 5.134 | 85.0 | 0.958 | 0.0300 | 8.7 | 0.0087 | 5.134 | 0.17% |
| 19 | 0.97 | 0.9192 | 3.90 | 12.4 | 3.192 | 82.5 | 0.958 | 0.0388 | 15.6 | 0.0159 | 3.192 | 0.50% |
| MET15 | | | | | | | | | | | | |
| 20 | 1.03 | 0.9127 | 10.67 | 7.0 | 0.656 | 77.1 | 0.951 | 0.0383 | 12.9 | 0.0130 | 0.656 | 1.99% |
| MET 16 | | | | | | | | | | | | |
| 21 | 1.69 | 0.9129 | 12.16 | 4.4 | 0.364 | 77.0 | 0.951 | 0.0381 | 12.7 | 0.0129 | 0.364 | 3.54% |
| 22 | 0.76 | 0.9120 | 11.95 | 4.2 | 0.351 | 76.7 | 0.951 | 0.0390 | 13.4 | 0.0136 | 0.351 | 3.87% |
| 23 | 1.22 | 0.9054 | 10.23 | 6.3 | 0.616 | 73.9 | 0.951 | 0.0456 | 19.2 | 0.0196 | 0.616 | 3.18% |
| $Ind_2ZrCl_2$ (Indenyl) | | | | | | | | | | | | |
| 24 | 0.71 | 0.9023 | 10.6 | 16.7 | 1.575 | 68.3 | 0.951 | 0.0487 | 22.0 | 0.0225 | 1.575 | 1.43% |
| 25 | 1.17 | 0.9039 | 10.6 | 16.7 | 1.575 | 68.3 | 0.951 | 0.0471 | 20.4 | 0.0208 | 1.575 | 1.32% |
| 26 | 1.15 | 0.9190 | 14.74 | 12.3 | 0.832 | 81.7 | 0.951 | 0.0320 | 8.4 | 0.0085 | 0.832 | 1.02% |

TABLE III

| Constructive Example | 27 | 28 | 29 | 30 | 31 |
|---|---|---|---|---|---|
| Metallocene | Indenyl | MET16 | MET16 | MET15 | nButyl |
| ppm Met on iC4 | 0.8 | 0.4 | 0.5 | 0.8 | 0.3 |
| Chemically-treated solid oxide | CTSO 4 | CTSO 4 | CTSO 5 | CTSO 4 | CTSO 6 |
| Incorporation Efficiency | 1.28% | 3.78% | 3.52% | 2.02% | 1.03% |
| Co-catalyst | TIBA | TIBA | TIBA | TIBA | TEA |
| Co-catalyst, ppm | 20.0 | 18.3 | 15.9 | 25.2 | 28.7 |
| Temperature ° C. | 74.2 | 71.2 | 68.9 | 67.7 | 65.3 |
| Rxn Ethylene mol % | 5.1% | 7.5% | 8.6% | 4.8% | 3.5% |
| Rxn Hexene mol % | 13.2% | 8.5% | 10.3% | 12.2% | 15.1% |
| Rxn Hex/Et mol ratio | 2.588 | 1.133 | 1.198 | 2.542 | 4.314 |
| Polymer Hexene mol % | 3.2% | 4.1% | 4.3% | 4.9% | 4.3% |
| Polymer Ethylene mol % | 96.8% | 95.9% | 95.7% | 95.1% | 95.7% |
| Polymer Hex/Et mol ratio | 0.0331 | 0.0428 | 0.0453 | 0.0513 | 0.0444 |
| SCB/1000 C | 32.1 | 41.1 | 43.3 | 48.8 | 42.5 |
| Density Decrease | 0.0560 | 0.0623 | 0.0637 | 0.0671 | 0.0633 |
| Homopolymer Density | 0.951 | 0.951 | 0.951 | 0.951 | 0.951 |
| Polymer Density | 0.8950 | 0.8887 | 0.8873 | 0.8839 | 0.8877 |
| Isobutane feed, lb/hr | 65.3 | 68.3 | 70.2 | 71.4 | 64.8 |
| Hexene feed, lb/hr | 12.5 | 8.4 | 10.5 | 12.6 | 14.2 |
| Ethylene feed, lb/hr | 28.3 | 30.1 | 35.5 | 38.2 | 29.3 |
| Productivity, lb PE/lb CTSO | 3450 | 5800 | 6790 | 4434 | 7856 |
| Activity, lb PE/lb Met/hr | 541,730 | 1,101,757 | 1,011,396 | 668,768 | 1,507,202 |
| Melt Index (MI), g/10 min | 1.6 | 0.77 | 0.85 | 0.45 | 2.5 |
| HLMI, g/10 min | 27.2 | 13.1 | 14.5 | 7.7 | 40.0 |

TABLE IVa

| Example | Metallocene | CTSO | Met ppm to Rx | Co-cat | Co-cat ppm | Temp °C. | 1-Hexene (mol %) | Ethylene (mol %) | Hexene/Ethylene |
|---|---|---|---|---|---|---|---|---|---|
| 32 | Indenyl | A | 3.24 | TEA | 8.08 | 68.7 | 27.0 | 10.53 | 2.57 |
| 33 | Indenyl | A | 3.79 | TEA | 8.06 | 77.8 | 27.3 | 10.72 | 2.54 |
| 34 | MET16 | B | 1.68 | TIBA | 39.67 | 73.9 | 14.8 | 10.23 | 1.44 |
| 35 | MET16 | B | 2.13 | TIBA | 41.24 | 73.9 | 15.0 | 10.31 | 1.45 |
| 36 | MET16 | B | 2.27 | TIBA | 39.47 | 74.1 | 14.3 | 12.02 | 1.19 |
| 37 | MET16 | B | 2.23 | TIBA | 38.59 | 73.9 | 14.4 | 10.66 | 1.35 |
| 38 | MET16 | B | 2.11 | TIBA | 41.71 | 73.9 | 14.6 | 11.07 | 1.32 |
| 39 | MET16 | B | 2.05 | TIBA | 41.10 | 71.2 | 14.7 | 11.82 | 1.24 |
| 40 | MET16 | B | 2.07 | TIBA | 42.19 | 73.9 | 14.6 | 10.21 | 1.43 |
| 41 | MET16 | B | 2.35 | TIBA | 39.77 | 76.3 | 14.4 | 11.92 | 1.21 |
| 42 | MET16 | B | 2.12 | TIBA | 41.56 | 73.9 | 14.8 | 10.37 | 1.43 |
| 43 | MET16 | B | 2.11 | TIBA | 41.78 | 74.0 | 14.0 | 12.48 | 1.12 |
| 44 | MET16 | B | 2.34 | TIBA | 41.10 | 76.1 | 14.0 | 12.45 | 1.12 |
| 45 | MET16 | B | 2.76 | TIBA | 21.76 | 77.1 | 13.5 | 10.23 | 1.32 |
| 46 | MET16 | C | 0.85 | TIBA | 20.26 | 76.7 | 8.2 | 11.95 | 0.69 |
| 47 | MET15 | B | 2.06 | TIBA | 21.53 | 77.6 | 14.5 | 10.48 | 1.38 |

TABLE IVa-continued

| | | | | | | | | | |
|---|---|---|---|---|---|---|---|---|---|
| 48 | MET16 | C | 0.60 | TIBA | 21.23 | 76.6 | 9.6 | 11.49 | 0.84 |
| 49 | MET15 | D | 1.03 | TIBA | 24.38 | 77.1 | 15.3 | 10.67 | 1.43 |
| 50 | MET16 | E | 0.28 | TIBA | 18.77 | 77.0 | 9.8 | 8.71 | 1.13 |
| 51 | MET16 | C | 0.75 | TIBA | 20.73 | 76.7 | 9.1 | 12.22 | 0.74 |
| 52 | MET15 | D | 0.99 | TIBA | 20.22 | 77.1 | 14.6 | 11.67 | 1.25 |
| 53 | MET15 | B | 2.04 | TIBA | 21.15 | 77.4 | 13.9 | 9.76 | 1.42 |
| 54 | MET16 | D | 2.47 | TIBA | 22.04 | 76.3 | 10.4 | 11.93 | 0.87 |
| 55 | MET16 | D | 3.85 | TIBA | 28.44 | 76.3 | 11.5 | 13.05 | 0.88 |
| 56 | MET16 | B | 2.84 | TIBA | 28.90 | 76.8 | 10.7 | 10.05 | 1.06 |
| 57 | MET16 | C | 0.50 | TIBA | 16.94 | 76.7 | 9.3 | 12.06 | 0.77 |
| 58 | MET16 | B | 3.21 | TIBA | 28.46 | 76.3 | 11.3 | 12.89 | 0.88 |
| 59 | MET16 | B | 2.82 | TIBA | 28.72 | 76.7 | 10.9 | 9.24 | 1.18 |
| 60 | MET16 | D | 2.75 | TIBA | 32.27 | 76.3 | 11.4 | 12.09 | 0.94 |
| 61 | MET15 | B | 1.13 | TIBA | 42.18 | 75.2 | 12.2 | 12.22 | 1.00 |
| 62 | MET16 | B | 2.23 | TIBA | 20.01 | 76.6 | 8.8 | 9.52 | 0.92 |
| 63 | MET16 | E | 0.49 | TIBA | 20.36 | 76.9 | 9.8 | 12.81 | 0.76 |
| 64 | MET16 | B | 3.11 | TIBA | 21.69 | 77.0 | 10.1 | 10.98 | 0.92 |
| 65 | MET16 | E | 0.36 | TIBA | 20.10 | 77.0 | 10.0 | 12.16 | 0.82 |
| 66 | MET16 | B | 2.12 | TIBA | 9.85 | 79.2 | 11.0 | 14.23 | 0.77 |
| 67 | MET16 | B | 2.48 | TIBA | 44.05 | 78.4 | 12.0 | 11.75 | 1.03 |
| 68 | MET15 | B | 1.06 | TIBA | 42.28 | 74.3 | 11.7 | 11.59 | 1.01 |
| 69 | MET16 | C | .045 | TIBA | 21.28 | 76.9 | 9.9 | 10.71 | 0.92 |

| Example | Hydrogen mlb/hr | Ethylene lb/hr | 1-Hexene lb/hr | Isobutane lb/hr | Solids wt. % | Rate lb/hr | CTSO Productivity | Incorporation. Efficiency (%) |
|---|---|---|---|---|---|---|---|---|
| 32 | 0 | 35 | 16.10 | 72.00 | 35.00 | 32.00 | 897 | 1.12 |
| 33 | 0 | 35 | 16.32 | 72.00 | 35.00 | 33.00 | 990 | 1.16 |
| 34 | 0.65 | 42.07 | 7.54 | 72.00 | 36.20 | 44.33 | 6685 | 1.54 |
| 35 | 0.63 | 42.10 | 7.63 | 71.81 | 34.80 | 42.67 | 6720 | 1.44 |
| 36 | 0.50 | 42.10 | 7.41 | 73.44 | 32.90 | 40.83 | 6911 | 1.61 |
| 37 | 0.50 | 42.10 | 7.44 | 73.17 | 35.60 | 44.00 | 7047 | 1.47 |
| 38 | 0.63 | 41.90 | 7.45 | 71.92 | 37.30 | 45.67 | 6224 | 1.43 |
| 39 | 0.50 | 42.90 | 7.58 | 72.74 | 34.70 | 42.83 | 5838 | 1.55 |
| 40 | 0.66 | 42.10 | 7.43 | 72.22 | 35.36 | 43.73 | 6648 | 1.55 |
| 41 | 0.66 | 37.38 | 6.49 | 63.95 | 35.50 | 38.61 | 5729 | 1.65 |
| 42 | 0.65 | 42.00 | 7.56 | 71.90 | 35.60 | 43.67 | 6515 | 1.30 |
| 43 | 0.66 | 42.10 | 7.13 | 72.35 | 34.60 | 42.44 | 6487 | 1.52 |
| 44 | 0.66 | 42.08 | 6.98 | 71.10 | 35.50 | 43.00 | 7278 | 1.51 |
| 45 | 0.53 | 48.02 | 6.47 | 68.87 | 41.10 | 51.17 | 6069 | 1.22 |
| 46 | 0.32 | 35.69 | 4.08 | 75.17 | 29.80 | 34.67 | 13463 | 2.15 |
| 47 | 5.50 | 43.70 | 6.98 | 68.24 | 36.90 | 44.33 | 11122 | 1.14 |
| 48 | 0.58 | 35.72 | 4.81 | 74.86 | 29.90 | 34.89 | 11176 | 1.87 |
| 49 | 5.05 | 41.78 | 6.48 | 59.43 | 38.64 | 42.08 | 3660 | 1.10 |
| 50 | 1.19 | 34.89 | 4.91 | 74.66 | 29.10 | 33.67 | 7399 | 1.38 |
| 51 | 0.41 | 35.71 | 4.53 | 75.26 | 30.30 | 35.33 | 14010 | 1.94 |
| 52 | 5.42 | 41.17 | 6.13 | 59.48 | 38.31 | 41.33 | 4112 | 1.25 |
| 53 | 6.30 | 48.69 | 6.63 | 68.18 | 40.20 | 50.17 | 11469 | 1.02 |
| 54 | 1.00 | 24.03 | 3.49 | 49.73 | 27.50 | 21.50 | 2802 | 1.62 |
| 55 | 0.55 | 25.71 | 3.91 | 49.57 | 27.70 | 22.17 | 1343 | 1.58 |
| 56 | 0.45 | 43.95 | 5.14 | 71.05 | 37.30 | 45.33 | 4705 | 1.58 |
| 57 | 0.49 | 35.70 | 4.64 | 75.24 | 29.70 | 34.67 | 9683 | 1.70 |
| 58 | 0.50 | 23.16 | 3.82 | 49.55 | 28.20 | 21.83 | 4485 | 1.67 |
| 59 | 0.45 | 43.97 | 5.25 | 71.34 | 37.10 | 45.17 | 5349 | 1.28 |
| 60 | 0.51 | 23.61 | 3.84 | 49.51 | 28.70 | 22.33 | 2706 | 1.49 |
| 61 | 3.60 | 36.00 | 6.29 | 75.00 | 29.00 | 34.36 | 10254 | 1.43 |
| 62 | 0.39 | 35.69 | 4.36 | 74.78 | 31.50 | 36.67 | 5457 | 1.50 |
| 63 | 0.82 | 35.70 | 4.88 | 74.65 | 28.90 | 33.67 | 10724 | 1.95 |
| 64 | 0.50 | 35.74 | 5.07 | 74.74 | 31.80 | 37.33 | 6513 | 1.43 |
| 65 | 1.16 | 35.70 | 5.00 | 74.59 | 30.50 | 35.50 | 12739 | 1.84 |
| 66 | 0.69 | 22.31 | 3.90 | 52.19 | 24.40 | 19.33 | 5251 | 1.81 |
| 67 | 1.10 | 37.41 | 5.24 | 63.32 | 35.10 | 37.56 | 6321 | 1.31 |
| 68 | 4.00 | 36.01 | 6.08 | 75.63 | 29.00 | 34.44 | 9814 | 1.36 |
| 69 | 1.25 | 35.71 | 4.96 | 75.06 | 31.50 | 36.83 | 9931 | 1.63 |

TABLE IVb

| Example | Pellet MI | Pellet HLMI | Pellet HLMI/MI | Powder HLMI | Powder MI | Powder HLMI/MI | Powder Density | Pellet Density |
|---|---|---|---|---|---|---|---|---|
| 32 | 0.71 | 14.01 | 19.73 | 18.36 | 0.74 | 24.81 | 0.9000 | 0.9023 |
| 33 | 1.17 | 30.98 | 26.48 | 35.93 | 1.60 | 22.46 | 0.8993 | 0.9039 |
| 34 | | | | 20.80 | 1.22 | 17.05 | 0.9054 | 0.9054 |
| 35 | | | | 20.00 | 1.13 | 17.70 | 0.9066 | 0.9066 |
| 36 | | | | 18.27 | 1.03 | 17.74 | 0.9083 | 0.9083 |
| 37 | | | | 18.52 | 1.05 | 17.64 | 0.9076 | 0.9084 |
| 38 | | | | 24.40 | 1.24 | 19.68 | 0.9086 | 0.9086 |

TABLE IVb-continued

| | | | | | | | | |
|---|---|---|---|---|---|---|---|---|
| 39 | | | | 18.00 | 0.98 | 18.37 | 0.9082 | 0.9087 |
| 40 | | | | 20.96 | 1.19 | 17.61 | 0.9055 | 0.9087 |
| 41 | | | | 19.00 | 1.13 | 16.81 | 0.9076 | 0.9088 |
| 42 | | | | 20.80 | 1.21 | 17.19 | 0.9089 | 0.9089 |
| 43 | | | | 17.98 | 0.96 | 18.73 | 0.9105 | 0.9107 |
| 44 | | | | 19.42 | 1.11 | 17.50 | 0.9106 | 0.9107 |
| 45 | | | | 15.60 | 0.97 | 16.08 | 0.9116 | 0.9117 |
| 46 | 0.76 | 14.12 | 18.58 | 12.28 | 0.60 | 20.47 | 0.9130 | 0.9120 |
| 47 | | | | 23.60 | 1.07 | 22.06 | 0.9120 | 0.9121 |
| 48 | 0.98 | 17.26 | 17.61 | 16.17 | 0.82 | 19.72 | 0.9121 | 0.9125 |
| 49 | 1.00 | 23.72 | 23.72 | 24.92 | 1.01 | 24.67 | 0.9120 | 0.9127 |
| 50 | 1.69 | 31.36 | 18.56 | 31.68 | 1.64 | 19.32 | 0.9122 | 0.9129 |
| 51 | 0.82 | 15.21 | 18.55 | 14.20 | 0.71 | 20.00 | 0.9135 | 0.9132 |
| 52 | 1.12 | 28.70 | 25.63 | 28.62 | 1.06 | 27.00 | 0.9121 | 0.9135 |
| 53 | | | | 24.96 | 1.13 | 22.09 | 0.9134 | 0.9136 |
| 54 | | | | 26.75 | 1.36 | 19.67 | 0.9138 | 0.9139 |
| 55 | | | | 24.44 | 1.33 | 18.38 | 0.9140 | 0.9140 |
| 56 | | | | 15.17 | 0.92 | 16.41 | 0.9108 | 0.9140 |
| 57 | 0.79 | 14.98 | 18.96 | 14.31 | 0.72 | 19.88 | 0.9151 | 0.9140 |
| 58 | | | | 25.28 | 1.42 | 17.80 | 0.9132 | 0.9141 |
| 59 | 0.94 | 15.64 | 16.64 | 16.02 | 1.05 | 15.26 | 0.9127 | 0.9143 |
| 60 | | | | 25.26 | 1.45 | 17.42 | 0.9139 | 0.9144 |
| 61 | | | | 16.78 | 0.68 | 24.68 | 0.9137 | 0.9145 |
| 62 | 1.10 | 19.83 | 18.03 | 20.45 | 1.11 | 18.42 | 0.9141 | 0.9147 |
| 63 | 1.20 | 20.97 | 17.48 | 19.40 | 1.05 | 18.48 | 0.9130 | 0.9147 |
| 64 | 1.18 | 20.55 | 17.42 | 20.21 | 1.14 | 17.73 | 0.9150 | 0.9148 |
| 65 | 1.79 | 31.17 | 17.41 | 30.29 | 1.61 | 18.81 | 0.9127 | 0.9148 |
| 66 | 1.29 | 21.93 | 17.00 | 23.48 | 1.36 | 17.21 | 0.9140 | 0.9149 |
| 67 | | | | 24.53 | 1.37 | 17.91 | 0.9147 | 0.9150 |
| 68 | | | | 23.48 | 0.94 | 24.98 | 0.9142 | 0.9150 |
| 69 | 1.98 | 32.46 | 16.39 | 31.11 | 1.67 | 18.63 | 0.9128 | 0.9150 |

| Example | Mn kg/mol | Mw kg/mol | Mz kg/mol | Mw/Mn | Mz/Mw | $\eta(0)$ Mpa | $\tau(\eta)$ sec | CY-a | Branches/ 1000C |
|---|---|---|---|---|---|---|---|---|---|
| 32 | | | | | | | | | 27.8 |
| 33 | | | | | | | | | 28.7 |
| 34 | 53.57 | 119.1 | 201.6 | 2.22 | 1.69 | 5806 | 14.64 | 0.6409 | 21.8 |
| 35 | 53.11 | 119.9 | 202.3 | 2.26 | 1.69 | 6021 | 15.98 | 0.6365 | 20.5 |
| 36 | 52.54 | 120.7 | 202.3 | 2.30 | 1.68 | 6660 | 0.02 | 0.6362 | 18.8 |
| 37 | 53.95 | 120.8 | 201.9 | 2.24 | 1.67 | 6124 | 0.01 | 0.6514 | 19.5 |
| 38 | 55.03 | 120.4 | 201.6 | 2.19 | 1.67 | 6232 | 25.73 | 0.6032 | 18.6 |
| 39 | 55.77 | 127.5 | 216.9 | 2.29 | 1.70 | 7426 | 15.62 | 0.6293 | 18.9 |
| 40 | 53.84 | 119.1 | 199.4 | 2.21 | 1.67 | 4211 | 59.48 | 0.6293 | 21.7 |
| 41 | 52.65 | 117.8 | 198.6 | 2.24 | 1.69 | 5882 | 18.95 | 0.6361 | 19.5 |
| 42 | 52.24 | 118.5 | 199.2 | 2.27 | 1.68 | 5636 | 14.01 | 0.6301 | 18.3 |
| 43 | | | | | | 6343 | 26.04 | 0.6038 | 16.8 |
| 44 | | | | | | 6212 | 24.04 | 0.6200 | 16.7 |
| 45 | 57.23 | 135.6 | 233 | 2.37 | 1.72 | 7893 | 28.60 | 0.5946 | 15.8 |
| 46 | 58.86 | 135.2 | 233.3 | 2.30 | 1.73 | 10000 | 225 | 0.4559 | 14.6 |
| 47 | 31.76 | 123.6 | 276.3 | 3.89 | 2.24 | 8788 | 94.82 | 0.4587 | 15.5 |
| 48 | 57.32 | 124.9 | 211.8 | 2.18 | 1.70 | 8393 | 247 | 0.4197 | 15.4 |
| 49 | 35.67 | 125.7 | 275.0 | 3.53 | 2.19 | 11810 | 521 | 0.3194 | 15.5 |
| 50 | 45.38 | 103.7 | 204.2 | 2.29 | 1.97 | 5090 | 138 | 0.3645 | 15.3 |
| 51 | 62.46 | 133.3 | 227.6 | 2.13 | 1.71 | 5343 | 0.00 | 0.4363 | 14.2 |
| 52 | 30.20 | 118.8 | 277.9 | 3.93 | 2.34 | 12720 | 659 | 0.2854 | 15.4 |
| 53 | 32.20 | 130.0 | 273.5 | 4.07 | 2.09 | 7684 | 62.1 | 0.4280 | 14.3 |
| 54 | 45.02 | 117.4 | 236.2 | 2.61 | 2.01 | 7704 | 367 | 0.2927 | 14.0 |
| 55 | 45.23 | 119.3 | 221.6 | 2.64 | 1.86 | 5489 | 59.7 | 0.4847 | 13.8 |
| 56 | | | | | | | | | 16.5 |
| 57 | 59.98 | 131.7 | 228.3 | 2.20 | 1.73 | 10140 | 338 | 0.4079 | 12.9 |
| 58 | 50.62 | 116 | 201.6 | 2.29 | 1.74 | 5639 | 48.0 | 0.5009 | 14.4 |
| 59 | 53.7 | 124.3 | 254.3 | 2.31 | 2.05 | 7490 | 0.01 | 0.5768 | 14.9 |
| 60 | 53.7 | 124.3 | 254.3 | 2.31 | 2.05 | 5180 | 25.2 | 0.5515 | 13.9 |
| 61 | 42.06 | 136.8 | 275.1 | | | | | | 14.0 |
| 62 | 54.74 | 124.2 | 212.9 | 2.27 | 1.71 | 6799 | 45.3 | 0.5842 | 13.7 |
| 63 | 50.81 | 113.5 | 209.5 | 2.23 | 1.85 | 7061 | 143 | 0.4310 | 14.6 |
| 64 | 50.03 | 118.8 | 209.3 | 2.38 | 1.76 | 6644 | 20.9 | 0.6295 | 13.0 |
| 65 | 47.45 | 106.3 | 199.1 | 2.24 | 1.87 | 4932 | 73.3 | 0.4485 | 14.9 |
| 66 | 53.93 | 111 | 195.9 | 2.06 | 1.76 | 5224 | 17.4 | 0.6176 | 13.8 |
| 67 | 44.59 | 106 | 193 | 2.38 | 1.82 | 8070 | 24.2 | 0.5272 | 13.2 |
| 68 | 35.28 | 131 | 269.9 | 3.71 | 2.06 | 8070 | 0.02 | 0.5272 | 13.6 |
| 69 | 47.05 | 106.2 | 185.3 | 2.26 | 1.75 | 8187 | 0.02 | 0.5288 | 14.8 |

TABLE V

| Example | 70 | 71 | 72 |
|---|---|---|---|
| Metallocene | | Me2SiInd2ZrCl2 | |
| Chemically-Treated Solid Oxide | | CTSO A | |
| Co-catalyst | | 0.4 mL 1M TIBA | |
| Temperature | 148° C. | 151° C. | 150° C. |
| Ethylene pressure | 450 psig | 450 psig | 450 psig |
| Solvent | | Cyclohexane | |
| 1-Hexene, mL | 30 | 40 | 50 |
| Run Time, min | 20 | 30 | 20 |
| Polymer yield, g | 239.7 | 234.4 | 231.9 |
| Productivity, gPE/gCTSO | 390 | 822 | 753 |
| Activity, gPE/gCTSO/hr | 1171 | 1645 | 2259 |
| Melt Index, g/10 min | 15.9 | 6.69 | 2.37 |
| Density, g/cc | 0.9035 | 0.8977 | 0.8943 |
| Mn, kg/mol | 20.1 | 26.3 | 32.7 |
| Mw, kg/mol | 49.4 | 68.3 | 81.2 |
| Mz, kg/mol | 104.5 | 172.8 | 214.8 |
| Mw/Mn | 2.46 | 2.60 | 2.48 |
| Mz/Mw | 2.12 | 2.53 | 2.65 |
| Rheological MI | 7.51 | 4.99 | 2.38 |
| Rheological HLMI | 122 | 84 | 263 |
| Zero-shear viscosity | 1288 | 2073 | 12390 |
| Relaxation time, sec | 0.0006 | 0.0007 | 0.1322 |
| CY-a | 0.3569 | 0.3291 | 0.2842 |

TABLE VI

| | 1-hexene incorporation efficiency | |
|---|---|---|
| Catalyst | 80° C. | 155° C. |
| Ziegler | 0.25% | 2.7% |
| MET15 | 2.02% | 21.9% |
| MET16 | 3.18% | 34.4% |
| Indenyl | 1.28% | 13.8% |

TABLE VII

| Example | 73 | 74 | 75 | 76 | 77 |
|---|---|---|---|---|---|
| Metallocene | MET16 | MET16 | MET15 | MET15 | MET15 |
| ppm Met on iC4 | 0.8 | 0.4 | 0.5 | 0.8 | 0.3 |
| Chemically-treated solid oxide | D | D | D | D | D |
| Incorporation Efficiency | 34.4% | 34.4% | 21.9% | 21.9% | 21.9% |
| Co-catalyst | TIBA | TIBA | TIBA | TIBA | TEA |
| Co-catalyst, ppm | 25.0 | 28.3 | 24.4 | 25.2 | 35.7 |
| Temperature, ° C. | 155 | 155 | 155 | 155 | 155 |
| Rxn Ethylene, mol % | 13.8% | 10.3% | 8.6% | 7.5% | 9.5% |
| Rxn Hexene, mol % | 2.1% | 1.5% | 2.1% | 1.3% | 1.6% |
| Rxn Hex/Et mol ratio | 0.152 | 0.146 | 0.244 | 0.173 | 0.168 |
| Polym Hexene, mol % | 5.0% | 4.8% | 5.1% | 3.7% | 3.6% |
| Polym Ethylene, mol % | 95.0% | 95.2% | 94.9% | 96.3% | 96.4% |
| Polym Hex/Et mol ratio | 0.0523 | 0.0501 | 0.0535 | 0.0380 | 0.0369 |
| SCB/1000 C | 49.7 | 47.7 | 50.8 | 36.6 | 35.6 |
| Density Decrease | 0.0677 | 0.0665 | 0.0683 | 0.0592 | 0.0369 |
| Homopolymer Density | 0.951 | 0.951 | 0.951 | 0.951 | 0.951 |
| Polymer Density | 0.8833 | 0.8845 | 0.8827 | 0.8918 | 0.8925 |
| Isobutane feed, lb/hr | 65.3 | 68.3 | 70.2 | 71.4 | 64.8 |
| Hexene feed, lb/hr | 2.0 | 1.5 | 2.1 | 1.3 | 1.5 |
| Ethylene feed, lb/hr | 28.3 | 30.1 | 35.5 | 38.2 | 29.3 |
| Productivity, lb PE/lb CTSO | 3450 | 5800 | 6790 | 4434 | 7856 |
| Activity, lb PE/lb Met/hr | 541,730 | 1,101,757 | 1,011,396 | 668,768 | 1,507,202 |
| Melt Index, g/10 min | 1.6 | 0.77 | 0.85 | 0.45 | 2.5 |
| High load MI, g/10 min | 27.2 | 13.1 | 14.5 | 7.7 | 40.0 |

TABLE VIII

| Example | Metallocene Type | Metallocene ppm | TEA ppm | Temperature °C. | Ethylene mol % | 1-Hexene mol % | Productivity lb/lb |
|---|---|---|---|---|---|---|---|
| 78 | SiBI | 4.44 | 13.41 | 72.3 | 13.19 | 8.87 | 3125 |
| 79 | SiBI | 2.07 | 12.72 | 72.2 | 14.48 | 9.37 | 4762 |
| 80 | SiBI | 2.31 | 13.86 | 72.2 | 14.09 | 11.68 | 3704 |
| 81 | SiBI | 2.21 | 14.01 | 72.1 | 14.01 | 14.12 | 3704 |
| 82 | PhPh | 1.82 | 11.69 | 72.2 | 13.37 | 14.43 | 3226 |
| 83 | 2MSiBI | 0.26 | 10.18 | 72.2 | 15.08 | 15.43 | 2703 |
| 84 | 3MSiBI | 0.19 | 10.09 | 72.0 | 15.05 | 14.76 | 2439 |
| 85 | PMBF | 0.18 | 50.43 | 71.7 | 14.15 | 10.61 | 1111 |
| 86 | PMBF | 0.16 | 10.24 | 72.0 | 14.32 | 14.96 | 1099 |
| 87 | EBI | 0.98 | 11.02 | 70.3 | 18.43 | 18.35 | 1563 |
| 88 | EBI | 0.95 | 10.82 | 70.3 | 18.01 | 14.50 | 1961 |
| 89 | EBI | 0.58 | 21.97 | 69.7 | 16.42 | 14.64 | 1605 |
| 90 | EBI | 0.59 | 21.21 | 69.6 | 14.07 | 18.62 | 2262 |
| 91 | EBI | 0.58 | 21.31 | 69.6 | 14.12 | 11.57 | 2193 |
| 92 | EBI | 0.57 | 21.84 | 69.7 | 14.16 | 13.59 | 2392 |
| 93 | EBI | 0.58 | 22.12 | 69.7 | 13.83 | 11.74 | 2283 |
| 94 | EBI | 1.07 | 23.53 | 77.6 | 15.27 | 19.54 | 1186 |
| 95 | EBI | 0.61 | 24.13 | 77.6 | 20.68 | 18.57 | 1397 |
| 96 | EBI | 0.61 | 14.16 | 66.7 | 14.35 | 15.28 | 1942 |
| 97 | EBI | 1.67 | 11.84 | 66.6 | 13.89 | 15.70 | 2939 |
| 98 | PFCp | 0.48 | 11.12 | 70.9 | 14.16 | 9.83 | 929 |
| 99 | PFCp | 0.49 | 10.68 | 70.9 | 13.73 | 19.80 | 726 |

| Example | MI g/10 min | HLMI g/10 min | HLMI/ MI | Density g/mL | Branches/ 1000C | $\eta(0)$ Mpa | $\tau(\eta)$ sec | CY-a | Incorporation. Efficiency (%) |
|---|---|---|---|---|---|---|---|---|---|
| 78 | 0.14 | 12.36 | 88.3 | 0.9124 | 18.6 | 7.27E+11 | 1.02E+13 | 0.0445 | 2.82 |
| 79 | 0.03 | 13.24 | 441.3 | 0.9125 | 18.5 | 5.43E+12 | 7.34E+13 | 0.0356 | 2.91 |
| 80 | 0.64 | 62.29 | 97.3 | 0.9045 | 27.3 | 8.97E+05 | 1.35E+05 | 0.1543 | 3.38 |
| 81 | 1.36 | 94.94 | 69.8 | 0.9024 | 29.9 | 1.29E+05 | 2.71E+04 | 0.1735 | 3.06 |
| 82 | 0.96 | 53.29 | 55.5 | 0.9019 | 30.5 | 4.47E+13 | 1.10E+17 | 0.0374 | 2.92 |
| 83 | 1.22 | 92.08 | 75.5 | 0.9032 | 28.9 | 6.61E+05 | 1.46E+05 | 0.1804 | 2.91 |
| 84 | 0.73 | 79.86 | 109.4 | 0.9022 | 30.1 | 4.44E+05 | 9.21E+04 | 0.1767 | 3.17 |
| 85 | 0.46 | 33.43 | 72.7 | 0.9099 | 21.2 | 3.32E+07 | 6.06E+07 | 0.0695 | 2.88 |
| 86 | 0.87 | 50.63 | 58.2 | 0.9006 | 32.2 | 4.93E+06 | 4.39E+06 | 0.0738 | 3.19 |
| 87 | 0.97 | 36.86 | 38.0 | 0.8997 | 33.5 | 1.58E+05 | 1.29E+04 | 0.1145 | 3.48 |
| 88 | 1.74 | 54.49 | 31.3 | 0.9055 | 26.1 | 3.15E+04 | 1.45E+03 | 0.1407 | 3.32 |
| 89 | 0.10 | 12.03 | 120.3 | 0.9019 | 30.5 | 5.76E+07 | 6.63E+06 | 0.0993 | 3.53 |
| 90 | 0.94 | 47.26 | 50.3 | 0.8918 | 45.2 | 6.20E+04 | 6.38E+03 | 0.1779 | 3.58 |
| 91 | 0.22 | 17.73 | 80.6 | 0.9102 | 20.8 | 9.63E+05 | 4.09E+04 | 0.1422 | 2.60 |
| 92 | 0.47 | 28.33 | 60.3 | 0.9104 | 20.6 | 1.31E+05 | 6.74E+03 | 0.1713 | 2.19 |
| 93 | 4.60 | 150.76 | 32.8 | 0.9108 | 20.2 | 3.72E+03 | 1.67E+02 | 0.2608 | 2.43 |
| 94 | 0.62 | 31.24 | 50.4 | 0.8945 | 41.0 | 2.30E+05 | 5.14E+04 | 0.1091 | 3.34 |
| 95 | 1.35 | 57.46 | 42.6 | 0.9046 | 27.1 | 2.76E+04 | 7.54E+02 | 0.1659 | 3.11 |
| 96 | 0.54 | 61.67 | 114.2 | 0.9017 | 30.8 | 1.25E+06 | 3.82E+05 | 0.1576 | 2.98 |
| 97 | 1.72 | 131.1 | 76.2 | 0.9014 | 31.2 | 7.10E+04 | 1.50E+04 | 0.1895 | 2.85 |
| 98 | 0.75 | 25.57 | 34.1 | 0.9053 | 26.3 | 1.54E+08 | 1.02E+09 | 0.0421 | 3.89 |
| 99 | 1.27 | 43.24 | 34.0 | 0.8910 | 46.5 | 2.07E+07 | 3.88E+07 | 0.0481 | 3.38 |

* CTSO A was used
** Metallocenes: SiBI = rac SiMe2Ind2ZrCl2, PhPh = CPh2FluCpZrCl2, 2MSiBI = rac SiMe2(2-Me Ind)2ZrCl2, 3MSiBI = rac SiMe2(3-Me Ind)2ZrCl2, PMBF = SiPhMeFlu2ZrCl2, EBI = rac-C2H4(Ind)2ZrCl2, PFCP = CPh(C4H7)(Flu)CpZrCl2.

TABLE IX

| Example | 100 | 101 | 102 | 103 | 104 | 105 | 106 | 107 | 108 | 109 |
|---|---|---|---|---|---|---|---|---|---|---|
| Catalyst | Ziegler | Ziegler | Ziegler | Ziegler | Ziegler | Ziegler | Metallocene | Metallocene | Metallocene | Metallocene |
| Comonomer | Hexene | Hexene | Hexene | Butene | Butene | Butene | Hexene | Hexene | Hexene | Hexene |
| Inert Condensable | None | None | None | Butane | Butane | Butane | Butane | Butane | Butane | Butane |
| Density, g/cc | 0.900 | 0.890 | 0.880 | 0.900 | 0.890 | 0.880 | 0.900 | 0.890 | 0.880 | 0.865 |
| Reactor Pressure, psig | 320 | 320 | 320 | 320 | 320 | 320 | 320 | 320 | 320 | 320 |
| Reactor Temperature, °C. | 80 | 75 | 67 | 80 | 75 | 67 | 80 | 75 | 67 | 48 |
| Gas Composition | | | | | | | | | | |
| Hydrogen, mol % | 3.0% | 2.1% | 1.3% | 3.7% | 2.2% | 1.9% | 0.0% | 0.0% | 0.0% | 0.0% |
| Ethylene, mol % | 25.4% | 20.9% | 13.4% | 28.4% | 22.4% | 19.4% | 29.9% | 26.9% | 23.9% | 10.4% |
| Ethane, mol % | 2.0% | 2.0% | 2.0% | 2.0% | 2.0% | 2.0% | 2.0% | 2.0% | 2.0% | 2.0% |
| Butene, mol % | 0.0% | 0.0% | 0.0% | 30.0% | 27.5% | 27.0% | 0.0% | 0.0% | 0.0% | 0.0% |
| Butane, mol % | 0.0% | 0.0% | 0.0% | 1.0% | 4.0% | 0.0% | 20.0% | 20.0% | 15.0% | 0.0% |
| n-Pentane, mol % | 0.0% | 0.0% | 0.0% | 0.0% | 0.0% | 0.0% | 0.0% | 0.0% | 0.0% | 0.0% |

TABLE IX-continued

| Example | 100 | 101 | 102 | 103 | 104 | 105 | 106 | 107 | 108 | 109 |
|---|---|---|---|---|---|---|---|---|---|---|
| Hexene-1, mol % | 5.6% | 5.0% | 3.6% | 0.0% | 0.0% | 0.0% | 2.7% | 2.7% | 3.5% | 2.0% |
| Hexene-2, mol % | 0.2% | 0.2% | 0.2% | 0.0% | 0.0% | 0.0% | 0.2% | 0.2% | 0.2% | 0.2% |
| nHexane, mol % | 0.2% | 0.2% | 0.2% | 0.0% | 0.0% | 0.0% | 0.2% | 0.2% | 0.2% | 0.2% |
| Nitrogen | 63.6% | 69.6% | 79.2% | 35.0% | 41.9% | 49.7% | 45.0% | 48.0% | 55.2% | 85.2% |
| C6:C2, mole ratio | 0.22 | 0.24 | 0.27 | 0.00 | 0.00 | 0.00 | 0.09 | 0.10 | 0.15 | 0.19 |
| C4:C2, mole ratio | 0.00 | 0.00 | 0.00 | 1.06 | 1.23 | 1.39 | 0.00 | 0.00 | 0.00 | 0.00 |
| Comon:Ethylene Feed Ratio, lb/lb | 0.33 | 0.47 | 0.61 | 0.21 | 0.29 | 0.39 | 0.25 | 0.36 | 0.49 | 0.69 |
| Comonomer incorporation, mole fraction | 0.10 | 0.13 | 0.17 | 0.09 | 0.13 | 0.16 | 0.08 | 0.11 | 0.14 | 0.19 |
| P/P* (related to sorption) | 0.84 | 0.86 | 0.84 | 0.72 | 0.80 | 0.84 | 0.85 | 0.85 | 0.84 | 0.90 |
| Total Sorbed hydrocarbon, lbs/lb PE | 14% | 17% | 18% | 10% | 14% | 18% | 14% | 16% | 18% | 25% |
| Fluidization Velocity, ft/sec | 2.25 | 2.25 | 2.25 | 2.25 | 2.25 | 2.25 | 2.25 | 2.25 | 2.25 | 2.25 |
| Dewpoint, ° C. | 63 | 60 | 50 | 56 | 56 | 50 | 64 | 62 | 54 | 37 |
| Condensation, % | 10.1% | 8.5% | 4.1% | 19.4% | 19.9% | 13.5% | 18.2% | 18.0% | 14.6% | 2.3% |
| Catalyst Productivity, lbs PE/lb catalyst | 10,250 | 8,450 | 5,400 | 13,750 | 10,850 | 9,400 | — | — | — | — |
| Rate, Mlb/hr | 67 | 58 | 36 | 103 | 100 | 71 | 103 | 95 | 53 | 27 |

The invention is described above with reference to numerous aspects and specific examples. Many variations will suggest themselves to those skilled in the art in light of the above detailed description. All such obvious variations are within the full intended scope of the appended claims. Other aspects of the invention can include, but are not limited to, the following (aspects are described as "comprising" but, alternatively, can "consist essentially of" or "consist of"):

Aspect 1. A slurry polymerization process for producing an ethylene polymer having a density of less than or equal to about 0.91 g/cm$^3$, the process comprising:

contacting a catalyst composition with ethylene and an α-olefin comonomer in a diluent in a slurry reactor at a polymerization temperature in a range from about 50° C. to about 78° C. to produce the ethylene polymer;

wherein the catalyst composition comprises a metallocene compound, a chemically-treated solid oxide, and optionally, a co-catalyst;

wherein the metallocene compound is a single atom bridged or two atom bridged metallocene compound; and wherein the metallocene compound is characterized by a comonomer incorporation efficiency of at least about 1% at the polymerization temperature.

Aspect 2. The process defined in aspect 1, wherein the diluent comprises any suitable diluent or any diluent disclosed herein, e.g., isobutane, pentane, hexane, heptane, etc., or a combination thereof.

Aspect 3. The process defined in aspect 1 or 2, wherein the polymerization temperature is in any suitable range or any range disclosed herein, e.g., from about 55 to about 78° C., from about 50° C. to about 70° C., from about 55° C. to about 72° C., etc.

Aspect 4. The process defined in any one of aspects 1-3, wherein the metallocene compound is characterized by a comonomer incorporation efficiency in any suitable range or any range disclosed herein, e.g., at least about 1.5%, at least about 2%, at least about 2.5%, etc., at the polymerization temperature.

Aspect 5. The process defined in any one of aspects 1-4, wherein the metallocene compound has a fluorenyl group and a cyclopentadienyl group.

Aspect 6. The process defined in any one of aspects 1-4, wherein the metallocene compound has two indenyl groups.

Aspect 7. The process defined in any one of aspects 1-4, wherein the metallocene compound has an indenyl group and a fluorenyl group.

Aspect 8. The process defined in any one of aspects 1-7, wherein the metallocene compound has a single carbon or silicon bridging atom.

Aspect 9. The process defined in any one of aspects 1-7, wherein the metallocene compound has a two carbon atom bridge.

Aspect 10. The process defined in any one of aspects 1-9, wherein the metallocene compound contains an alkenyl substituent.

Aspect 11. The process defined in any one of aspects 1-10, wherein the metallocene compound contains zirconium or hafnium.

Aspect 12. The process defined in any one of the preceding aspects, wherein the comonomer concentration in the slurry reactor is in any suitable range or any range disclosed herein, e.g., from about 5 to about 30, from about 7 to about 28, from about 10 to about 16 mol %, etc.

Aspect 13. The process defined in any one of the preceding aspects, wherein the solids content in the slurry reactor is in any suitable range or any range disclosed herein, e.g., from about 10 to about 50, from about 15 to about 40, from about 10 to about 30 wt. %, etc.

Aspect 14. The process defined in any one of the preceding aspects, wherein the inlet temperature to the reactor coolant jacket is in any suitable range or any range disclosed herein, e.g., from about 20 to about 45° C., from about 20° C. to about 40° C., from about 25° C. to about 40° C., etc.

Aspect 15. The process defined in any one of the preceding aspects, wherein the slurry reactor has an outside diameter in any suitable range or any range disclosed herein, e.g., from about 12 to about 22", from about 16 to about 20", etc.

Aspect 16. The process defined in any one of the preceding aspects, wherein the slurry reactor is a loop slurry reactor.

Aspect 17. A solution polymerization process for producing an ethylene polymer having a density of less than or equal to about 0.91 g/cm$^3$, the process comprising:

contacting a catalyst composition with ethylene and an α-olefin comonomer in a hydrocarbon solvent in a solution reactor at a polymerization temperature in a range from about 120° C. to about 160° C. to produce the ethylene polymer;

wherein the catalyst composition comprises a metallocene compound, a chemically-treated solid oxide, and optionally, a co-catalyst; and wherein the metallocene compound is characterized by a comonomer incorporation efficiency of at least about 10% at the polymerization temperature.

Aspect 18. The process defined in aspect 17, wherein the hydrocarbon solvent comprises any suitable solvent or any solvent disclosed herein, e.g., pentane, hexane, cyclohexane, a Soltrol® isoparaffin solvent, etc., or a combination thereof.

Aspect 19. The process defined in aspect 17 or 18, wherein the polymerization temperature is in any suitable range or any range disclosed herein, e.g., from about 125 to about 155° C., from about 130° C. to about 160° C., from about 140° C. to about 160° C., etc.

Aspect 20. The process defined in any one of aspects 17-19, wherein the average residence time is in any suitable range or any range disclosed herein, e.g., from about 5 to about 90 min, from about 5 to about 30 min, from about 10 to about 75 min, from about 10 to about 45 min, etc.

Aspect 21. The process defined in any one of aspects 17-20, wherein the metallocene compound is characterized by a comonomer incorporation efficiency in any suitable range or any range disclosed herein, e.g., at least about 15%, at least about 20%, at least about 25%, etc., at the polymerization temperature.

Aspect 22. The process defined in any one of aspects 17-21, wherein the metallocene compound contains titanium or hafnium.

Aspect 23. The process defined in any one of aspects 17-22, wherein the metallocene compound has a fluorenyl group and a cyclopentadienyl group.

Aspect 24. The process defined in any one of aspects 17-22, wherein the metallocene compound has two indenyl groups or two fluorenyl groups.

Aspect 25. The process defined in any one of aspects 17-22, wherein the metallocene compound has an indenyl group and a fluorenyl group.

Aspect 26. A gas phase polymerization process for producing an ethylene polymer having a density of less than or equal to about 0.91 g/cm$^3$, the process comprising:

contacting a catalyst composition with ethylene and an α-olefin comonomer in a gas phase reactor containing an inert gas and a $C_4$-$C_8$ alkane at a polymerization temperature in a range from about 48° C. to about 82° C. to produce the ethylene polymer;

wherein the catalyst composition comprises a metallocene compound, a chemically-treated solid oxide, and optionally, a co-catalyst; and wherein a ratio of heavy hydrocarbon partial pressure to vapor pressure (ratio of P/P*) in the gas phase reactor is less than or equal to about 0.95.

Aspect 27. The process defined in aspect 26, wherein the inert gas comprises any suitable gas or any gas disclosed herein, e.g., nitrogen, ethane, propane, etc., or a combination thereof.

Aspect 28. The process defined in aspect 26 or 27, wherein the $C_4$-$C_8$ alkane comprises any suitable alkane or any alkane disclosed herein, e.g., butane, pentane, hexane, etc., or a combination thereof.

Aspect 29. The process defined in any one of aspects 26-28, wherein the polymerization temperature is in any suitable range or any range disclosed herein, e.g., from about 48 to about 70° C., from about 58° C. to about 82° C., from about 58° C. to about 70° C., etc.

Aspect 30. The process defined in any one of aspects 26-29, wherein the ratio of P/P* is in any suitable range or any range disclosed herein, e.g., less than or equal to about 0.9, less than or equal to about 0.85, less than or equal to about 0.8, etc.

Aspect 31. The process defined in any one of aspects 26-30, wherein the chemically-treated solid oxide has any suitable particle size or an average particle size in any range disclosed herein, e.g., from about 30 to about 250 μm, from about 40 to about 150 μm, from about 50 to about 100 μm, etc.

Aspect 32. The process defined in any one of aspects 26-31, wherein the $C_4$-$C_8$ alkane concentration in the gas phase reactor is in any suitable range or any range disclosed herein, e.g., from about 5 to about 30, from about 10 to about 30, from about 15 to about 25 vol %, etc.

Aspect 33. The process defined in any one of aspects 26-32, wherein the carrier for the catalyst composition into the gas phase reactor is any suitable hydrocarbon or any hydrocarbon disclosed herein, e.g., ethane, propane, butane, pentane, hexane, etc., or a combination thereof.

Aspect 34. The process defined in any one of aspects 26-33, wherein the weight of transition metal (of the metallocene compound) based on the weight of the chemically-treated solid oxide is in any suitable range or any range disclosed herein, e.g., from about 50 to about 5000 ppm, from about 100 to about 2000 ppm, from about 150 to about 1000 ppm, etc.

Aspect 35. The process defined in any one of aspects 26-34, wherein the gas phase reactor is a fluidized bed gas-phase reactor.

Aspect 36. The process defined in any one of the preceding aspects, wherein the ethylene polymer has any suitable density or a density in any range disclosed herein, e.g., from about 0.86 to about 0.91, from about 0.865 to about 0.905, from about 0.87 to about 0.89 g/cm$^3$, etc.

Aspect 37. The process defined in any one of the preceding aspects, wherein the α-olefin comonomer comprises any suitable comonomer or any comonomer disclosed herein, e.g., propylene, 1-butene, 1-pentene, 4-methyl-1-pentene, 1-hexene, 1-octene, or a mixture thereof.

Aspect 38. The process defined in any one of aspects 1-37, wherein the chemically-treated solid oxide comprises any suitable chemically-treated solid oxide or any chemically-treated solid oxide disclosed herein, e.g., fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, fluorided-chlorided silica-coated alumina, sulfated silica-coated alumina, phosphated silica-coated alumina, etc., or any combination thereof.

Aspect 39. The process defined in any one of aspects 1-37, wherein the chemically-treated solid oxide comprises fluorided alumina, sulfated alumina, fluorided silica-alumina, sulfated silica-alumina, fluorided silica-coated alumina, fluorided-chlorided silica-coated alumina, sulfated silica-coated alumina, or any combination thereof.

Aspect 40. The process defined in any one of aspects 1-37, wherein the chemically-treated solid oxide comprises a fluorided solid oxide and/or a sulfated solid oxide.

Aspect 41. The process defined in any one of the preceding aspects, wherein the catalyst composition comprises the co-catalyst.

Aspect 42. The process defined in any one of aspects 1-41, wherein the co-catalyst comprises an organoaluminum compound.

Aspect 43. The process defined in any one of aspects 1-41, wherein the co-catalyst comprises any suitable co-catalyst or any co-catalyst disclosed herein, e.g., trimethylaluminum (TMA), triethylaluminum (TEA), tri-n-propylaluminum (TNPA), tri-n-butylaluminum (TNBA), triisobutylaluminum (TIBA), tri-n-hexylaluminum, tri-n-octylaluminum, diisobutylaluminum hydride, diethylaluminum ethoxide, diethylaluminum chloride, etc., or a combination thereof.

Aspect 44. The process defined in any one of the preceding aspects, wherein the catalyst composition is substantially free of aluminoxane compounds, organoboron or organoborate compounds, ionizing ionic compounds, or combinations thereof.

Aspect 45. The process defined in any one of the preceding aspects, wherein hydrogen is added to the reactor.

Aspect 46. The process defined in any one of the preceding aspects, wherein the ethylene polymer has any suitable amount of SCBs or an amount in any range disclosed herein, e.g., at least about 15 SCBs, from about 20 to about 60 SCBs, from about 18 to about 55 SCBs, from about 25 to about 50 SCBs, etc., per 1000 total carbon atoms.

Aspect 47. The process defined in any one of the preceding aspects, wherein the ethylene polymer comprises an ethylene/1-butene copolymer, an ethylene/1-hexene copolymer, and/or an ethylene/1-octene copolymer.

Aspect 48. The process defined in any one of the preceding aspects, wherein the ethylene polymer comprises an ethylene/1-hexene copolymer.

Aspect 49. The process defined in any one of the preceding aspects, wherein the catalyst composition comprises two metallocene compounds.

Aspect 50. The process defined in any one of the preceding aspects, wherein the process comprises two or more reactors.

Aspect 51. An ethylene polymer having:
a density of less than or equal to about 0.91 g/cm$^3$;
a CY-a parameter of less than or equal to about 0.2; and
a ratio of HLMI/MI of at least about 30.

Aspect 52. The polymer defined in aspect 51, wherein the CY-a parameter is in any suitable range or any range disclosed herein, e.g., from about 0.02 to about 0.2, from about 0.03 to about 0.19, from about 0.04 to about 0.18, less than or equal to about 0.14, etc.

Aspect 53. The polymer defined in aspect 51 or 52, wherein the ratio of HLMI/MI is in any suitable range or any range disclosed herein, e.g., at least about 40, at least about 60, at least about 80, at least about 100, etc.

Aspect 54. The polymer defined in any one of aspects 51-53, wherein the ethylene polymer has a melt index (MI) in any suitable range or any range disclosed herein, e.g., from about 0.01 to about 10, from about 0.1 to about 5, from about 0.4 to about 4 g/10 min, etc.

Aspect 55. An ethylene polymer having:
a density of less than or equal to about 0.91 g/cm$^3$;
a CY-a parameter in a range from about 0.25 to about 0.75; and
a ratio of Mw/Mn in a range from about 2 to about 3.

Aspect 56. The polymer defined in aspect 55, wherein the CY-a parameter is in any suitable range or any range disclosed herein, e.g., from about 0.28 to about 0.75, from about 0.3 to about 0.6, from about 0.4 to about 0.65, etc.

Aspect 57. The polymer defined in aspect 55 or 56, wherein the ratio of Mw/Mn is in any suitable range or any range disclosed herein, e.g., from about 2.1 to about 2.9, from about 2.1 to about 2.7, from about 2.2 to about 3, from about 2.2 to about 2.7, etc.

Aspect 58. The polymer defined in any one of aspects 55-57, wherein the ethylene polymer has a ratio of HLMI/MI in any suitable range or any range disclosed herein, e.g., less than or equal to about 27, less than or equal to about 25, less than or equal to about 22, less than or equal to about 20, etc.

Aspect 59. The polymer defined in any one of aspects 51-58, wherein the ethylene polymer has any suitable density or a density in any range disclosed herein, e.g., from about 0.86 to about 0.91, from about 0.865 to about 0.905, from about 0.87 to about 0.905, from about 0.87 to about 0.89 g/cm$^3$, etc.

Aspect 60. The polymer defined in any one of aspects 51-59, wherein the ethylene polymer has any suitable amount of SCBs or an amount in any range disclosed herein, e.g., at least about 15 SCBs, from about 20 to about 60 SCBs, from about 18 to about 55 SCBs, from about 25 to about 50 SCBs, etc., per 1000 total carbon atoms.

Aspect 61. The polymer defined in any one of aspects 51-60, wherein the ethylene polymer has an increasing SCBD or a substantially flat SCBD.

Aspect 62. The polymer defined in any one of aspects 51-61, wherein the ethylene polymer contains, independently, less than 0.1 ppm (by weight), less than 0.08 ppm, less than 0.05 ppm, less than 0.03 ppm, etc., of chromium, magnesium, vanadium, and titanium.

Aspect 63. The polymer defined in any one of aspects 51-62, wherein the ethylene polymer comprises an ethylene/1-butene copolymer, an ethylene/1-hexene copolymer, and/or an ethylene/1-octene copolymer.

Aspect 64. An article comprising the ethylene polymer defined in any one of aspects 51-63.

Aspect 65. The process defined in any one of aspects 1-50, wherein the ethylene polymer produced is defined in any one of aspects 51-63.

Aspect 66. An ethylene polymer produced by the process defined in any one of aspects 1-50.

Aspect 67. An ethylene polymer defined in any one of aspects 51-63 produced by the process defined in any one of aspects 1-50.

We claim:

1. A gas phase polymerization process for producing an ethylene polymer having a density of less than or equal to about 0.91 g/cm$^3$, the process comprising:
   contacting a catalyst composition with ethylene and an α-olefin comonomer in a gas phase reactor containing an inert gas and a $C_4$-$C_8$ alkane at a polymerization temperature in a range from about 48° C. to about 82° C. to produce the ethylene polymer;
   wherein the catalyst composition comprises a metallocene compound, a chemically-treated solid oxide, and optionally, a co-catalyst; and
   wherein a ratio of heavy hydrocarbon partial pressure to vapor pressure (ratio of P/P*) in the gas phase reactor is less than or equal to about 0.95.

2. The process of claim 1, wherein:
   the density is in a range from about 0.865 to about 0.905 g/cm$^3$;
   the α-olefin comonomer comprises 1-butene and/or 1-hexene;
   the chemically-treated solid oxide comprises a fluorided solid oxide and/or a sulfated solid oxide; and the catalyst composition comprises an organoaluminum co-catalyst.

3. The process of claim 1, wherein:
the chemically-treated solid oxide has an average particle size in a range from about 40 to about 150 µm; and
an amount of transition metal of the metallocene compound based on the weight of the chemically-treated solid oxide is in a range from about 50 to about 5000 ppm.

4. The process of claim 1, wherein:
the polymerization temperature is in a range from about 48 to about 70° C.; and
the ratio of P/P* is less than or equal to about 0.9.

5. The process of claim 1, wherein:
the gas phase reactor is a fluidized bed gas-phase reactor;
the inert gas comprises nitrogen, ethane, propane, or a combination thereof;
the $C_4$-$C_8$ alkane comprises butane, pentane, hexane, or a combination thereof, and a $C_4$-$C_8$ alkane concentration in the gas phase reactor is in a range from about 10 to about 30 vol %; and
a carrier for the catalyst composition into the fluidized bed gas-phase reactor is a hydrocarbon.

6. The process of claim 1, wherein the chemically-treated solid oxide comprises fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, fluorided-chlorided silica-coated alumina, sulfated silica-coated alumina, phosphated silica-coated alumina, or any combination thereof.

7. The process of claim 6, wherein the catalyst composition comprises the co-catalyst.

8. The process of claim 6, wherein the density is in a range from about 0.865 to about 0.905 g/cm³.

9. The process of claim 8, wherein an amount of transition metal of the metallocene compound based on the weight of the chemically-treated solid oxide is in a range from about 50 to about 5000 ppm.

10. The process of claim 1, wherein the gas phase reactor is a fluidized bed gas-phase reactor.

11. The process of claim 10, wherein a $C_4$-$C_8$ alkane concentration in the gas phase reactor is in a range from about 10 to about 30 vol %.

12. The process of claim 10, wherein the ratio of P/P* is less than or equal to about 0.85.

13. The process of claim 10, wherein the polymerization temperature is in a range from about 48 to about 70° C.

14. The process of claim 10, wherein an amount of transition metal of the metallocene compound based on the weight of the chemically-treated solid oxide is in a range from about 100 to about 2000 ppm.

15. The process of claim 10, wherein:
the density is in a range from about 0.865 to about 0.905 g/cm³; and
the α-olefin comonomer comprises 1-butene and/or 1-hexene.

16. The process of claim 15, wherein the chemically-treated solid oxide comprises a fluorided solid oxide and/or a sulfated solid oxide.

17. The process of claim 16, wherein the metallocene compound is a single atom bridged or two atom bridged metallocene compound.

18. The process of claim 10, wherein:
the ethylene polymer comprises an ethylene/1-butene copolymer, an ethylene/1-hexene copolymer, and/or an ethylene/1-octene copolymer; and
the ethylene polymer has from about 20 to about 60 SCBs per 1000 total carbon atoms.

19. The process of claim 18, wherein:
the inert gas comprises nitrogen, ethane, propane, or a combination thereof; and
the $C_4$-$C_8$ alkane comprises butane, pentane, hexane, or a combination thereof.

* * * * *